(12) United States Patent
Itoh et al.

(10) Patent No.: US 7,929,825 B2
(45) Date of Patent: Apr. 19, 2011

(54) DATA PROCESSING DEVICE

(75) Inventors: Masanori Itoh, Moriguchi (JP); Osamu Okauchi, Hirakata (JP); Yasuyuki Kurosawa, Katano (JP); Tadashi Nakamura, Nara (JP)

(73) Assignee: Panasonic Corporation, Osaka (JP)

( * ) Notice: Subject to any disclaimer, the term of this patent is extended or adjusted under 35 U.S.C. 154(b) by 1701 days.

(21) Appl. No.: 10/535,988

(22) PCT Filed: Nov. 27, 2003

(86) PCT No.: PCT/JP03/15198
§ 371 (c)(1),
(2), (4) Date: May 24, 2005

(87) PCT Pub. No.: WO2004/049329
PCT Pub. Date: Jun. 10, 2004

(65) Prior Publication Data
US 2006/0093323 A1    May 4, 2006

(30) Foreign Application Priority Data

| Nov. 28, 2002 | (JP) | 2002-346391 |
| Mar. 28, 2003 | (JP) | 2003-091170 |
| Jul. 25, 2003 | (JP) | 2003-279836 |

(51) Int. Cl.
  *H04N 9/80* (2006.01)
  *H04N 5/76* (2006.01)
  *H04M 3/22* (2006.01)
  *G11B 11/00* (2006.01)

(52) U.S. Cl. .................. 386/247; 369/53.11; 369/60.01; 379/32.01

(58) Field of Classification Search .............. 386/69, 386/E5.064; 369/53.11, 60.01; 379/32.01; G9B/20.009, 20.014, 27.002, 27.012, 27.013, G9B/27.019, 27.05, 27.052
See application file for complete search history.

(56) References Cited

U.S. PATENT DOCUMENTS
6,178,147 B1    1/2001    Fujinami
(Continued)

FOREIGN PATENT DOCUMENTS
EP    1 089 572 A2    4/2001
(Continued)

OTHER PUBLICATIONS
International Search Report for corresponding PCT/JP2003/015198, mailed Feb. 24, 2004.
(Continued)

*Primary Examiner* — Thai Tran
*Assistant Examiner* — Syed Y Hasan
(74) *Attorney, Agent, or Firm* — Renner, Otto, Boisselle & Sklar, LLP

(57) ABSTRACT

The data processor of the present invention can play back video and audio synchronously from an optical disk, on which video and audio data are stored in different areas. Each area consists of one or more unit areas. The data processor includes: a playback control section for giving instructions on how to read the video and audio data and how to play back the video and audio based on the read data; a head for reading the data from one of the unit areas after another in accordance with the instructions; and audio and video buffers for retaining the audio and video data read. The playback control section instructs that the audio data be read from a predetermined one of the unit areas to the audio buffer memory, and then instructs that the video data, which is to be played back over first and second periods of time, be read from a number n (where n is an integer equal to or greater than two) of unit areas to the video buffer. The first period of time is (n+2) times as long as the maximum amount of time to move the head, and the second period of time is taken to read the audio data from the next unit area.

7 Claims, 52 Drawing Sheets

U.S. PATENT DOCUMENTS

| | | | |
|---|---|---|---|
| 6,285,632 B1 * | 9/2001 | Ueki | 379/32.01 |
| 6,636,692 B1 | 10/2003 | Terauchi | |
| 2005/0013583 A1 | 1/2005 | Itoh | |

FOREIGN PATENT DOCUMENTS

| EP | 1 328 118 A1 | | 7/2003 |
|---|---|---|---|
| JP | 11-126427 A | | 5/1999 |
| JP | 2000-076786 | | 3/2000 |
| JP | 2000-222830 | | 8/2000 |
| JP | 2000222830 | * | 8/2000 |
| JP | 2001-101838 A | | 4/2001 |
| JP | 2001-283513 | | 10/2001 |
| JP | 2002-112198 | | 4/2002 |
| JP | 2002-157820 | | 5/2002 |
| JP | 2003-059196 | | 2/2003 |
| WO | 02/23896 A1 | | 3/2002 |

OTHER PUBLICATIONS

Notice of Reasons for Rejection for corresponding Japanese Application No. 2003-396946 dated Nov. 20, 2007 (English translation provided).

* cited by examiner

| Allocation Descriptor | Extent Length |
| --- | --- |
| | Extent Position |

Chain of Continuous Data Areas

FIG.39

Play List File
MOVE0001.PLF

Files to Refer to:
Moving Picture File: MOVE0001.MPG
Audio File: MOVE0001.AAC
Still Picture File#1: STIL0001.JPG
Still Picture File#2: STIL0002.JPG
Still Picture File#3: STIL0003.JPG
Still Picture File#4: STIL0004.JPG Playback Control Information:

| Area | File Name | Data Contents | Data Size | Playback Timing | Playback Duration |
|---|---|---|---|---|---|
| Moving Picture | Moving Picture | Start Address #0 | Data Size #0 | | |
| F1 | Still Picture #1 | Start Address #1 | Data Size #1 | Time #0 | Duration #0 |
| | Still Picture #2 | Start Address #2 | Data Size #2 | Time #1 | Duration #1 |
| F2 | Audio | Start Address #4 | Data Size #4 | Time #2 | Duration #2 |
| F3 | Still Picture #3 | Start Address #5 | Data Size #5 | Time #3 | Duration #3 |
| | Still Picture #4 | Start Address #6 | Data Size #6 | Time #4 | Duration #4 |
| | ... | ... | ... | Time #5 | Duration #5 |

Data Transfer Management Information

| Transfer Time [Seconds] | Data Size [Bytes] | Note |
|---|---|---|
| 5 | 1.28M | Audio #1 |
| 5 | 1.28M | Audio #1 |
| 5 | 1.28M | Still Picture #1 |
| 5 | 1.28M | Still Picture #1 |
| 5 | 0 | None |
| 5 | 0 | None |
| 5 | 1.28M | Still Picture #2 |
| 5 | 1.28M | Still Picture #2 |

DATA PROCESSING DEVICE

TECHNICAL FIELD

The present invention relates to an apparatus for writing compressed video and audio signals on a storage medium such as an optical disk and also relates to an apparatus for reading and expanding video and audio signals stored on a storage medium.

BACKGROUND ART

Various data streams for compressing and encoding a video signal and an audio signal at low bit rates have been standardized recently. Among other things, system streams compliant with the DV standard (or Consumer Digital VCR SD standard) and MPEG-2 System standard (ISO/IEC 13818-1) are well known as such data streams. System streams include the three types of streams—program streams (PS), transport streams (TS) and PES streams. Each of these data streams may be stored on an optical disk, for example, so as to comply with a predetermined standard.

Recently, data recording apparatuses (such as consumer camcorders) for realizing a "post-recording" operation with such a data stream have just become popular. As used herein, the "post-recording" operation refers to an operation of newly recording different audio once video and audio have been recorded. By performing such a post-recording operation, the newly recorded audio can be reproduced synchronously with the video instead of the originally recorded audio.

In the following description, the originally recorded audio will be referred to herein as "original audio", while the newly recorded audio "substitute audio". Also, video with the original audio will be referred to herein as a "moving picture". Furthermore, data representing the video will be referred to herein as "video data", data representing the original audio "original audio data" and data representing the substitute audio "substitute audio data".

The post-recording is usually realized by performing the following two steps. In the first step, a moving picture is recorded in a recording mode that enables the post-recording. In this recording mode, a data stream is recorded so as to have a data structure that enables future recording of substitute audio. Next, in the second step, the substitute audio is recorded while the moving picture recorded is being played back. If the post-recording is carried out in this procedure, an apparatus for playback (data playback apparatus) can play back the video and the substitute audio synchronously with each other. The user specifies the video and audio data to play back synchronously with each other and the playback timing thereof by describing a play list. To play back video and other data synchronously with each other in this manner will be referred to herein as "synchronous playback". It should be noted that the original audio data may be either erased or coexistent with the substitute audio data. In the latter case, the video, original audio and substitute audio may sometimes be played back synchronously with each other.

Also, the second step does not have to be the "real-time" post-recording, in which the audio is recorded while the moving picture is being played back, but may be non-real-time post-recording in which an audio file is copied without monitoring the moving picture.

Hereinafter, a configuration for a data playback apparatus will be described. FIG. 1 shows an arrangement of functional blocks in a conventional data playback apparatus. The data playback apparatus can play back a data stream stored on an optical disk 131 such as a DVD-RAM disk or a Blu-ray disk (BD). In the following description, the data stream is supposed to be an MPEG transport stream (TS). A TS consists of a plurality of packets (TS packets). Each TS packet includes video data and original or substitute audio data.

The data playback apparatus performs the synchronous playback (i.e., playback of video and substitute audio) in the following manner. A reading section 121 gets a TS read from the optical disk 131 by a pickup 130 and subjects it to A/D conversion and other processes, thereby outputting TS packets. A first transport stream disassembling section 165 splits each TS packet into video data and original audio data by way of a buffer memory 172. A video expanding section 111 expands (i.e., decodes) the video data and gets the video data presented on a video display section 110.

On the other hand, while the video data is being processed, the substitute audio data is also processed. First, according to the management information about storage areas on the optical disk 131 as managed by a logical block management section 141, a reading control section 171 for post-recorded data locates the substitute audio data to read. In accordance with the read instruction given by the reading control section 171, the reading section 121 reads that substitute audio data, subjects it to A/D conversion and other processes, and then outputs TS packets including the substitute audio data to the buffer memory 172. In response, the buffer memory 172 stores the substitute audio data in a different area from that of the video data. A second transport stream disassembling section 166 reads the substitute audio data from the buffer memory 172. A D/A converting section 176 decodes the substitute audio data and outputs it through an audio output section 112. It should be noted that a first audio expanding section 113 and the D/A converting section 176 share the common function of decoding the audio data.

After the video data and the original audio data have been recorded, the substitute audio data is recorded separately from those data. Accordingly, in performing the synchronous playback, the pickup 130 needs to move to the storage locations of those data and read them out. FIG. 2 shows the order of operations to be done by the pickup 130 in playing back the video and substitute audio synchronously with each other. In this case, what to read is the video data in a moving picture file and the substitute audio data in an audio file.

First, the pickup 130 moves to the storage location of the audio file on the optical disk 131 to read a certain amount of substitute audio data (Read #0). Thereafter, the pickup 130 seeks the storage location of the moving picture file (Seek #0) and reads the video data (Read #1). Once started to read the video data, the data playback apparatus begins to present the video and output the substitute audio. Then, the pickup 130 moves to the audio file (Seek #1) to read the substitute audio data (Read #2) and then seeks the storage location of the video data (Seek #2) again in this order.

FIG. 3 shows how the code densities (the amounts of data) of the video data and the substitute audio data change with time in the buffer memory 172. In FIG. 3, once read out for decoding purposes, every data is supposed to be deleted from the buffer memory 172 instantly. As shown in FIG. 3, during the seek operations ((2), (4), (6) and (7)), the amounts of the video data and audio data either remain the same ((2)) or both decrease ((4), (6) and (7)). On the other hand, while the video data is being read ((3) and (8)), the amount of the video data increases but that of the substitute audio data decreases. Conversely, while the substitute audio data is being read ((5)), the amount of the audio data increases but that of the video data decreases.

In a single read operation, the pickup 130 reads data from a physically continuous area (which will be referred to herein as a "continuous data area"). The minimum data length of the continuous data area is determined by the recording apparatus during the recording operation. FIG. 2 shows where to define the minimum length D of the continuous data area about the video data. A similar definition applies to the continuous data area of the audio data although its minimum length is not always the same.

To play back the video and the substitute audio seamlessly, the amount of the data that has been read and stored in the buffer memory 172 may not go zero. For that reason, to store a sufficient amount of data in the buffer memory, the minimum length of the continuous data area needs to be defined appropriately when the data should be stored. In that case, seamless synchronous playback is guaranteed as long as recording is always performed at that minimum length. Considering storage efficiency, the minimum length of the continuous data area of the video data is particularly important because a huge amount of data needs to be consumed to do so. This is because the greater the minimum length of the continuous data area, the less easy it is to use the remaining capacity of the given storage medium. For example, according to the techniques disclosed in PCT International Application Publications Nos. WO 02/23896 and WO 03/044796, the minimum length D of the continuous data area for the video data is determined with the longest time that it possibly takes to perform each of the seek operations #1, #2 and #3 and the read time to perform the read operation #2 shown in FIG. 2 taken into account. The seek operation #3 is also taken into consideration because if the pickup 130 met across a discontinuity point of the moving picture file (i.e., the boundary of the continuous data area), then the pickup 130 would have to move unintentionally, thus taking an extra time. It should be noted that the seek operation #3 shown in FIG. 2 corresponds to inner-V seek (7) shown in FIG. 3. However, as FIG. 3 shows a worst case, the period of time corresponding to the read time of the moving picture file between the seek operations #2 and #3 shown in FIG. 2 is supposed to be substantially zero.

In this case, the minimum length D of the continuous data area for the video data is derived by the following mathematical equations. Suppose the minimum amount of time it takes to read data from the moving picture continuous data area during the synchronous playback operation is $t_{V-CDA}$, the data transfer rate during the read operation is Vr, the amount of time it takes to read data from the audio continuous data area during the playback operation for post-recorded data (post-recording playback) is $t_{A-CDA}$, and the data transfer rate during the playback operation is Vo. Also, the longest seek time to take for the pickup 130 is represented by $T_{SEEK}$. Furthermore, the data reading unit of the substitute audio file is supposed to be once to twice as large as the data size of the minimum continuous data area (e.g., from 96 kB to 192 kB). In this case, the data size is allowed that once to twice range to make the substitute audio file editable more easily. For example, even if the audio file has been deleted partially, the continuous data area can still be maintained just by processing the editing point and its surrounding portions only.

Then, in FIG. 3, the following Equations (1), (2) and (3) are satisfied:

$$(Vr-Vo)t_{V-CDA}=Vo\times(3T_{SEEK}+t_{A-CDA}) \quad (1)$$

$$(Ar-Ao)t_{A-CDA}=2Ao\times tAo \quad (2)$$

$$tAo=t_{V-CDA}+3T_{SEEK} \quad (3)$$

Thus, $t_{V-CDA}$ is given by:

$$t_{A-CDA}=(2\times Ao\times Vr)\times 3T_{SEEK})/((Vr-Vo)\times(Ar-Ao)-2\times Ao\times Vo) \quad (4)$$

Since Vr=Ar here, Equation (4) can be, simplified into:

$$t_{A-CDA}=3\times Ao\times T_{SEEK}/(Vr-Vo-Ao-Ao\times Vo/Vr) \quad (5)$$

Accordingly, if the minimum data sizes of the audio and video continuous data areas are identified by $S_{A-CDA}$ and $S_{V-CDA}$ (bits), respectively, these data sizes are obtained by the following Equations (6) and (7):

$$S_{A-CDA}=Vr\times(t_{A-CDA}/2)=3\times Ao\times Vr\times T_{SEEK}/(Vr-Vo-Ao-Vo\times Ao/Vr) \quad (6)$$

$$S_{V-CDA}=Vr\times t_{V-CDA}=3\times Vo\times Vr\times T_{SEEK}\times(1+Ao/Vr)/(Vr-Vo-Ao-Vo\times Ao/Vr) \quad (7)$$

More specifically, if $T_{SEEK}$=1.2 seconds, Vo=15.57 Mbps, Ao=0.256 Mbps and Vr=20 Mbps are calculated by $t_{v-play}=t_{v-CDA}*Vr/Vo$ and $t_{A-play}=(t_{A-CDA}/2)*Vr/Ao$, then the minimum value of the video continuous data area will be 18.5 seconds ($t_{V-play}$), that of the audio continuous data area will be 18.1 seconds ($t_{A-play}$), the video data size will be 35.7 megabytes ($S_{V-CDA}$) and the audio data size will be 58 kilobytes ($S_{A-CDA}$). Accordingly, the size of the audio continuous data area should be 64 kilobytes or more because the size needs to be an integral multiple of an ECC block size.

However, if the minimum length D of the continuous data areas for video data is determined by the technique described above, then the minimum length D could be very long. Considering the defect rate of the disk as well as the condition described above, the minimum length D may correspond to a video playback duration of about 22 to about 23 seconds. For example, if the video data is partially deleted, then empty areas, of which the lengths are less than the minimum length D, will be produced here and there. Meanwhile, to realize a seamless synchronous playback of every moving picture file after the post-recording, every video data needs to be written on continuous data areas, of which the lengths are at least equal to the minimum length D. On the other hand, those empty areas, of which the lengths are less than the minimum length D, cannot be continuous data areas and are not used.

Also, suppose arbitrary playback ranges of a moving picture file are connected together with a play list with audio data played back synchronously. In that case, to guarantee a seamless and synchronous playback of moving pictures and audio, each playback range of the moving picture file needs to be at least as long as the minimum length D and the playback range of the audio data also needs to be at least as long as the minimum length D. In such a situation, if the minimum length of the moving picture data is long, then the play list cannot be a practical one. In other words, to realize a play list that contributes to a practical synchronous playback, the minimum length needs to be short enough. Also, even if the playback range is defined short, the synchronous playback is preferably realized seamlessly and continuously. In addition, not just the recording and playback operations by the originally intended machine but also post-recording and synchronous playback by a machine made by a different manufacturer, of a different type, or of a different price are preferably realized just by following a predetermined format.

The minimum length D may be shortened by introducing a pickup move model as disclosed in WO 003/044796 and as shown in FIG. 62, for example. According to this method, the moving picture continuous data area should be at least as long as its minimum length but less than twice as long as the minimum length.

Based on the following Equations (8) and (9), $$(Vr-Vo)t_{V\text{-}CDA} = 2Vo \times (2T_{SEEK} + t_{A\text{-}CDA}) \qquad (8)$$

$$(Ar-Ao)t_{A\text{-}CDA} = 2Ao \times (2T_{SEEK} + t_{V\text{-}CDA}) \qquad (9)$$

the minimum length can be calculated by:

$$t_{A\text{-}CDA} = 4T_{SEEK} \times Ao(1+Vo/Vr)/(Vr-Vo-Ao-3 \times Ao \times Vo/Vr) \qquad (10)$$

$$t_{V\text{-}CDA} = 4T_{SEEK} \times Vo(1+Ao/Vr)/(Vr-Vo-Ao-3 \times Ao \times Vo/Vr) \qquad (11)$$

$$S_{V\text{-}CDA} = Vr \times t_{V\text{-}CDA}/2 \qquad (12)$$

$$S_{A\text{-}CDA} = Ar \times t_{A\text{-}CDA}/2 \qquad (13)$$

$$t_{v\text{-}play} = t_{V\text{-}CDA} \times Vr/Vo \qquad (14)$$

$$t_{A\text{-}play} = t_{A\text{-}CDA} \times Vr/Ao \qquad (15)$$

If $T_{SEEK} = 1.2$ seconds, $Vo = 15.57$ Mbps, $Ao = 0.256$ Mbps and $Vr = 20$ Mbps, then the minimum value ($t_{V\text{-}play}$) of the video continuous data area will be 13.6 seconds. Even by this method, however, the minimum value should be even shorter.

As described above, there is a growing demand for a method of storing data by using a given optical disk efficiently and a technique of playing back the stored data seamlessly.

A recording method in which a data area for substitute audio data and a data area for moving picture data are arranged adjacent to each other in the spinning direction of the optical disk will be referred to herein as an "interleaving technique", while a recording method in which those areas are not arranged adjacent to each other will be referred to herein as a "non-interleaving technique". In FIG. 62, the substitute audio data area and moving picture data area are not arranged adjacent to each other although these areas are associated with each other. On the other hand, FIG. 63 shows an exemplary interleaved data structure for a data stream. If the associated moving picture and substitute audio data are stored adjacent to each other in the spinning direction of the optical disk, then there is no need to perform a seek operation in reading the moving picture data and the substitute audio data. As a result, the minimum data length of the continuous data area can be reduced. In the interleaving technique shown in FIG. 63, a continuous data area for substitute audio data is provided just before an MPEG transport stream, including moving pictures corresponding to a playback duration of 0.4 to 1 second, such that the substitute audio data and moving pictures are played back synchronously with each other. The substitute audio data and the video data are separated from each other at an ECC block boundary and the end of the video data is stored at the end of the continuous data area. According to this method, however, post-recording cannot be carried out in real time on the audio data area. Also, in this method, the audio data areas are dispersed finely. Accordingly, if data is written in non-real time, it will take a very long time to get the write processing done because the write locations are dispersed too much.

DISCLOSURE OF INVENTION

A data processor according to the present invention can play back video and audio synchronously with each other from an optical disk, on which video data representing the video and audio data representing the audio are stored in mutually different areas. Each area consists of one or more unit areas. The data processor includes: a playback control section for giving instructions on how to read the video data and the audio data and how to play back the video and the audio based on the read data; a head for reading the data from one of the unit areas after another in accordance with the instructions; an audio buffer memory for retaining the audio data read; and a video buffer memory for retaining the video data read. The playback control section instructs that the audio data be read from a predetermined one of the unit areas to the audio buffer memory, and then instructs that the video data, which is to be played back over first and second periods of time, be read from a number n (where n is an integer equal to or greater than two) of unit areas to the video buffer memory. The first period of time is (n+2) times as long as the maximum amount of time it takes to move the head, and the second period of time is taken to read the audio data from another unit area next to the predetermined unit area.

The quantity of the video data to play back through the first and second periods of time may be obtained by multiplying the sum of the first and second periods of time by a rate at which the video data is being read.

The video and the audio may be played back synchronously from the optical disk on which data length of each said unit area is obtained by dividing product of a third period of time and the read rate of the video data by n. The third period of time is a total amount of time it takes to read the video data.

The maximum amount of time it takes to move the head may be the amount of time to move the head between the innermost part of the optical disk and the outermost part thereof.

Either the video data or the audio data may be stored in an area of a storage area of the optical disk such that the area is closer to the center of the optical disk in a radial direction. The maximum amount of time it takes to move the head may be approximately half as long as the amount of time to move the head between the innermost part of the optical disk and the outermost part thereof.

BRIEF DESCRIPTION OF DRAWINGS

FIG. 39 shows the data structure of a play list file.

BEST MODE FOR CARRYING OUT THE INVENTION

Embodiment 1

Figure 1:
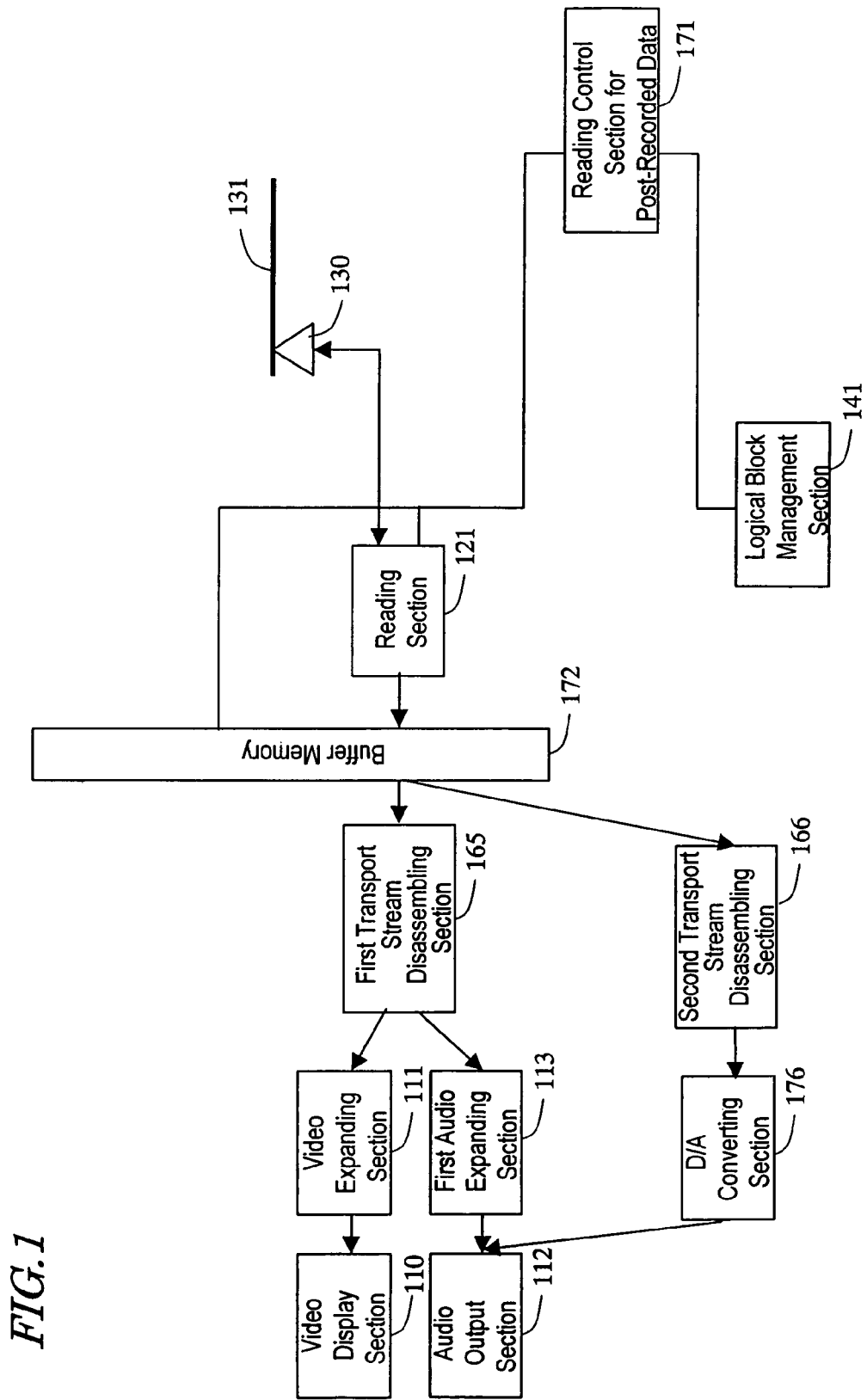
FIG. 1 shows an arrangement of functional blocks in a conventional data playback apparatus.
Figure 2:
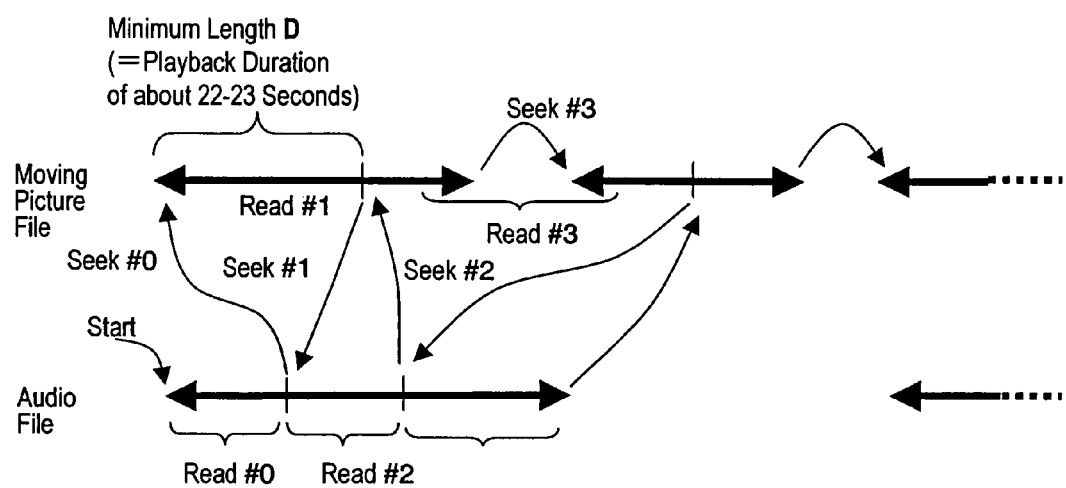
FIG. 2 shows the order of operations to be done by a pickup 130 in playing back video and substitute audio synchronously with each other.
Figure 3:
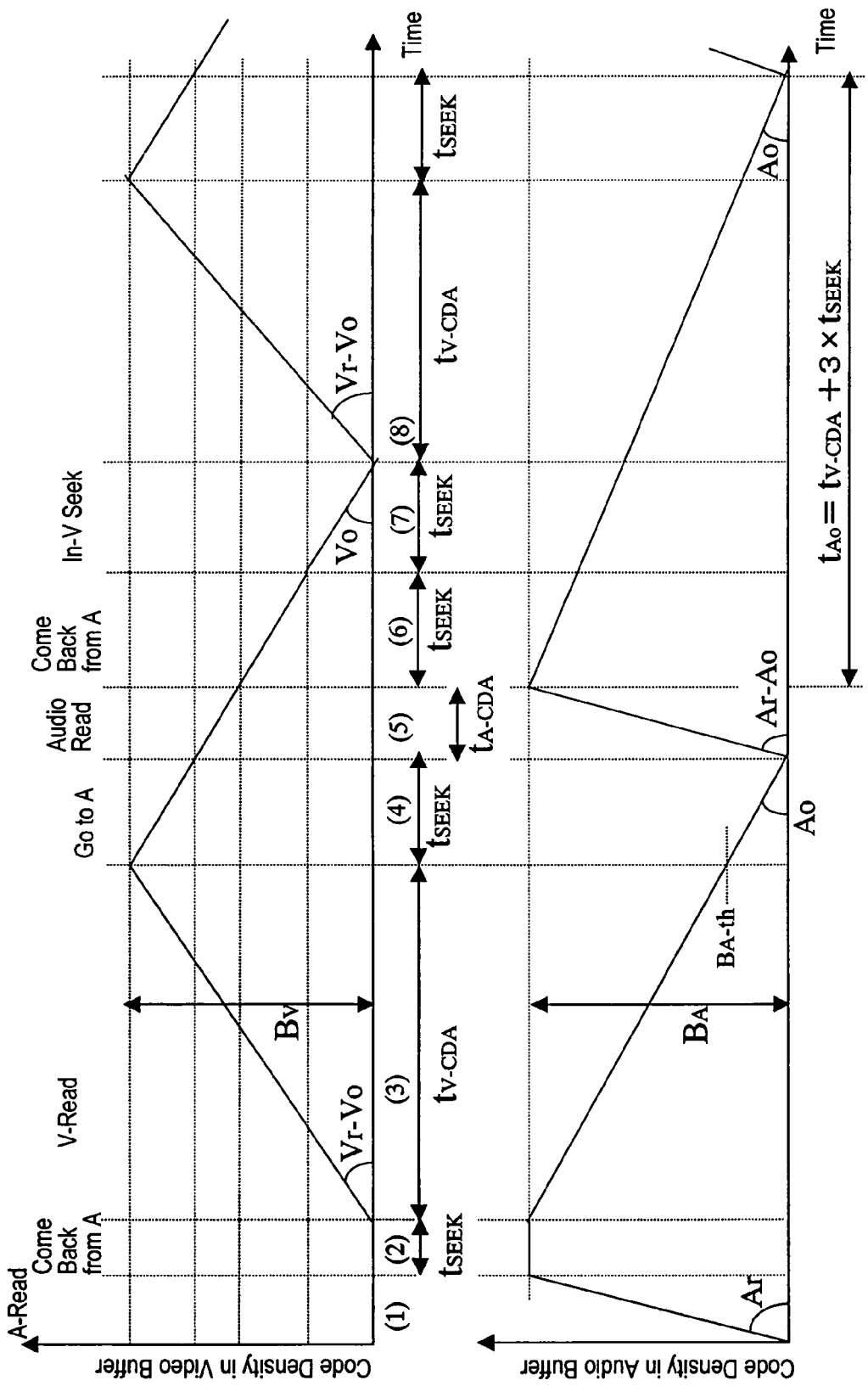
FIG. 3 shows how the code densities (the amounts of data) of the video data and the substitute audio data change with time in the buffer memory 172.
Figure 4:
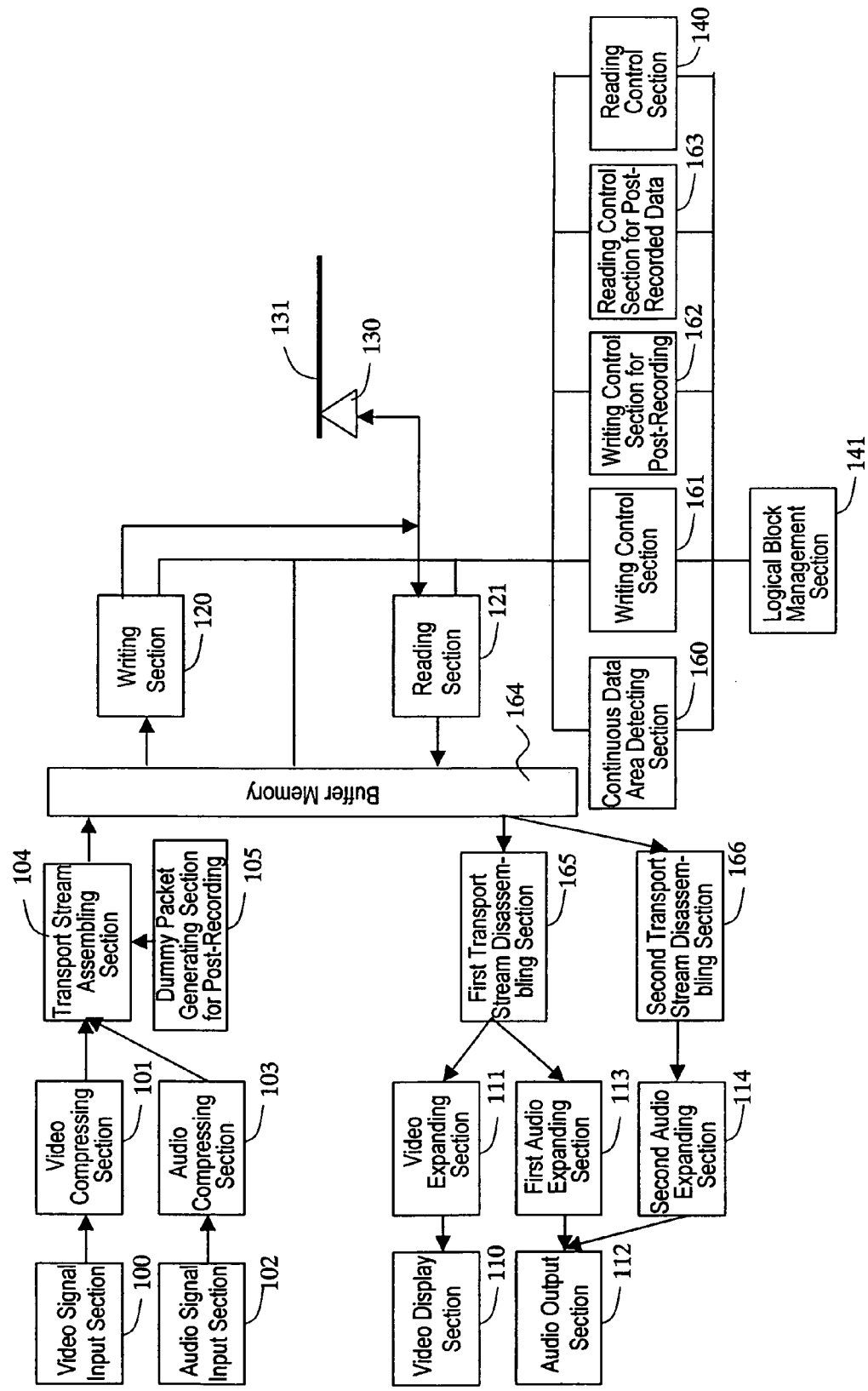
FIG. 4 shows an arrangement of functional blocks in a data processor according to a first preferred embodiment of the present invention.

FIG. 4 shows an arrangement of functional blocks in a data processor according to a first preferred embodiment of the present invention. This data processor can store a moving picture data stream including video data and audio data on an optical disk 131 such as a DVD-RAM disk or a Blu-ray disk (BD) and can also play back the data stream stored.

In addition, the data processor can also perform a post-recording operation in which audio is newly recorded after video and audio have been recorded once. By carrying out the post-recording operation, the data processor can play back the newly recorded substitute audio, not the originally recorded audio, synchronously with the video.

The data processor shown in FIG. 4 has both the recording function and the playback function. These are independent functions, and therefore, separable from each other. Consequently, the data processor may be implemented as either a data recording apparatus that performs a recording process following the procedure to be described later or a data playback apparatus that performs a playback process following that procedure.

Thus, the recording and playback functions of the data processor will be described separately. In the following description, the moving picture data stream is mostly supposed to be a transport stream (TS). However, preferred embodiments on program streams will also be mentioned later.

Figure 5:
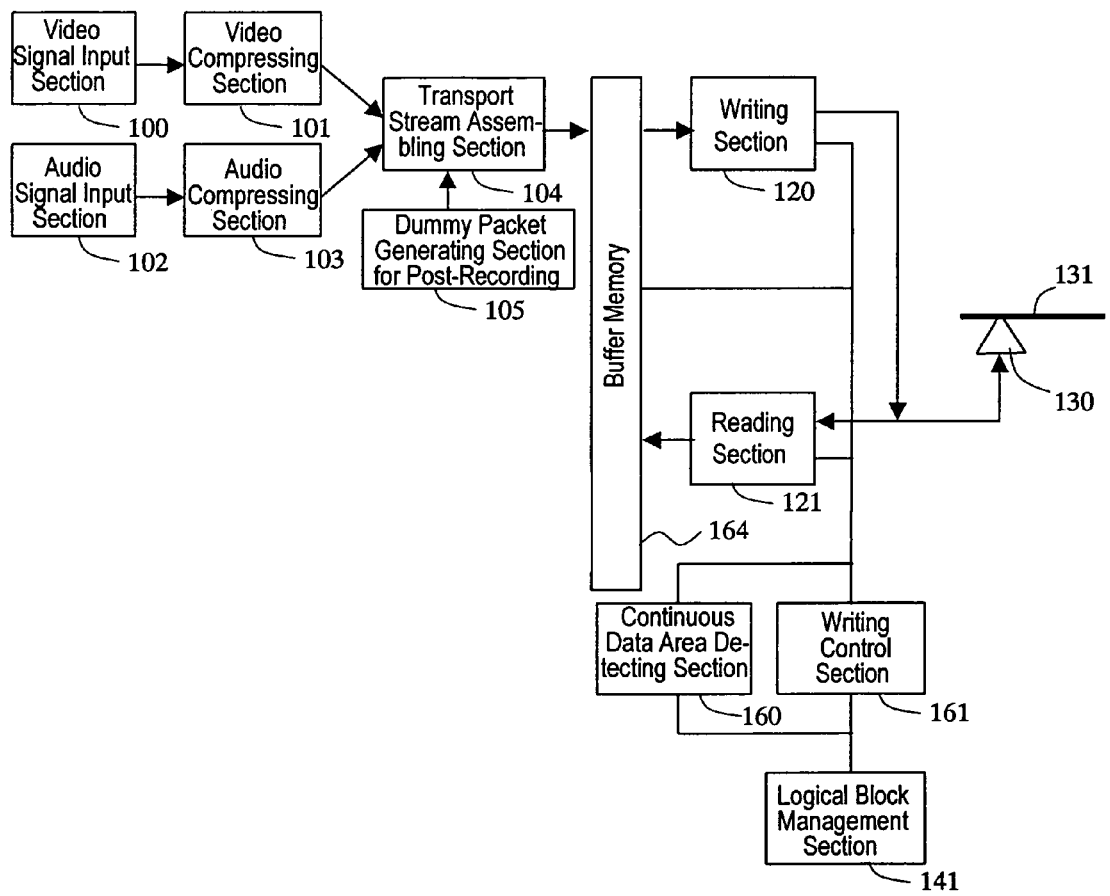
FIG. 5 shows a configuration for a part of the data processor shown in FIG. 4 that performs its recording function.

FIG. 5 shows a configuration for a part of the data processor shown in FIG. 4 that performs its recording function. The data processor includes a video signal input section 100, a video compressing section 101, an audio signal input section 102, an audio compressing section 103, a transport stream assembling section 104, a dummy packet generating section 105, a writing section 120, a reading section 121, a logical block management section 141, a continuous data area detecting section 160 and a writing control section 161.

The video signal input section 100 is a video signal input terminal to receive a video signal representing the video data. The video compressing section 101 compresses and encodes this video signal, thereby generating video data. This compression/encoding process may be carried out so as to comply with MPEG-2 video compression (ISO/IEC 13818-2). The audio signal input section 102 is an audio signal input terminal to receive an audio signal representing the audio data. The audio compressing section 103 compresses and encodes this audio signal, thereby generating audio data. This compression/encoding process may be carried out so as to comply with MPEG2-AAC (advanced audio coding; ISO/IEC 13818-7). The audio signal input section 102 and the audio compressing section 103 are used both in recording the original audio and in recording the substitute audio.

Alternatively, the audio compression method may also be Dolby AC-3 compression or MPEG Audio Layer 2 (ISO/IEC 13818-3).

If the data processor is implemented as a videocassette recorder, for example, then the video signal and audio signal input sections 100 and 102 are respectively connected to the video output section and audio output section of a tuner section (not shown) to receive a video signal and an audio signal from the tuner section. On the other hand, if the data processor is implemented as a movie recorder or a camcorder, then the video signal and audio signal input sections 100 and 102 respectively receive a video signal and an audio signal from the CCD (not shown) and microphone of the camera.

The transport stream assembling section 104 (which will be simply referred to herein as an "assembling section 104") packetizes the compressed and encoded video and audio data into TS packets, thereby generating a transport stream (TS). If the data processor is operating in a recording mode that enables post-recording, the dummy packet generating section 105 generates dummy packets. The dummy packets also count among packets defined for a TS.

As will be described later with reference to FIG. 12, the buffer memory 164 includes a moving picture buffer memory which temporarily stores moving picture data and an audio buffer memory which temporarily stores substitute audio.

Under the instruction of the writing control section 161, the writing section 120 controls the optical head (pickup) 130 and starts writing the video object units (VOBUs) of the TS at the logical block address specified by the writing control section 161. In this case, the writing section 120 divides each VOBU on a 32 KB basis, adds an error correcting code to each unit, and writes it as a single logical block on the optical disk 131. If a VOBU is completely written in the middle of one logical block, then the next VOBU starts being written continuously and seamlessly.

The reading section 121 gets a TS read from the optical disk 131 by the pickup 130, subjects it to A/D conversion and other processes, and outputs respective TS packets.

The logical block management section 141 checks the availability of logical blocks (i.e., whether they are used or unused) by activating the reading section 121, if necessary, to read the space bit map of an UDF (universal disk format) file system stored on the optical disk 131. At the last stage of the recording process, the logical block management section 141 writes the FID and file entry (to be described later) on the file management area on the disk. In this preferred embodiment, the logical block management section 141 reads the space bit map at a time when the apparatus is turned ON. However, during a recording operation in a recording mode that supposes the post-recording, a post-recording operation or a post-recording playback operation, no space bit map needs to be read.

The continuous data area detecting section 160 (which will be simply referred to herein as an "area detecting section 160") checks availability of sectors on the optical disk 131, which is managed by the logical block management section 141, thereby detecting a continuous logical block area available, on which there are a series of unused logical blocks with a total length corresponding to a duration of 2.6 seconds when converted at the maximum read/write rate. Every time anything is written on the logical block basis, the area detecting section 160 notifies the writing section 120 of the logical block number of that logical block area. When the logical block becomes no longer available, the area detecting section 160 notifies the logical block management section 141 of that fact.

The writing control section 161 controls the operation of the writing section 120. More specifically, the writing control section 161 instructs the area detecting section 160 in advance to detect a continuous logical block area available. Thereafter, every time writing is done on a logical block basis, the writing control section 161 notifies the writing section 120 of the logical block number in question. When the logical block has become no longer available, the writing control section 161 notifies the logical block management section 141 of the fact. It should be noted that the writing control section 161 may have the area detecting section 160 detect the size of the continuous available logical block area dynamically.

Figure 6:
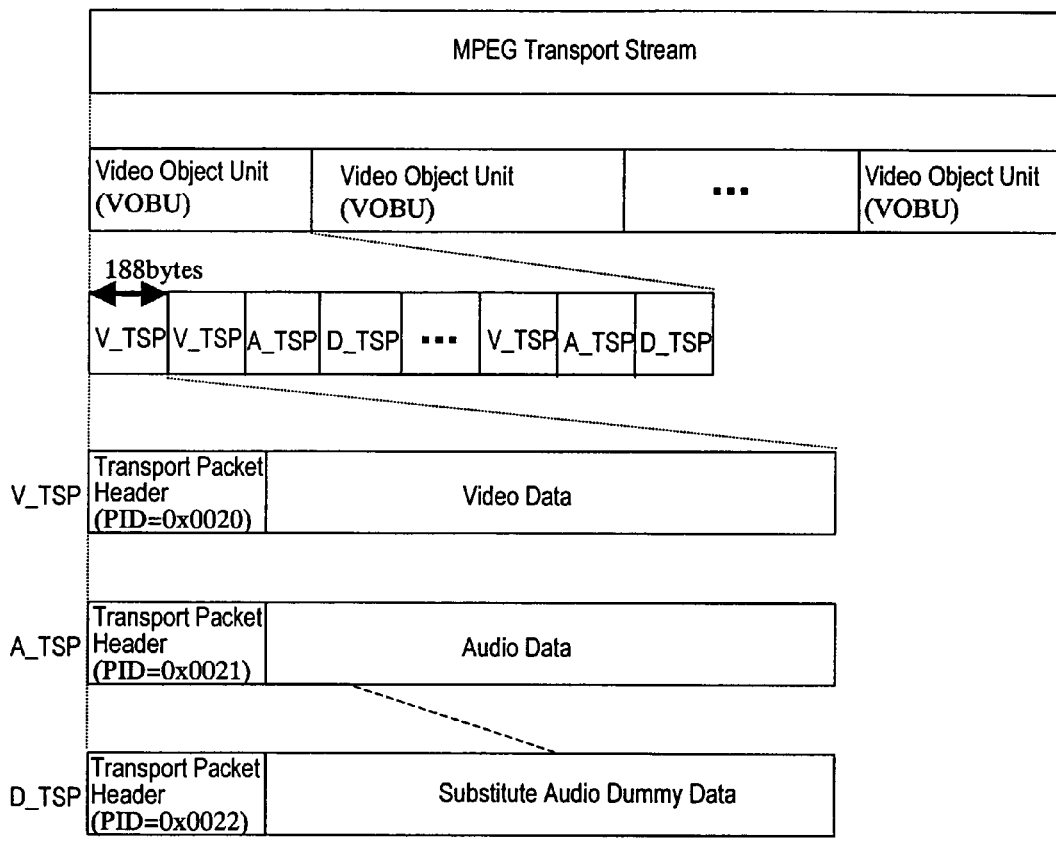
FIG. 6 shows the data structure of an MPEG-TS generated by the data processor.

FIG. 6 shows the data structure of an MPEG-TS generated by the data processor. The TS includes a plurality of video object units (VOBUs) 21, each of which includes at least one TS packet. Each TS packet has a data size of 188 bytes. Examples of those TS packets include a V_TSP in which compressed video data is stored, an A_TSP in which compressed original audio data is stored, and a D_TSP in which substitute audio data will be stored in the future.

The TS packet V_TSP includes a header and video data, the A_TSP includes a header and audio data, and the D_TSP includes a header and substitute audio dummy data. Each of these packets is identified by a packet ID (PID) in its header. In FIG. 6, a PID=0x0020 is allocated to the V_TSP, a PID=0x0021 is allocated to the A_TSP and a PID=0x0022 is allocated to the D_TSP. Examples of other types of TS packets include a packet in which a program association table (PAT) is stored, a packet in which a program map table (PMT) is stored, and a packet in which a program clock reference (PCR) is stored. However, the description and illustration of these packets are omitted herein because these packets do not constitute any important feature of the present invention.

Figure 7:
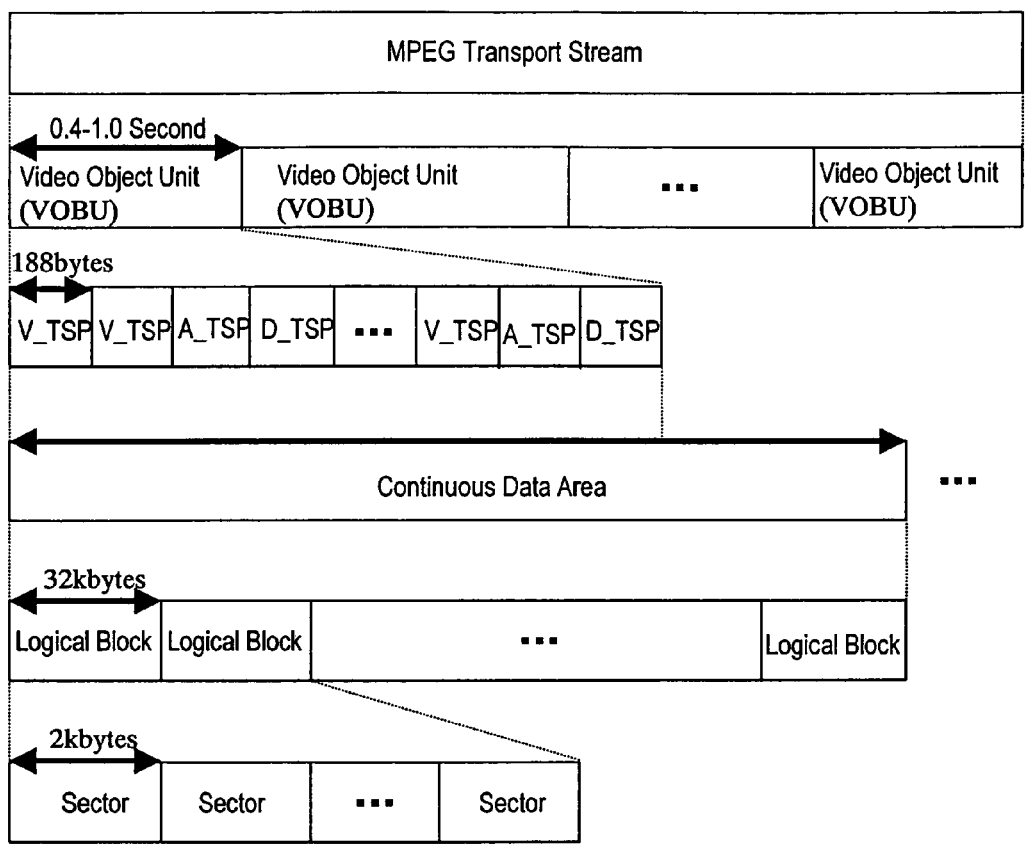
FIG. 7 shows a relationship between the MPEG-TS and the data area of the optical disk 131.

FIG. 7 shows a relationship between the MPEG-TS and the data area of the optical disk 131. Each VOBU of the TS includes data in an amount corresponding to a video playback duration (presentation duration) of about 0.4 second to about 1 second and is written on the continuous data area of the optical disk 131. The continuous data area consists of physically continuous logical blocks and can store data in 10 to 20 seconds in this preferred embodiment when the video data is played back at the maximum rate. The data processor adds the error correction code to each logical block. The data size of each logical block is 32 kilobytes. Each logical block includes sixteen 2 KB sectors.

It should be noted that video and audio can be decoded from only the data stored in a single VOBU as a matter of principle. Also, if the video data has a variable bit rate, the data size of each VOBU is changeable within a range defined by a maximum read/write rate. However, if the video data has a fixed bit rate, the data size of each VOBU is substantially constant.

Figure 8:
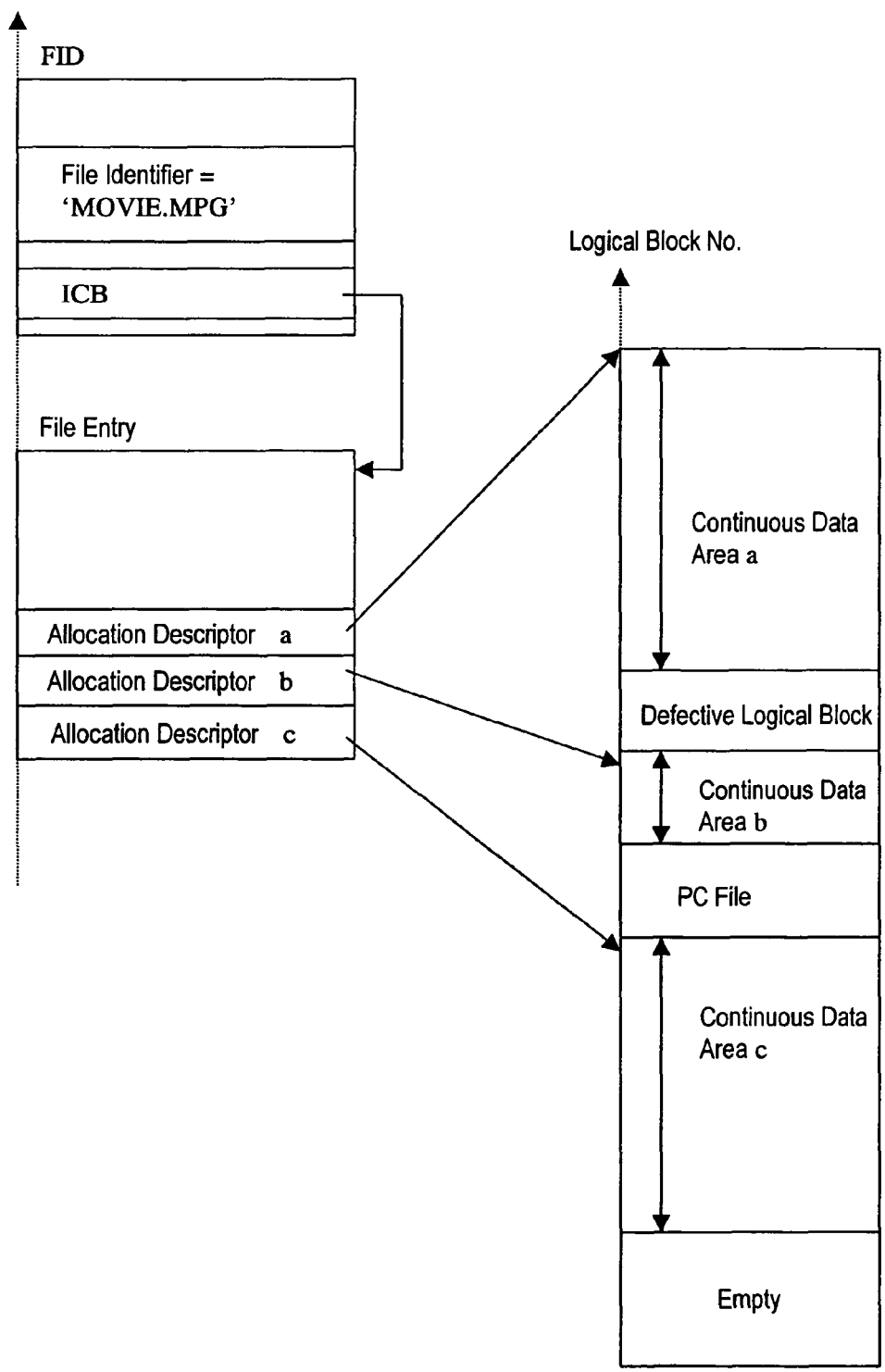
FIG. 8 shows how the data stored is managed by the file system of the optical disk 131.

FIG. 8 shows how the data stored is managed by the file system of the optical disk 131. In this case, either a file system compliant with the UDF standard or a file system compliant with ISO/IEC 13346 (Volume and File Structure of Write-Once and Rewritable Media Using Non-Sequential Recording for Information Interchange) may be used.

Figures 9, 10:
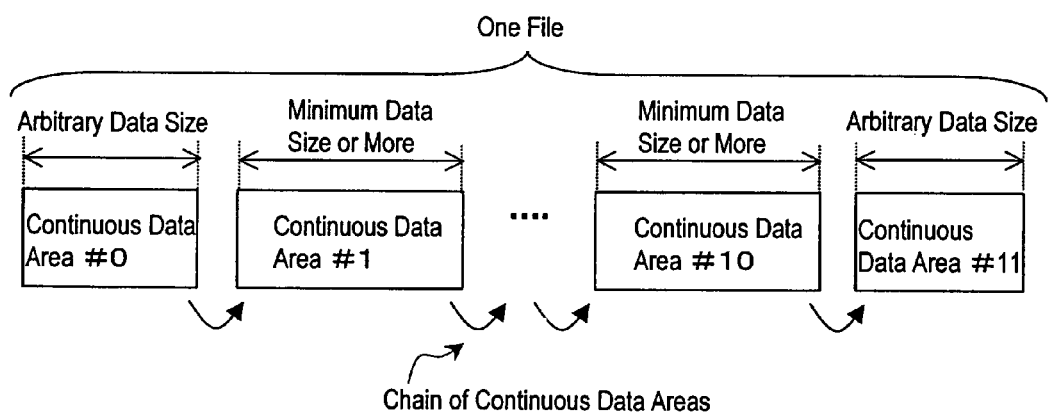
FIG. 9 shows the data structure of each allocation descriptor.
FIG. 10 shows the concept of a relationship between a single file and continuous data areas.

In FIG. 8, the continuously written TS is stored under the file name "MOVIE.MPG". In the file, the TS packet structure is maintained. Each file includes one or two continuous data areas. As the location of the file entry that makes up the file, either a top sector number or a logical block number is defined. The file name and file entry location of this file are managed by a file identifier descriptor (FID). The file name is defined as MOVIE.MPG in the FID and the file entry location is defined as the top sector number of the file entry in the ICB. The file entry includes allocation descriptors a through c for managing the continuous data areas (CDAs) a through c, respectively. FIG. 9 shows the data structure of each allocation descriptor. The allocation descriptor has a field in which extent length is described and a field in which extent position is described.

One file is divided into these multiple areas a through C because there is a defective logical block, a non-writable PC file or something like that in the middle of the area a.

FIG. 10 shows the concept of a relationship between a single file and continuous data areas. The first and last continuous data areas may have arbitrary data sizes. As to the other continuous data areas, however, the minimum length thereof is defined in advance during the write operation and the length of each of those areas is at least equal to that minimum length. The data may be sequentially read out from Area #0, Area #1, . . . and Area #11, for example. The actual reading process involves moving the pickup 130 between those areas. Logically, however, these data may be regarded as continuous data. A logical data structure like this will be referred to herein as a "chain of continuous data areas". When a single chain of continuous data areas represents a single file, seamless continuous playback is guaranteed as will be described later. The process of reading data from such a chain of continuous data areas will be described more fully later.

It should be noted that the size of the first continuous data area becomes equal to or smaller than the minimum data size when a first portion of a moving picture file recorded is deleted. Also, the size of the last continuous data area becomes equal to or smaller than the minimum data size either when the operation of recording a moving picture file is stopped in the middle of the continuous data area or when an end portion of a moving picture file recorded is deleted.

Figure 11:
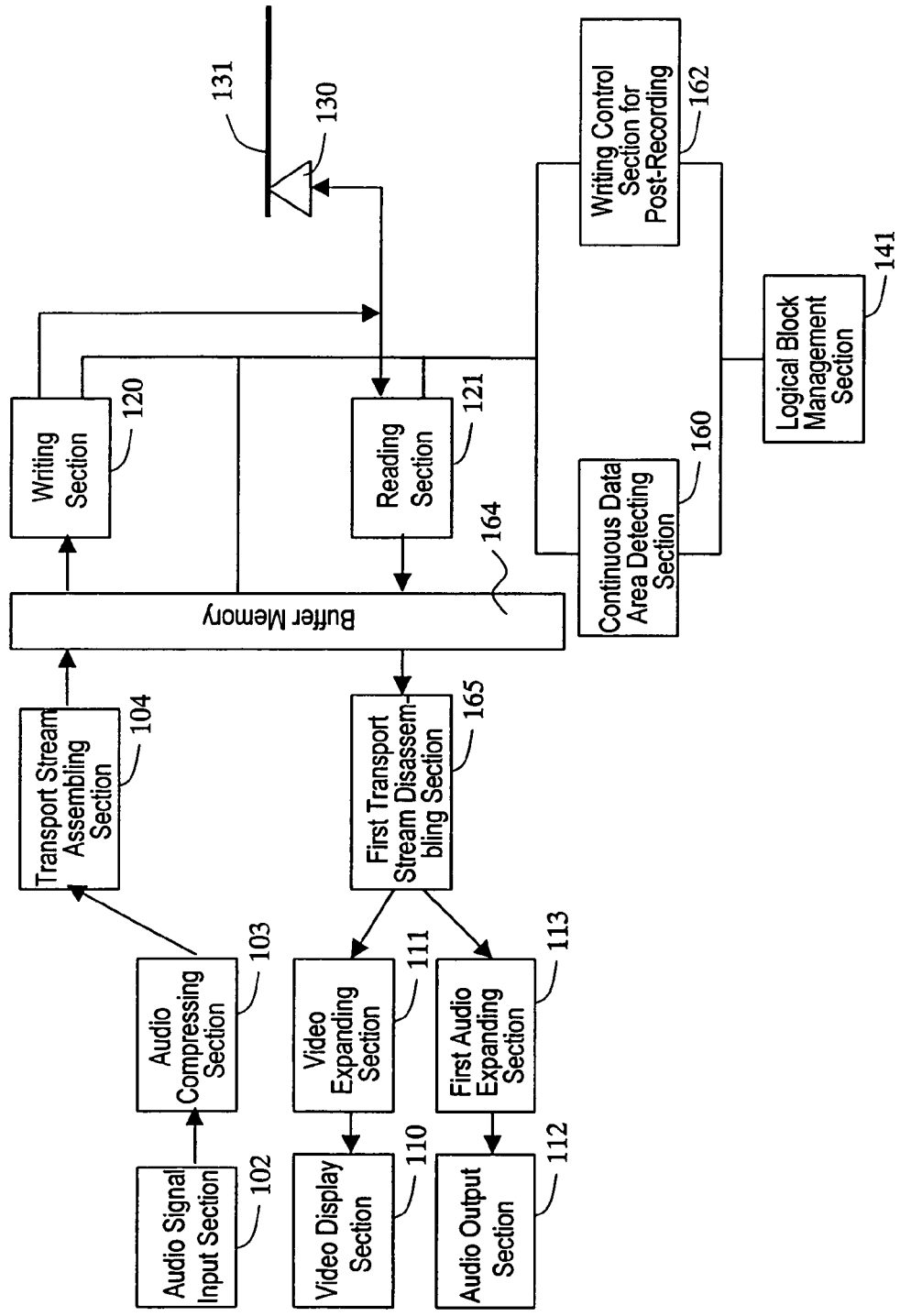
FIG. 11 shows a configuration for a part of the data processor shown in FIG. 4 that performs its post-recording function.

FIG. 11 shows a configuration for a part of the data processor shown in FIG. 4 that performs its post-recording function. Suppose moving picture data has already been stored on the optical disk 131. In order to carry out the post-recording operation, a configuration for playing back video and a configuration for recording substitute audio are newly needed to play back the video data of moving picture data and to record substitute audio synchronously with the video.

The data processor includes a video display section 110, a video expanding section 111, an audio output section 112, a first audio expanding section 113 and a first transport stream disassembling section 165.

The first transport stream disassembling section 165 (which will be simply referred to herein as the "first disassembling section 165") acquires a moving picture stream, stored on the optical disk 131, by way of the pickup 130, reading section 121 and buffer memory 164. Then, the first disassembling section 165 sorts the respective TS packets of the moving picture stream into video data packets V_TSP and audio data packets A_TSP. The video expanding section 111 expands (decodes) the video data and gets the decoded data presented on the video display section 110. The first audio expanding section 113 expands (decodes) the audio data and then outputs it through the audio output section 112. The audio output section 112 and first audio expanding section 113 may be used to switch the original audio into the substitute audio.

The data processor further includes a writing control section 162 for post-recording. The post recording writing control section 162 instructs the playback of video and audio by controlling the transmission line of a moving picture stream stored on the optical disk 131 such that the moving picture stream is processed. At the same time, this writing control section 162 also performs a control operation so as to record the substitute audio. More specifically, under the control of the writing control section 162, the audio compressing section 103 compresses and encodes the substitute audio that has been input through the audio signal input section 102, and the assembling section 104 converts the compressed and encoded substitute audio data into a TS. As a result, the substitute audio data is recorded as a substitute audio file on the optical disk 131 by way of the buffer memory 164, writing section 120 and pickup 130.

Figure 12:
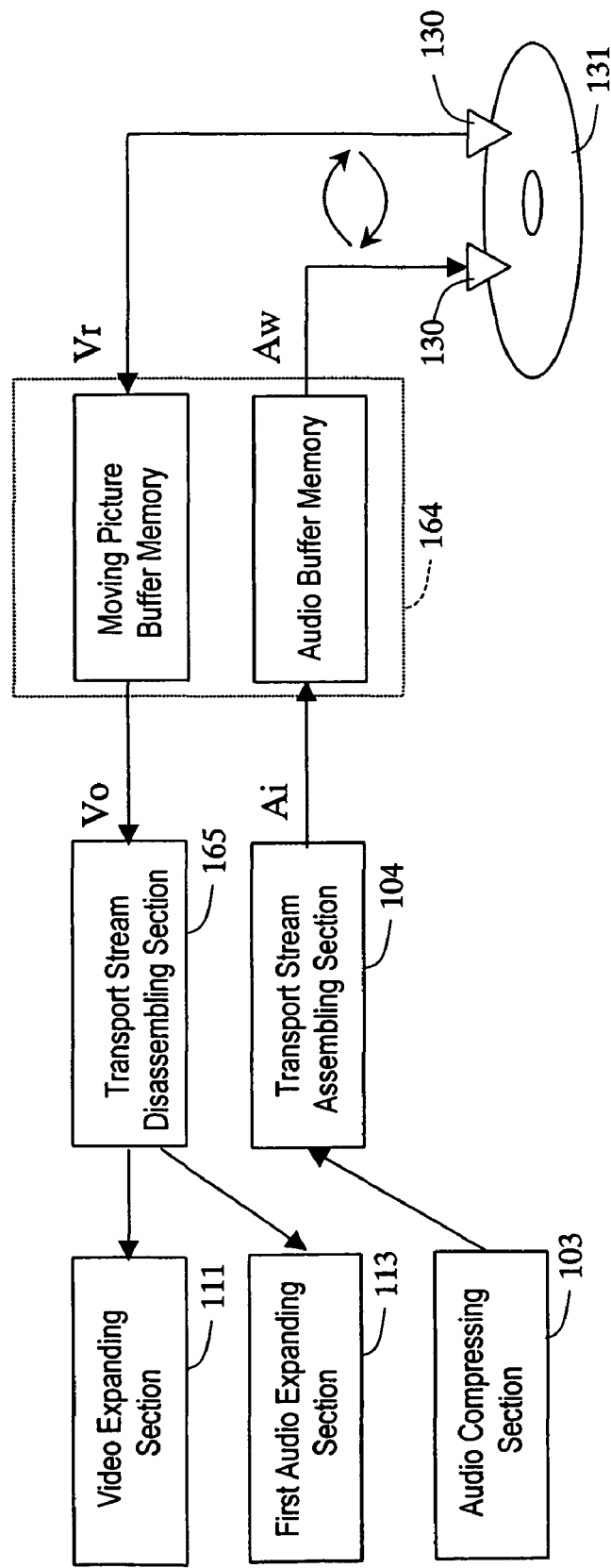
FIG. 12 shows the data flow in the data processor that is performing a post-recording operation.

FIG. 12 shows the data flow in the data processor that is performing a post-recording operation. The moving picture data stream, already stored on the optical disk 131, is retrieved into a moving picture buffer memory in the buffer memory 164 at a transfer rate Vr by way of the pickup 130 and then transferred to the first disassembling section 165 at a transfer rate Vo. In the first disassembling section 165, the moving picture data stream is broken down into video data packets and audio data packets. Then, the video and audio are decoded and played back by the video expanding section 111 and the first audio expanding section 113, respectively. Meanwhile, the substitute audio is converted by the audio compressing section 103 into audio data, which is then input to an audio buffer memory at a transfer rate Ai by way of the assembling section 104. Thereafter, that audio data is written on the optical disk 131 at a transfer rate Aw by way of the pickup 130. Reading of the moving picture data and writing of the audio data are carried out by alternately switching the single pickup 130 by a time division technique. In this case, Vr>Vo and Aw>Ai are supposed to be satisfied.

Figure 13:
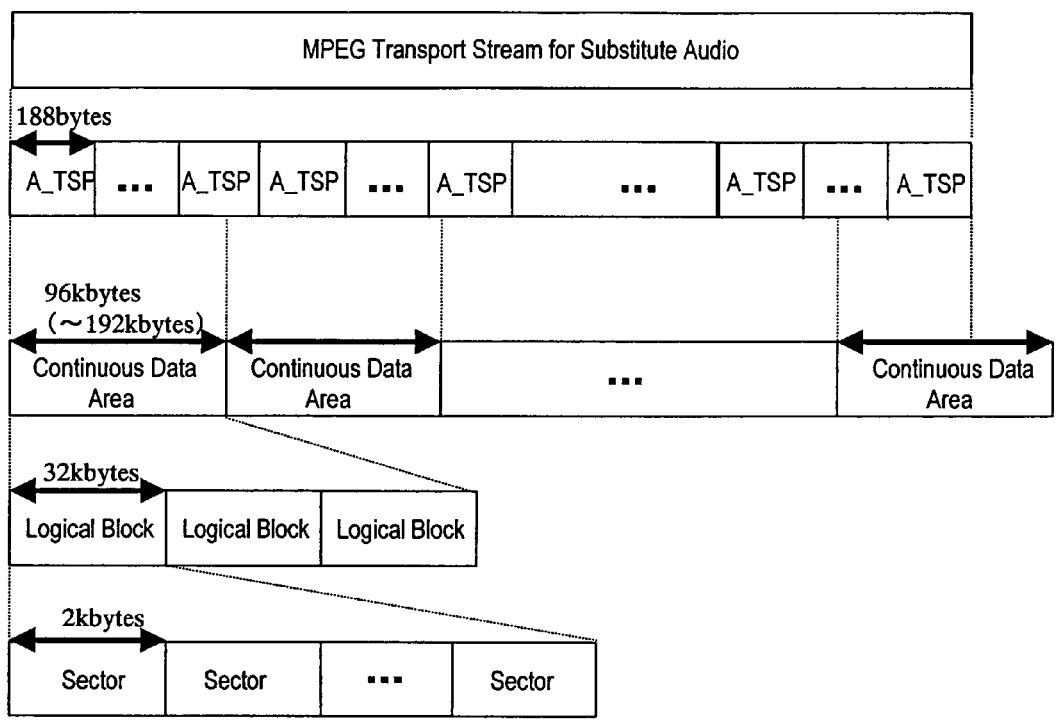
FIG. 13 shows a relationship between the data structure of a TS in the substitute audio data file and the data areas on the optical disk 131.

FIG. 13 shows a relationship between the data structure of a TS in the substitute audio data file and the data areas on the optical disk 131. The TS is made up of TS packets A_TSP including encoded substitute audio data. Each TS packet A_TSP is formed by adding a header to AAC compressed and encoded audio data. On the optical disk 131 on the other hand, a plurality of continuous data areas, each having a size of 96 KB, are defined and the TS file is recorded continuously on those areas. The length may be either fixed at 96 KB or varied within the range of 96 KB to 192 KB, for example. In the latter case, it will be very easy to edit the substitute audio file. Also, the respective areas may be either physically isolated from each other or adjacent to each other. If those areas are adjacent to each other, a series of those areas may be regarded as a single continuous data area. In that case, the data size of the continuous data area will be an integral multiple of the fixed length. It should be noted that this TS file also includes packets that store PAT, PMT and so on (none of which are shown).

Figure 14:
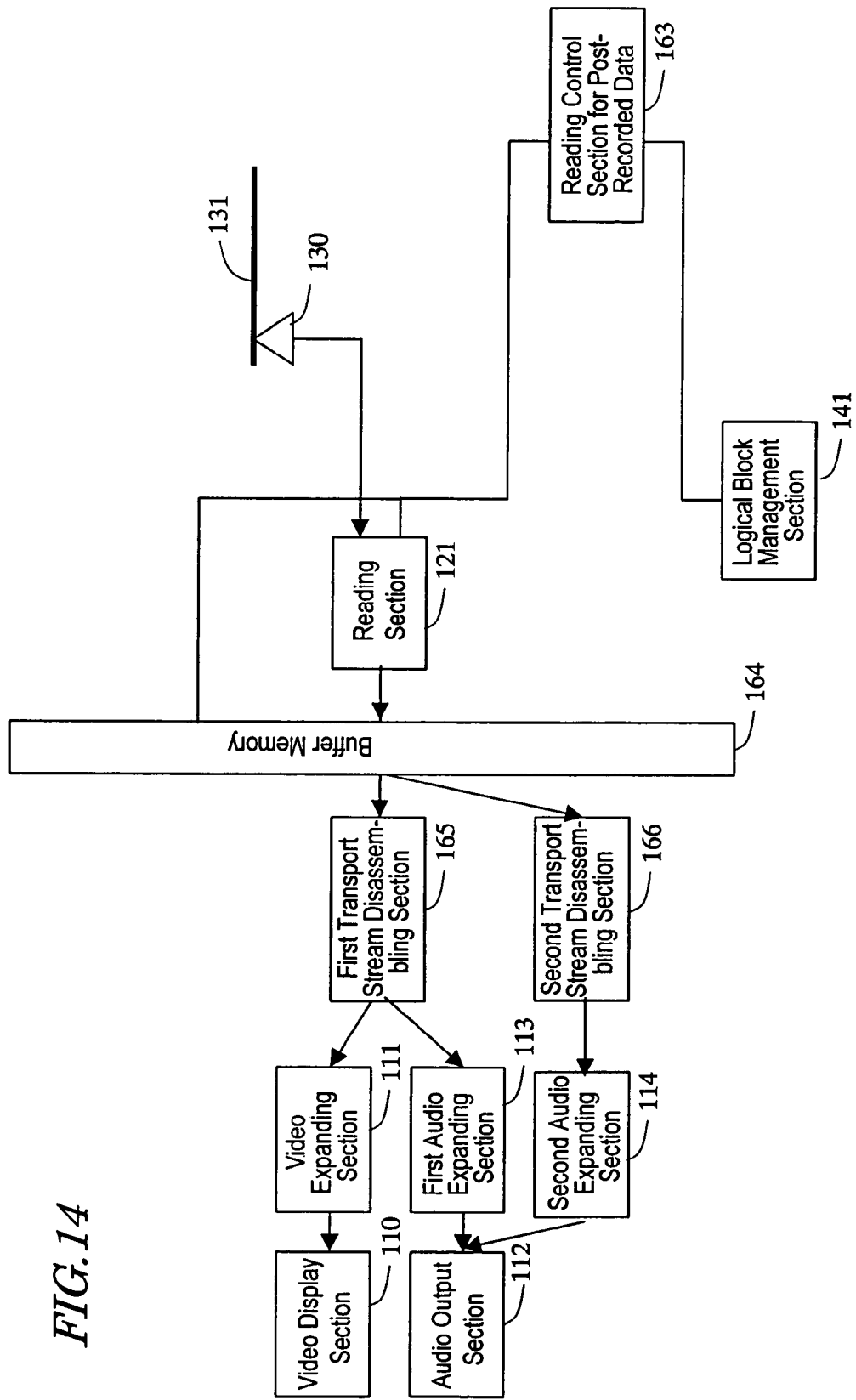
FIG. 14 shows a configuration for a part of the data processor shown in FIG. 4 that performs its playback function.

FIG. 14 shows a configuration for a part of the data processor shown in FIG. 4 that performs its playback function. In this configuration, the description of components also shown in FIG. 11 will be omitted herein. Hereinafter, the second transport stream disassembling section 166 (which will be simply referred to herein as the "second disassembling section 166"), second audio expanding section 114 and a reading control section 163 for reproducing substitute audio will be described.

The second disassembling section 166 acquires TS packets of the substitute audio file from the audio buffer memory in the buffer memory 164 and separates and extracts the substitute audio data from the TS. The second audio expanding section 114 expands (or decodes) that substitute audio data.

The reading control section 163 gets the moving picture file, stored on the optical disk 131, processed by the pickup 130, reading section 121, first disassembling section 165, video expanding section 111 and first audio expanding section 113 and thereby played back as video and original audio. Thereafter, at the timing of reproducing the substitute audio, the reading control section 163 gets the substitute audio file, stored on the optical disk 131, processed and reproduced by the pickup 130, reading section 121, second disassembling section 166 and second audio expanding section 114. The logical block management section 141 manages the storage location of the target TS file on the optical disk 131.

Figure 15:
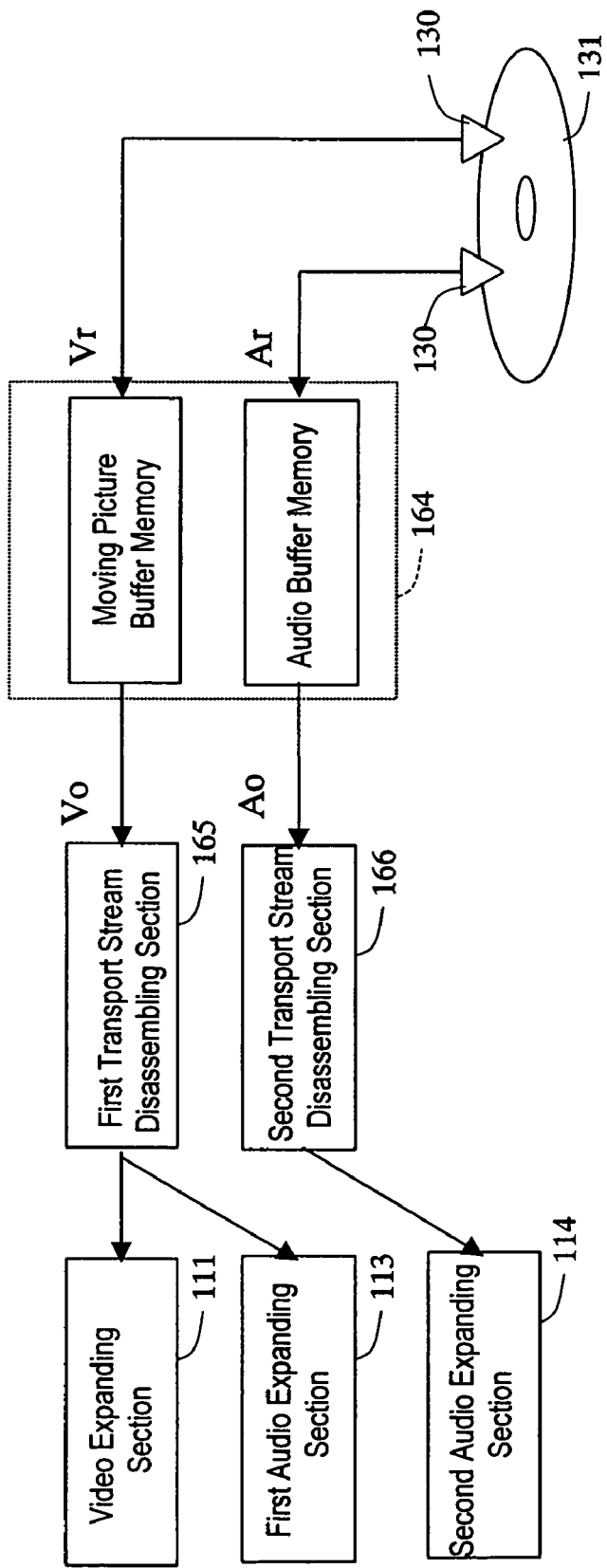
FIG. 15 shows the data flow in the data processor that is reproducing the substitute audio that was stored by the post-recording operation.

FIG. 15 shows the data flow in the data processor that is reproducing the substitute audio that was stored by the post-recording operation. The moving picture data, already stored on the optical disk 131, is retrieved into the moving picture buffer memory at the transfer rate Vr by way of the pickup 130, transferred to the disassembling section 165 at the transfer rate Vo and then played back as video and audio by the video expanding section 111 and first audio expanding section 113, respectively. On the other hand, the substitute audio data, already stored on the optical disk 131, is input to the audio buffer memory at the transfer rate Ar by way of the pickup 130, transferred to the disassembling section 166 at the transfer rate Ao and then reproduced as substitute audio by the second audio expanding section 114. In this case, Vr>Vo and Ar>Ao are supposed to be satisfied.

Figure 16:
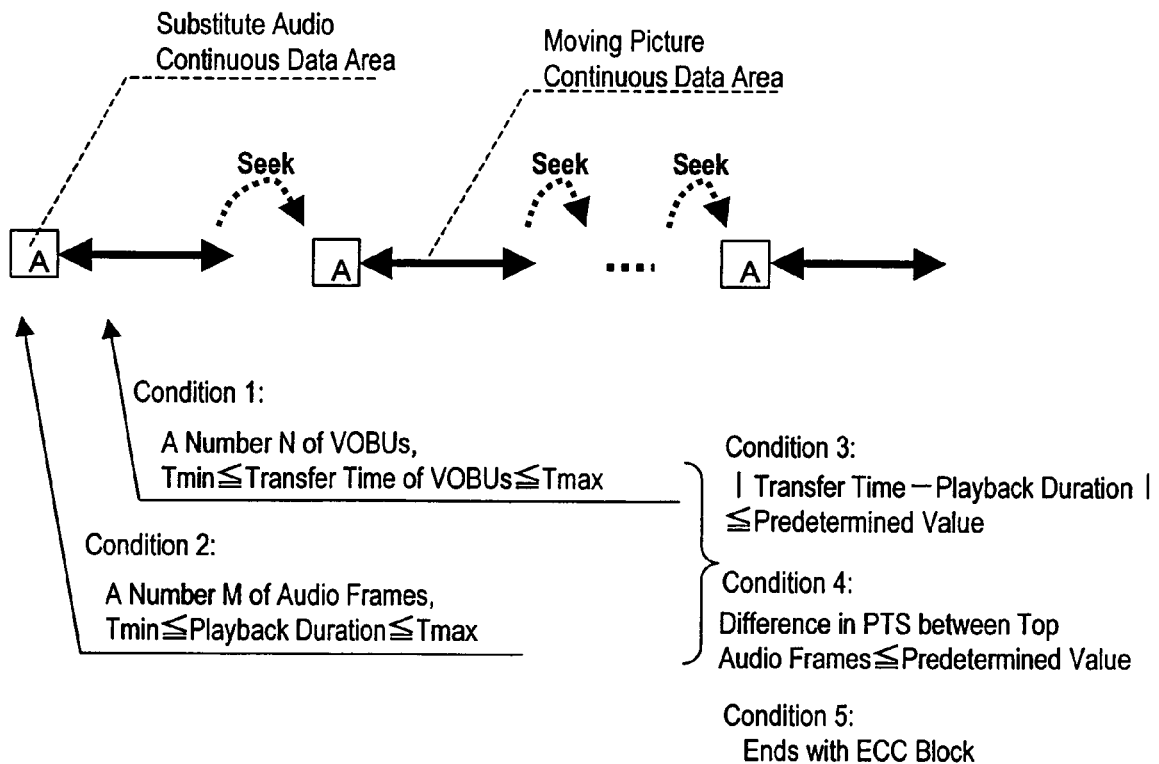
FIG. 16 shows exemplary recording rules to follow in recording a moving picture file and a substitute audio file alternately.

FIG. 16 shows exemplary recording rules to follow in recording a moving picture file and a substitute audio file alternately (i.e., by an interleaving technique). Each continuous data area for moving pictures includes an integral number (N) of VOBUs to be transferred in an amount of time that is equal to or longer than Tmin but shorter than Tmax (which will be referred to herein as "Condition 1"). Likewise, the substitute audio data includes an integral number of audio frames to be played back in an amount of time that is equal to or longer than Tmin but shorter than Tmax (which will be referred to herein as "Condition 2"). The transfer time of the moving picture is substantially equal to the playback duration of the audio frames and their difference is equal to or smaller than a predetermined value (which will be referred to herein as "Condition 3"). Furthermore, the playback timing (e.g., the PTS) of the top of the moving picture is substantially equal to that of the top audio frame and their difference is equal to or smaller than a predetermined value of one frame or less, for example (which will be referred to herein as "Condition 4"). The respective ends of each substitute audio continuous data area and moving picture continuous data area are both aligned with the end of an ECC block (which will be referred to herein as "Condition 5"). The minimum length of the moving picture continuous data areas is selected as Tmin such that a separate area can be provided as the audio continuous data area by the non-interleaving technique (e.g., so as to satisfy Equation (7)). As a result, not just post-recording by the non-interleaving technique but also post-recording by the interleaving technique can be carried out as well.

As another alternative, Tmin may also be defined such that while video and audio are played back synchronously with each other by the non-interleaving technique, the substitute audio data, recorded by the interleaving technique, can also be reproduced.

Figure 17:
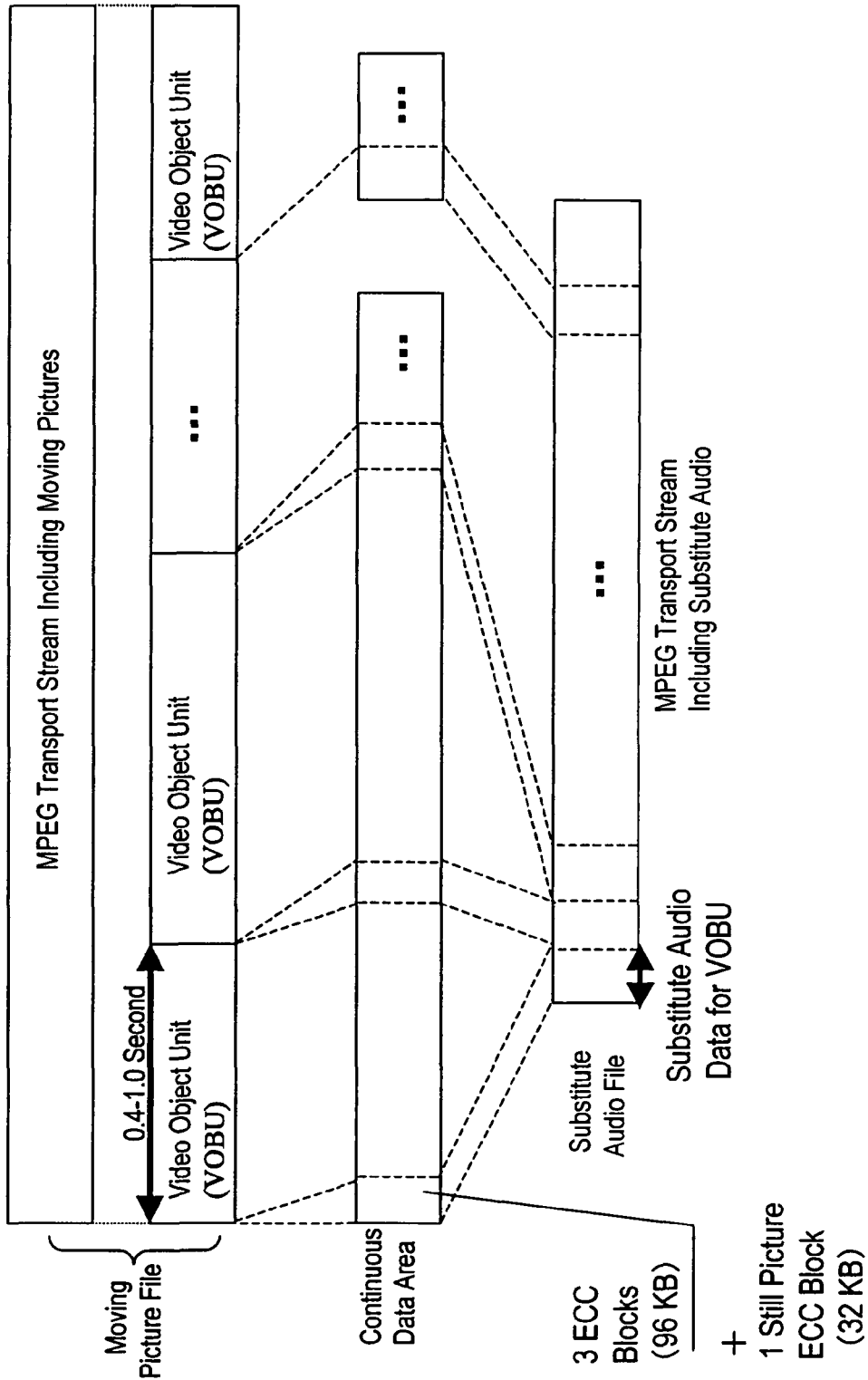
FIG. 17 shows the data structure of a TS including moving picture data and substitute audio data.

FIG. 17 shows the data structure of a TS including moving picture data and substitute audio data. This is another example in which the substitute audio data is recorded by the interleaving technique. Each continuous data area of the substitute audio file is arranged physically just before the continuous data area of its associated VOBU of the moving picture file. In this case, in a single substitute audio continuous data area, substitute audio data, associated with the VOBU that should follow that continuous data area immediately, is stored. Each continuous data area for substitute audio data consists of three ECC blocks. Two out of the three ECC blocks (i.e., 64 KB in total) are used for audio data of 1 second. The other ECC block (32 KB) is used as a reserve for defective blocks that possibly generates. As a result, during the synchronous playback, random access can be easily done on a VOBU basis by reading data from the top of the substitute audio data. Consequently, the amount of the moving picture file to read continuously for the purpose of reading data seamlessly while video and substitute audio are being played back synchronously with each other can be reduced to one-third compared to the conventional technique. If a number of scenes, picked by the user arbitrarily, should be played back continuously, seamless supply of data to the video expanding section 111 and audio expanding sections 113 and 114 is guaranteed. Optionally, one more ECC block (32 KB) may be added to the continuous data area of the substitute audio data so as to store still picture data, for example, to overlap with the moving picture file being played back as will be described later.

Next, it will be described how the video data and substitute audio data get stored on the optical disk 131 by following the operations of the pickup 130 sequentially.

Figure 18:
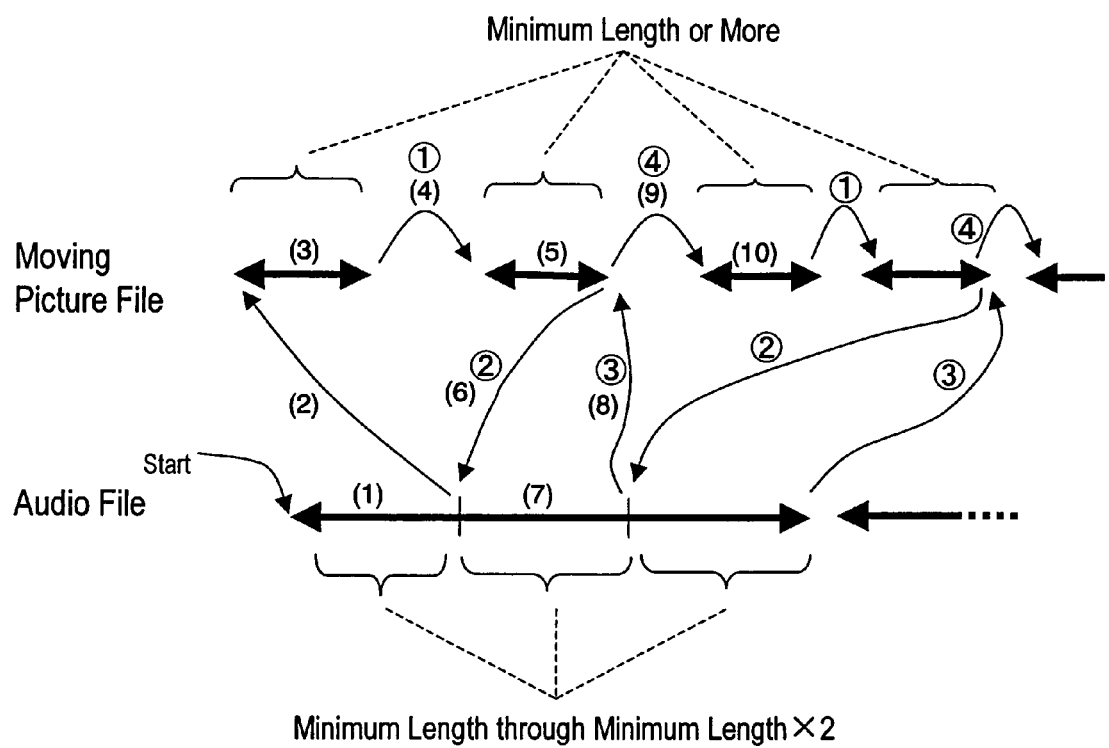
FIG. 18 shows the order of operations to be done by the pickup 130 in playing back video and substitute audio synchronously with each other.
Figure 19:
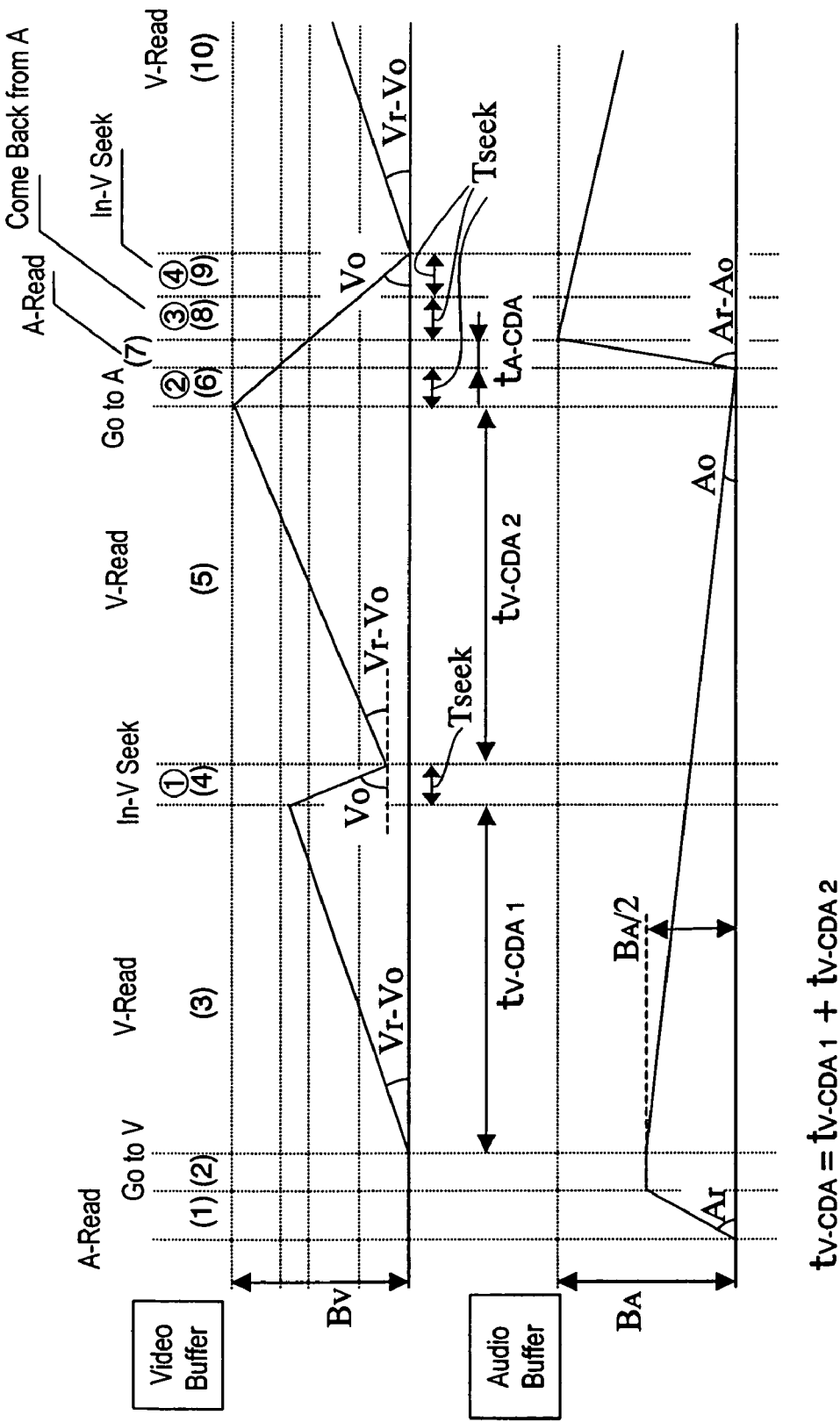
FIG. 19 shows how the respective code densities of the video data and substitute audio data (i.e., the amounts of these two types of data) change in the buffer memory 164 with time.

FIG. 18 shows the order of operations to be done by the pickup 130 in playing back video and substitute audio synchronously with each other according to an interleaved pickup jump model. FIG. 19 shows how the respective code densities of the video data and substitute audio data (i.e., the amounts of these two types of data) change in the buffer memory 164 with time. The numbers (1), (2) and so on shown in FIG. 19 correspond to their counterparts shown in FIG. 18. Likewise, the encircled numbers shown in FIG. 19 also correspond to their counterparts shown in FIG. 18.

Figure 20:
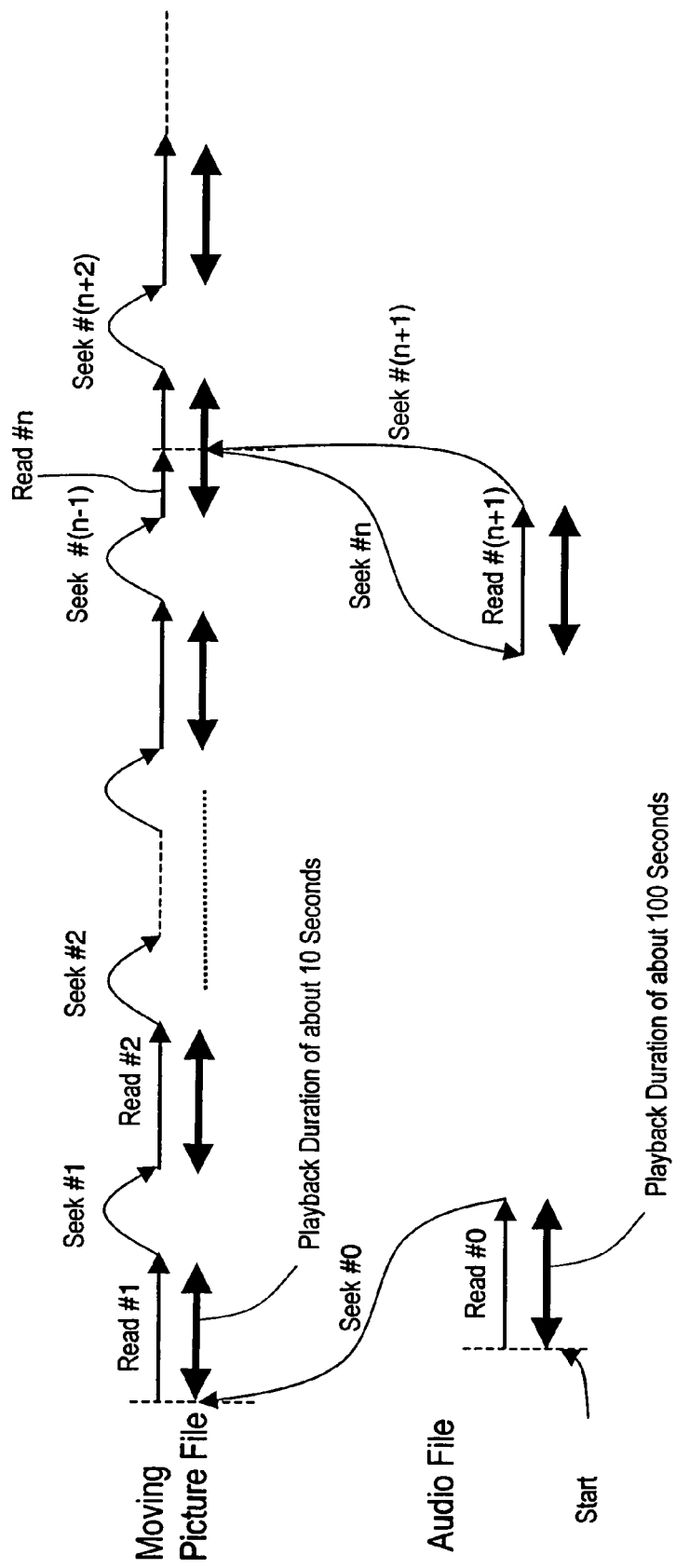
FIG. 20 shows a more detailed order of operations to be done by the pickup 130 in playing back video and substitute audio synchronously with each other.

FIG. 20 shows a more detailed order of operations to be done by the pickup 130 in playing back video and substitute audio synchronously with each other. One of the prominent features of this preferred embodiment is setting the data length of the continuous data area shorter than the conventional one. However, if the data length is just decreased, then the amount of storable data will run short with respect to video data to read at a high rate, in particular. For that reason, by providing an increased number of continuous data areas for the moving picture data to read, the required amount of data can be stored in the buffer memory 164 just as intended. As a result, the video can be played back seamlessly even during a seek operation, in which the pickup goes to and comes back from the continuous data area of the substitute audio data, or during a read operation.

Hereinafter, it will be described specifically how the pickup 130 operates. First, the pickup 130 reads a certain amount of substitute audio data from the storage location of the audio file on the optical disk 131 (Read #0). This amount of data is at least equal to the minimum data length of the substitute audio continuous data areas but less than twice as large as the minimum data length.

Thereafter, the pickup 130 seeks the storage location of the moving picture file (Seek #0), and reads the video data (Read #1). Once the video data has started being read, the video playback apparatus begins to present the video and output the substitute audio. In this process step, the amount of the video data being read is equal to or greater than the data length of a single continuous data area.

On finishing Read #1, the pickup 130 seeks the next continuous data area of the moving picture file (Seek #1) and reads the video data continuously (Read #2). In this manner, the pickup 130 repeatedly performs the seek operation and read operation on the continuous data areas of the video data. As a result, the amount of the video data in the buffer memory 164 increases gradually.

When the required video data has been read (Read #n), the pickup 130 will re-start reading the substitute audio data again. That is to say, by performing the $n^{th}$ seek operation, the pickup 130 seeks the continuous data area of the next substitute audio data and reads the substitute audio data from that area (Read #(n+1)). Thereafter, the pickup 130 seeks, and returns to, the location of the previous continuous data area (Seek #(n+1)).

Suppose a worst case in which it takes the longest time to read video data or audio data. More specifically, each area of the moving picture data is supposed to have the smallest data size and the data stored at that location of the moving picture file, to which the pickup 130 has returned as a result of Seek #(n+1), is supposed to be the last sector of the continuous data area, for example. In that case, the pickup 130 performs a seek operation until its reaches the next video data (Seek #(n+2)) and then reads video data from the next continuous data area.

Figure 21:
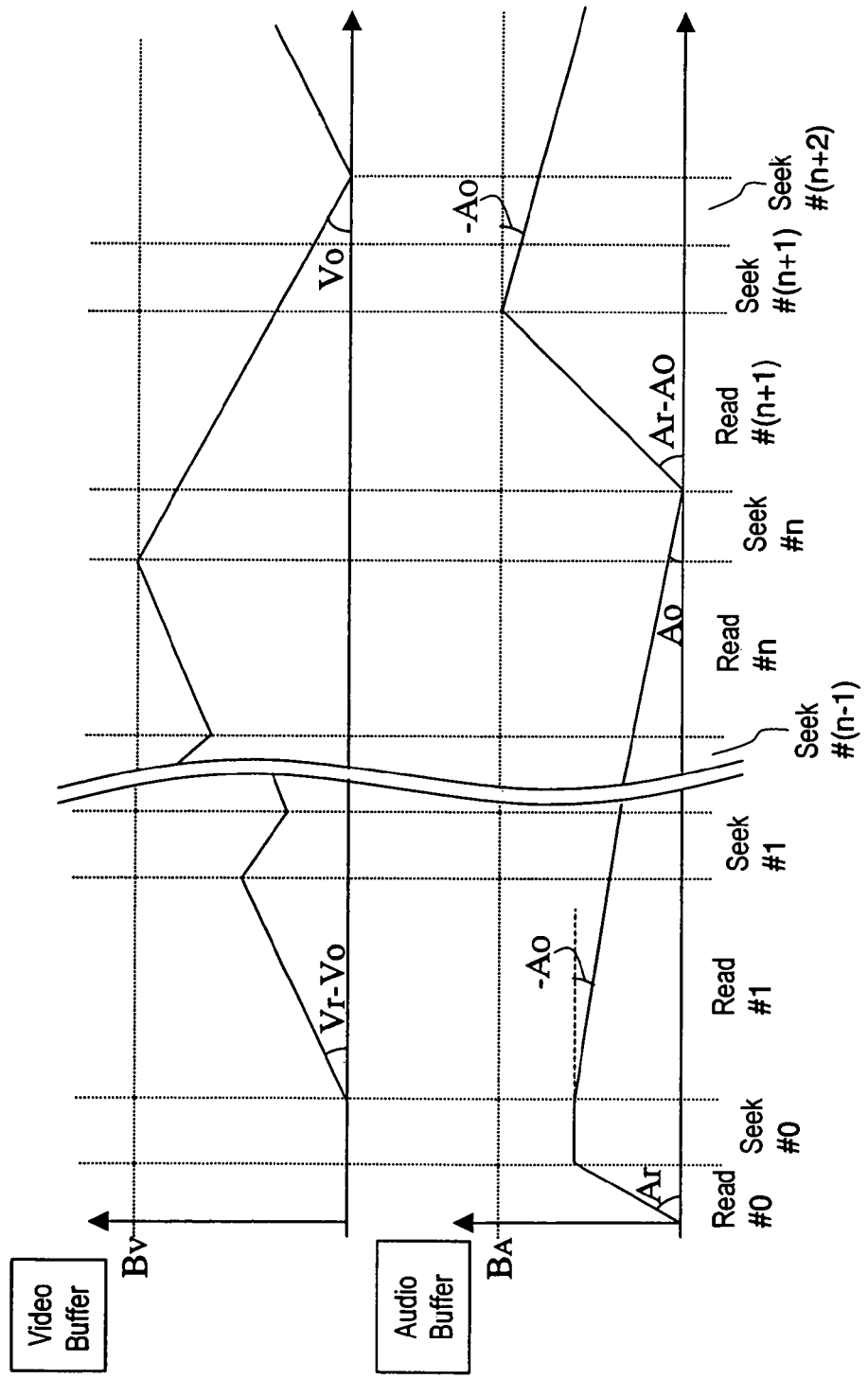
FIG. 21 shows how the respective code densities of the video and substitute audio data (i.e., the amounts of those data) change with time in the buffer memory 164.

FIG. 21 shows how the respective code densities of the video and substitute audio data (i.e., the amounts of those data) change with time in the buffer memory 164 in that worst case. First, look at the audio buffer. After the video data has started being read in Read #1 and until Seek #n is finished, the substitute audio data is not read at all but just reproduced. Accordingly, the amount of data in the audio buffer decreases proportionally to the data transfer rate Ao during that reproduction.

Next, look at the video buffer. When the video data starts being read at the beginning of Read #1, the video and substitute audio start being played back. The amount of the video data in the video buffer increases at a rate that is equal to the difference (Vr−Vo) between the data transfer rate Vr during reading and the data transfer rate Vo during playback. While Seek #1 is being performed, the data reading is suspended and therefore the amount of the video data decreases proportionally to the playback rate Vo. When reading is resumed, the amount of the video data starts to rise again at the rate (Vr−Vo). Thereafter, when the amount of data in the audio buffer approaches zero at the end of Read #n, Seek #n is carried out to read the audio data. Subsequently, after Seek #(n+1), reading data from one sector and Seek #(n+2) have been performed, video data starts being read again and the amount of data in the video buffer begins to increase. In the following description, this series of operations from Read #1 through Seek #(n+2) will be regarded as one period.

According to FIGS. 20 and 21, the following equations are derived:

$$(V_r - V_o)t_{V\text{-}CDA} = V_o \times ((n+2) \times T_{SEEK} + t_{A\text{-}CDA}) \quad (16)$$

$$(A_r - A_o)t_{A\text{-}CDA} = A_o \times ((n+2) \times T_{SEEK} + t_{V\text{-}CDA}) \quad (17)$$

where $t_{V\text{-}cda}$ is the read time for moving picture continuous data areas in one period, $t_{A\text{-}CDA}$ is the read time for substitute audio continuous data areas in one period, and $T_{SEEK}$ is the longest seek time (i.e., the amount of time it takes to perform a seek operation from the innermost location on the optical disk 131 to the outermost location thereof, or vice versa).

As is clear from FIGS. 20 and 21, the substitute audio data is read only once a period (in Read #(n+1)) and therefore $t_{A\text{-}CDA}$ corresponds with the maximum read time of Read #(n+1).

The left side of Equation (16) represents the amount of the video data to be stored in the video buffer in a situation where it takes the longest time to do so. On the other hand, the right side of Equation (16) represents the amount of the video data required to realize the synchronous playback of the video data. As can be seen from Equation (16), the amount of the video data to be stored in the video buffer just needs to be large enough to play back the video in the total amount of time it takes to perform the seek operation (n+2) times and in the time it takes to read the substitute audio data only once.

The left side of Equation (17) represents the amount of the substitute audio data to be stored in the audio buffer. On the other hand, the right side of Equation (17) represents the amount of the substitute audio data required to realize the synchronous playback of the substitute audio data. As can be seen from Equation (17), the amount of the substitute audio data to be stored in the audio buffer just needs to be large enough to reproduce the audio in the total amount of time it takes to perform the seek operation (n+2) times and in the time it takes to read the video data.

The following Equations (18) and (19) can be derived from Equations (16) and (17):

$$t_{A\text{-}CDA}=2\times(n+2)\times T_{SEEK}\times A_o/(V_r-V_o-A_o-A_o\times V_o/V_r) \quad (18)$$

$$t_{V\text{-}CDA}=(V_o/(V_r-V_o))\times((n+2)\times T_{SEEK}+t_{A\text{-}CDA}) \quad (19)$$

In this case, the minimum data length $S_{V\text{-}CDA}$ of the moving picture continuous data areas is given by:

$$S_{V\text{-}CDA}=t_{V\text{-}CDA}\times V_r/n \quad (20)$$

and the minimum data length $S_{A\text{-}CDA}$ of the substitute audio continuous data areas is given by:

$$S_{A\text{-}CDA}=(t_{A\text{-}CDA}/2)\times A_r \quad (21)$$

According to Equation (20), the minimum length $S_{V\text{-}CDA}$ of the moving picture continuous data areas is supposed to be long enough to store the moving picture data in an amount of time (a+b)/n, where (a) is the sum of the amount of time it takes to perform the seek operation twice to read the audio data in advance and the amount of time it takes to actually read that audio data and (b) is the total amount of time it takes to perform the seek operation n times. On the other hand, the minimum length $S_{A\text{-}CDA}$ of the substitute audio continuous data areas is supposed to be long enough to store the substitute audio data in an amount of time (c+d), where (c) is the sum of the amount of time it takes to perform the seek operation twice to read the video data in advance and the amount of time it takes to actually read that video data and (d) is the total amount of time it takes to perform the seek operation between a number n of video continuous data areas. As n is increased, $S_{V\text{-}CDA}$ can be decreased. Meanwhile, since $t_{A\text{-}CDA}$ increases with n, $S_{A\text{-}CDA}$ increases, too.

The respective variables in Equations (20) and (21) can be defined in advance while the moving picture data and the substitute audio data are written. Thus, the writing control section 162 of the data processor determines the minimum value $S_{V\text{-}CDA}$ of the moving picture continuous data areas and the minimum value $S_{A\text{-}CDA}$ of the substitute audio continuous data areas by Equations (20) and (21). If the moving picture is recorded in a non-interleaving post-recording mode, this writing control section 162 instructs the area detecting section 160 to search for continuous data areas, of which the lengths are at least equal to that minimum value, and reserves those areas. Thereafter, the writing control section 162 instructs the writing section 120 to store the moving picture data first and then the substitute audio data.

In this example, supposing $T_{SEEK}$=1.2 second, Vo=15.57 Mbps, Ao=0.256 Mbps, Vr=20 Mbps and n=7, the minimum value of the video continuous data areas corresponds to 7.9 seconds ($t_{V\text{-}play}$), the minimum value of the audio continuous data areas corresponds to 54.3 seconds ($t_{A\text{-}play}$), the video data size becomes 15.3 megabytes ($S_{V\text{-}CDA}$), the audio data size becomes 1.7 megabytes ($S_{A\text{-}CDA}$), the video buffer size becomes 77.7 megabits, and the audio buffer size becomes 27.5 megabits. Tradeoff is inevitable between the sum of the video buffer size and audio buffer size and the minimum length of the continuous data areas and n was selected such that the memory size would fall within a practical range.

In this preferred embodiment, by further taking a defect rate in the continuous data areas and a delay caused by a decoder model into consideration, the minimum data length of the continuous data areas for moving picture data is set to about 10 seconds when represented by a playback duration. Also, as to the substitute audio data, the minimum data length thereof is defined so as to store an amount of data corresponding to a playback duration of about 100 seconds in view of the accumulated delay of the moving picture data in a situation where an interleaved substitute audio data area is provided.

In the prior art, the minimum data length for moving picture data needs to correspond to a playback duration of at least 22 to 23 seconds. Compared to this length, the minimum data length can be shortened significantly according to this preferred embodiment. As a result, a play list can be made so as to have any combination of a practical time length of about 10 seconds. Also, even if a lot of short unused data areas are created by editing moving pictures, for example, it is still rather easy to reserve continuous data areas. In this preferred embodiment, a substitute audio continuous data area corresponding to a playback duration of about 100 seconds needs to be reserved. However, this will make no big difference because the amount of audio data is usually much smaller than that of moving picture data and because those advantages are achieved on the moving picture data.

The minimum length of continuous data areas for moving pictures is supposed to be 10 seconds. However, in making virtual editing, continuous playback may be guaranteed even if shorter continuous data areas are selected. This is because a required amount of data has only to be stored while the data is being read from seven continuous data areas. Accordingly, even if some of those continuous data areas were short but if others were long enough to cover the deficit, continuous playback would still be guaranteed. Even so, at least one of the continuous data areas has to be long enough to store the read data in the longest time it takes to perform a single seek operation.

In the foregoing description, the data stream is supposed to be a transport stream. However, the present invention is similarly applicable to a situation where the data stream is a program stream.

Figure 22:
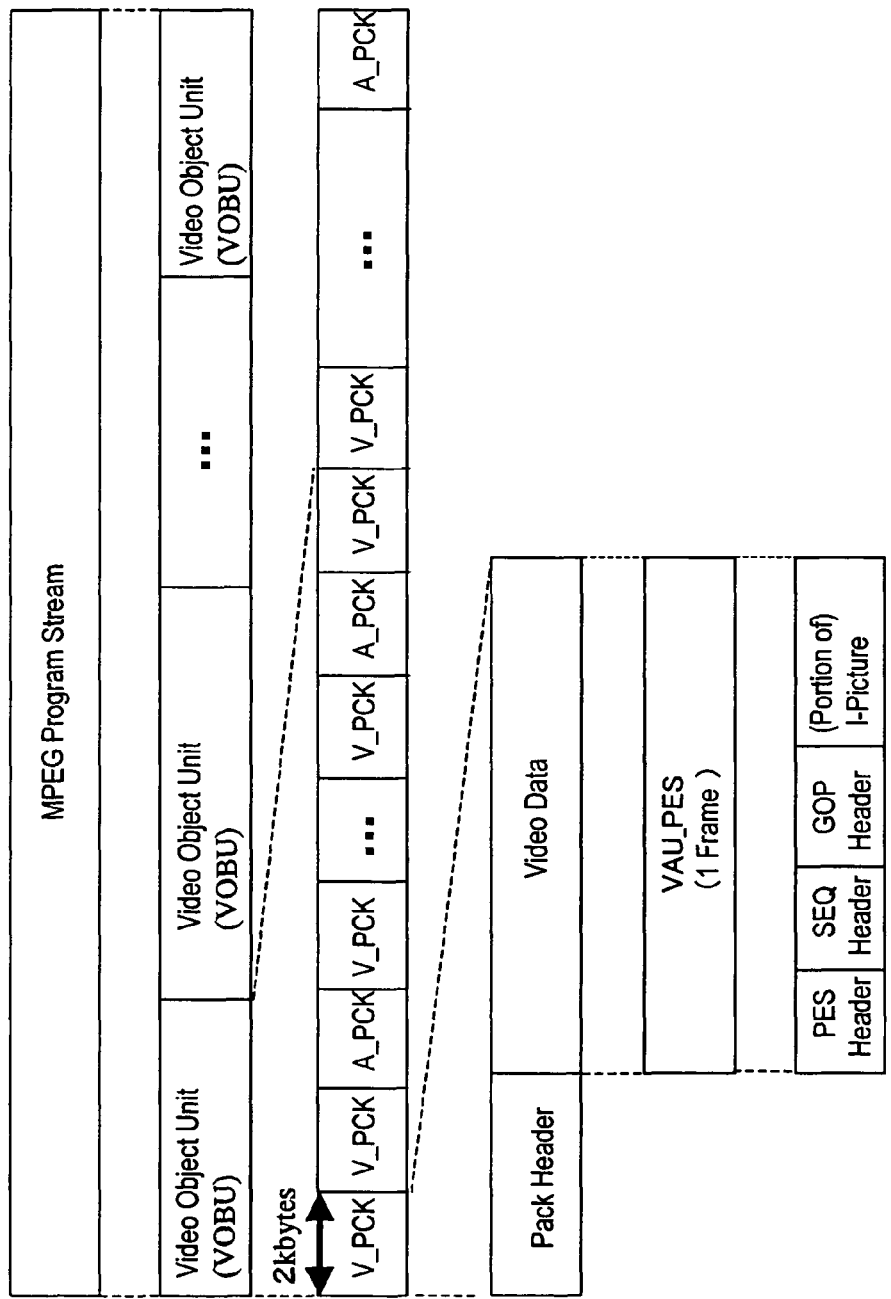
FIG. 22 shows the data structure of a program stream.

FIG. 22 shows the data structure of a program stream. This program stream complies with the DVD-VR standard and includes a plurality of video object units (VOBUs). Each VOBU includes a plurality of video packs V_PCK in which video data is stored and a plurality of audio packs A_PCK in which audio data is stored. A "pack" is generally known as an exemplary form of a packet.

Each VOBU begins with either V_PCK including a sequence header or RDI_PCK compliant with the DVD-VR standard. Each video pack V_PCK contains data corresponding to a playback duration of 0.4 to 1.0 second and consists of a pack header and compressed video data. The video data is further subdivided into data of I-, P- and B-frames. In the example shown in FIG. 22, part of an I-frame is stored as the top portion of the video data. In an audio pack A_PCK on the other hand, the video data of a video pack is replaced with audio data. If the video data has a variable bit rate, the data size of each VOBU is changeable within a range defined by a maximum read/write rate. However, if the video data has a fixed bit rate, the data size of each VOBU is substantially constant.

The example shown in FIG. 22 is a program stream representing moving picture data. In a VOBU of a program stream representing substitute audio data, however, no video packs are included but only audio packs A_PCK are included. Alternatively, the substitute audio data may constitute an elementary stream.

Figure 23:
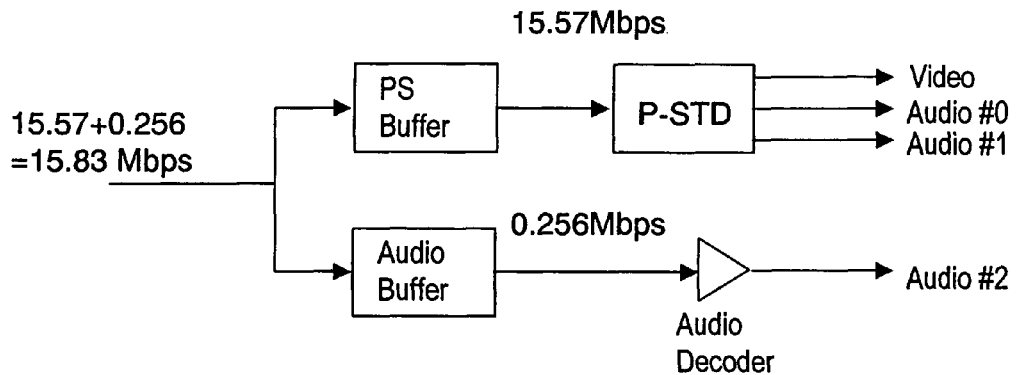
FIG. 23 shows a decoder model for video data and audio data that have been stored by an interleaving technique.

FIG. 23 shows a decoder model for reading moving picture data and audio data that have been stored by an interleaving technique. This model corresponds to the functional blocks shown in FIG. 15. In FIG. 23, the data transfer rate Vr for reading moving picture data is supposed to be 15.57 Mbps and the data transfer rate Ar for reading substitute audio data is supposed to be 0.256 Mbps. In playing back the video and substitute audio synchronously with each other, the read rate needs to be increased by 256 kbps compared to a normal playback operation.

In FIG. 23, the moving picture data is sent to the functional blocks on the upper stage, while the substitute audio data is sent to the functional blocks on the lower stage. The PS buffer and audio buffer are implemented as the buffer memory 164. On the other hand, the P-STD (program stream system target decoder) on the upper stage splits an incoming program stream into video and original audio and decodes them. The P-STD corresponds to the first disassembling section 165, video expanding section 111 and first audio expanding section 113 shown in FIG. 15. The audio decoder on the lower stage decodes the substitute audio data and corresponds to the second disassembling section 166 and second audio expanding section 114.

Figure 24:
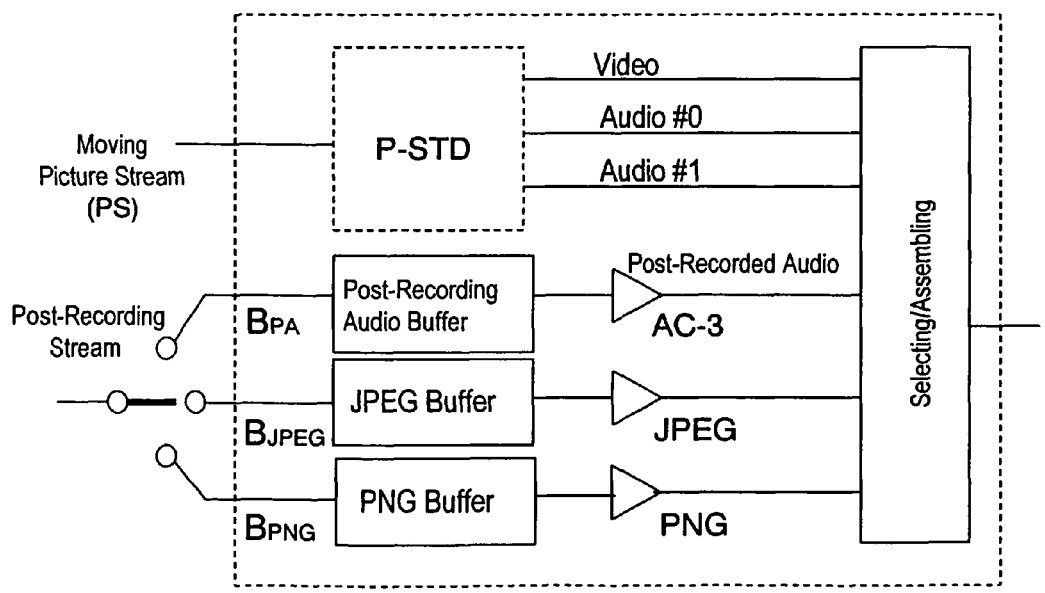
FIG. 24 shows a decoder model for a program stream including still pictures.

A program stream representing substitute audio data may be a post-recorded data stream including not only the substitute audio data but also still pictures (compliant with JPEG, for example) or graphics (compliant with PNG, for example) as well. As used herein, the "still pictures" refer to pictures taken of natural (non-artificial) objects, while the "graphics" refer to artificial images generated on a computer. However, these images are classified just for the purpose of allowing the user to manage them. In the following description, only one of these two types may be mentioned. However, that will be just for convenience sake and the present invention is applicable to both of these two types. FIG. 24 shows a decoder model for a program stream including still pictures. The playback process of a moving picture stream is carried out by the P-STD. The respective types of data are sorted by the second disassembling section 166 according to the pack types and then sent to a substitute audio post-recording audio buffer, a JPEG buffer and a PNG buffer. The respective buffer sizes are defined in advance. For example, the size of the substitute audio buffer is supposed to be equal to the data size of a substitute audio data storage area (i.e., the substitute audio continuous data area shown in FIG. 16). Similar statement applies to the size of a still picture buffer. One of the moving picture data, original audio, substitute audio and still picture is selectively output at the user's request and the data is arranged according to the destination and order of the output data.

The data processor needs to read data from the respective buffers such that no overflow or underflow of the data is produced in any of those buffers. To carry out the read operation efficiently, respective storage addresses and sizes may be recorded in the moving picture continuous data areas and substitute audio continuous data areas on the optical disk 131.

Figure 25:
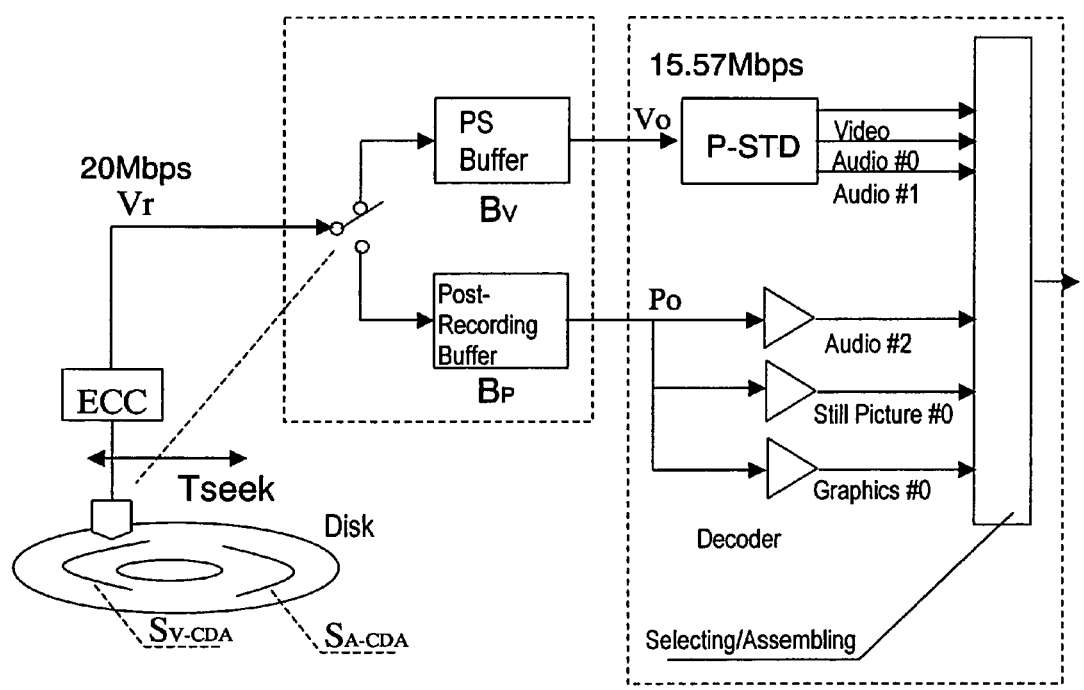
FIG. 25 shows an exemplary playback model in a situation where moving picture data and substitute audio data or still picture data (or graphics data) are stored in physically discontinuous areas.

FIG. 25 shows an exemplary playback model in a situation where moving picture data and substitute audio data or still picture data (or graphics data) are stored in physically discontinuous areas (by a non-interleaving technique). On the optical disk, the moving picture data is stored in a continuous data area with a minimum data length $S_{V\text{-}CDA}$, while post-recording data including the substitute audio data and the still picture data is stored in a continuous data area with a minimum data length $S_{A\text{-}CDA}$. The switch that follows an ECC block for error correction is turned when the pickup crosses the boundary between the moving picture data continuous data area and the post-recorded data continuous data area. The other process steps are carried out just as already described with reference to FIG. 24.

Figure 26:
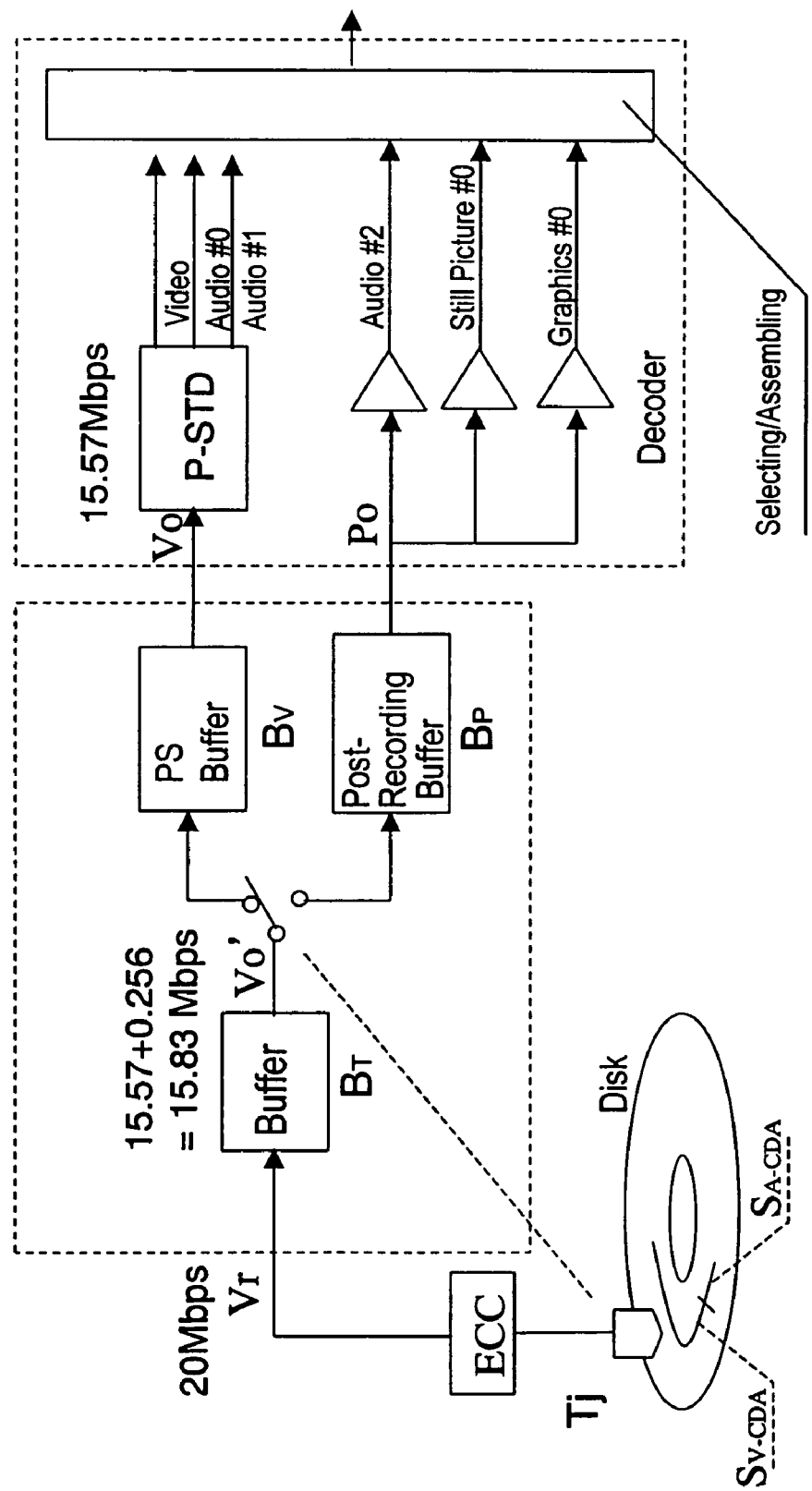
FIG. 26 shows an exemplary playback model in a situation where moving picture data and substitute audio data or still picture data (or graphics data) are stored in a physically continuous area.

FIG. 26 shows an exemplary playback model in a situation where moving picture data and substitute audio data or still picture data (or graphics data) are stored in a physically continuous area. In this case, the substitute audio data is stored so as to be interleaved with a plurality of moving picture data. If a video frame, a substitute audio frame and so on with substantially the same playback timings are stored adjacent to each other, then both of these data can be retrieved to the buffer $B_T$ at the same time. As a result, the pickup 130 may perform the seek operation a reduced number of times. Either the output moving picture data or substitute audio data may be selected by the switch and sent to its associated buffer. The other process steps are carried out just as already described with reference to FIG. 24.

Figure 27:
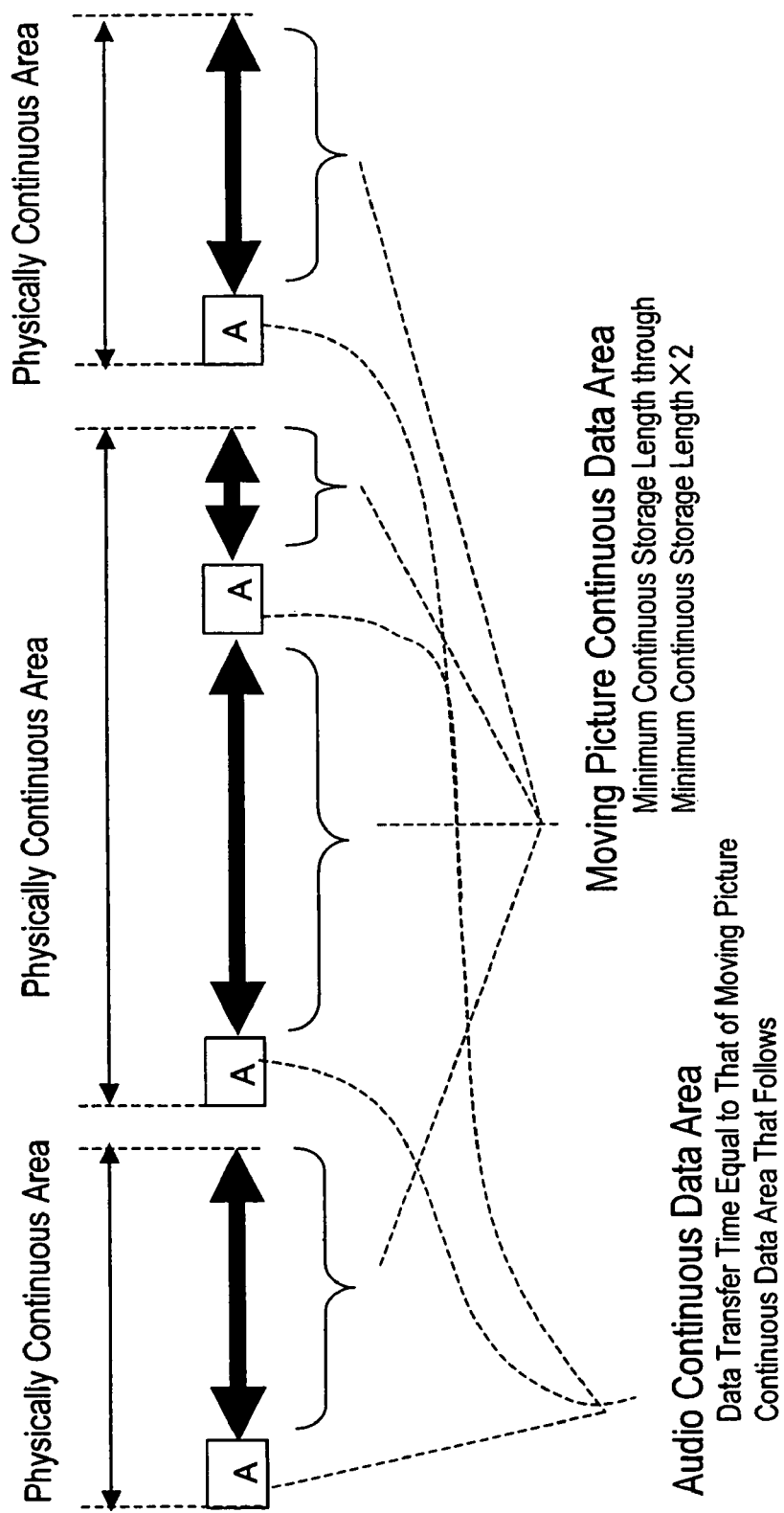
FIG. 27 shows moving picture data and substitute audio data that are stored in a physically continuous area.
Figure 63:
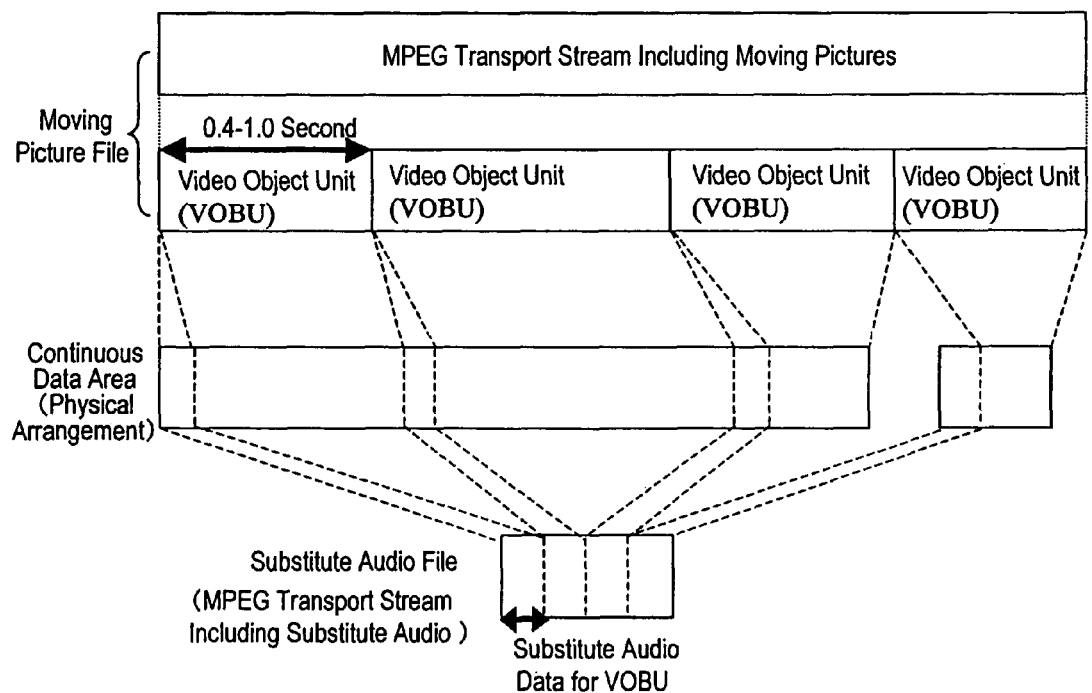
FIG. 63 shows interleaved moving picture and substitute audio files.

FIG. 27 shows an example in which moving picture data and substitute audio data are stored by an interleaving technique. As in FIG. 63, the data length of the moving picture data is at least equal to its minimum length but less than twice as long as the minimum length. The data lengths of the moving picture data and the substitute audio data need to satisfy Equations (16) through (21). Also, as in FIG. 63, the amount of time it takes to transfer (or play back) the substitute audio data stored in a substitute audio data continuous data area is supposed to be equal to the amount of time it takes to transfer (or play back) the video data stored in the moving picture data continuous data area that follows the former continuous data area physically immediately.

Consequently, even if a moving picture has been edited (e.g., partially deleted), the continuous data areas before and after each editing point can be reformed and the substitute audio data and moving picture data can be easily rearranged continuously.

In that case, however, a real-time after recording operation can be carried out on a number of different substitute audio continuous data areas, which have been defined by the non-interleaving technique. But it is difficult to carry out a real-time after recording operation on interleaved substitute audio data areas.

If the minimum lengths of the moving picture data and substitute audio data satisfy Equations (8) through (15), then the real-time after recording operation can be carried out on the interleaved substitute audio areas. Nevertheless, the minimum length of the video data increases unintentionally in that case.

Figure 28:
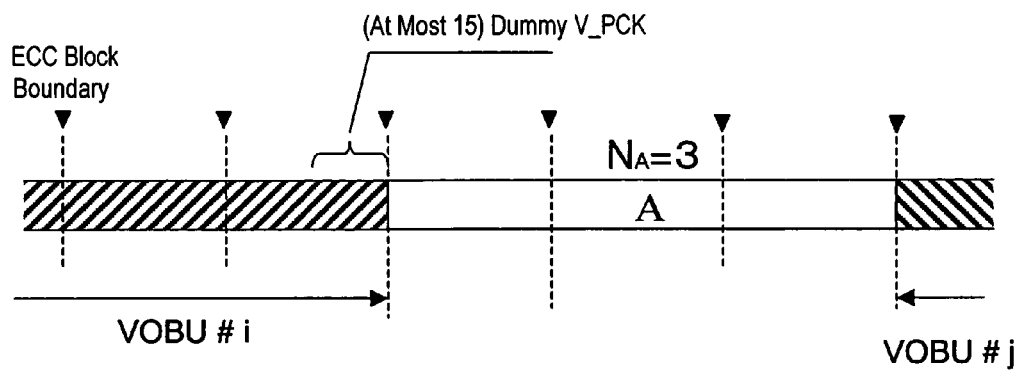
FIG. 28 shows how to align the end of a VOBU with that of an ECC block by writing at most fifteen dummy packets (i.e., dummy V_PCK) at that end of the VOBU.

FIG. 28 shows how to align the end of a VOBU with that of an ECC block by writing at most fifteen dummy packets (i.e., dummy V_PCK) at that end of the VOBU. In FIG. 28, the moving picture file is defined as an MPEG program stream and is stored so as to also accept interleaved post-recording. According to Condition 5 already described with reference to FIG. 16, the end of the substitute audio continuous data area is aligned with that of an ECC block. However, the overall size of a number N of VOBUs, generated in a recording mode that enables post-recording, is not always an integral multiple of that of an ECC block. That is why the end of the VOBU, located just before the substitute audio continuous data area, is aligned with that of an ECC block by inserting dummy packets thereto. In FIG. 28, NA represents the number of ECC blocks in the substitute audio area.

Figure 29:
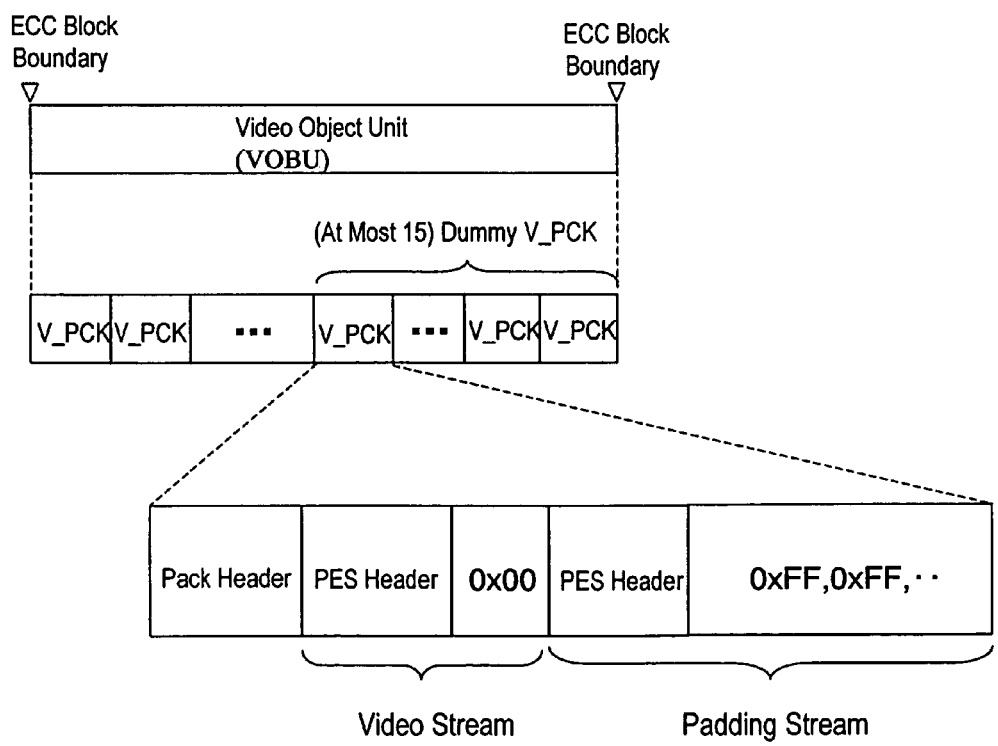
FIG. 29 shows the data structure of a video pack V_PCK compliant with the DVD-VR standard and DVD-Video standard and used as a dummy packet.

FIG. 29 shows the data structure of a video pack V_PCK compliant with the DVD-VR standard and DVD-Video standard and used as a dummy packet. The dummy V_PCK includes a video stream, containing 1 byte video data (0x00), and a padding stream. The amount of the video data included in the dummy V_PCK may be greater than one byte but is preferably as small as possible since this is a dummy packet.

Figure 30:
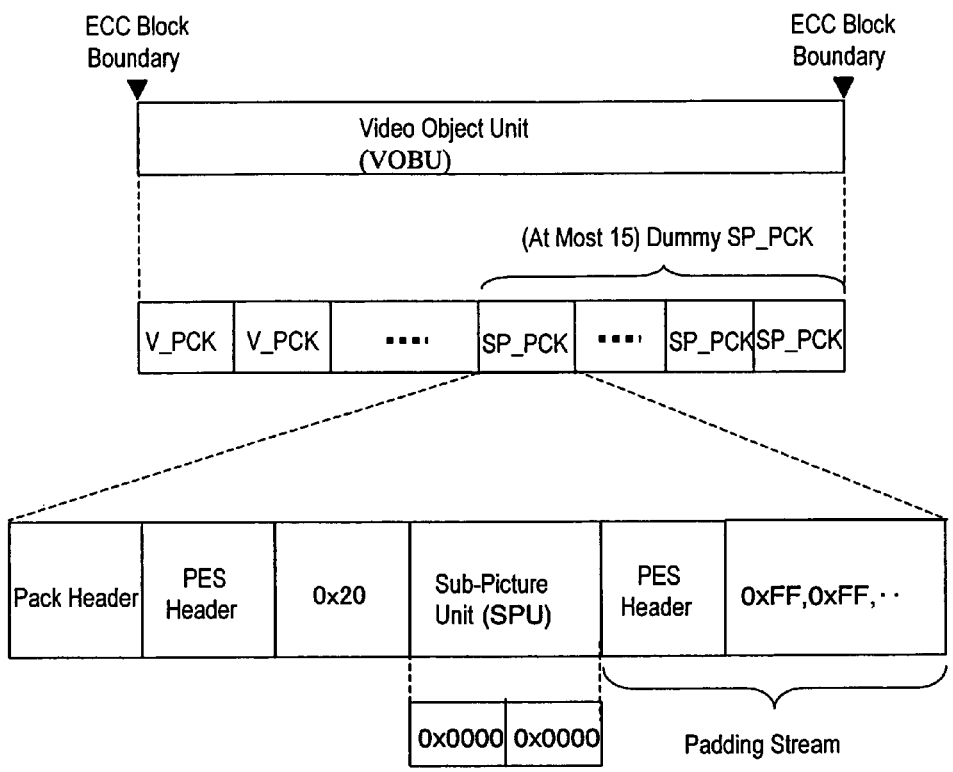
FIG. 30 shows the data structure of a sub-picture pack SP_PCK for use as a dummy packet.

Optionally, the data processor may write a sub-picture pack SP_PCK as an alternative dummy packet. During the playback, SP_PCK may be ignored. Alternatively, a sub-picture pack may also be stored as a dummy packet. FIG. 30 shows the data structure of a sub-picture pack SP_PCK for use as a dummy packet. The sub-picture pack includes a sub-picture unit SPU. To indicate that there is no data in the pack, the first two bytes of the sub-picture unit in the pack may have a particular value (e.g., 0x0000).

In including the substitute audio dummy data in the moving picture data, an audio frame, having the same presentation time stamp as the substitute audio dummy data, may be provided for the sake of convenience of editing. Then, the process of writing the audio data of the substitute audio file in the moving picture file can be simplified.

Figure 31:
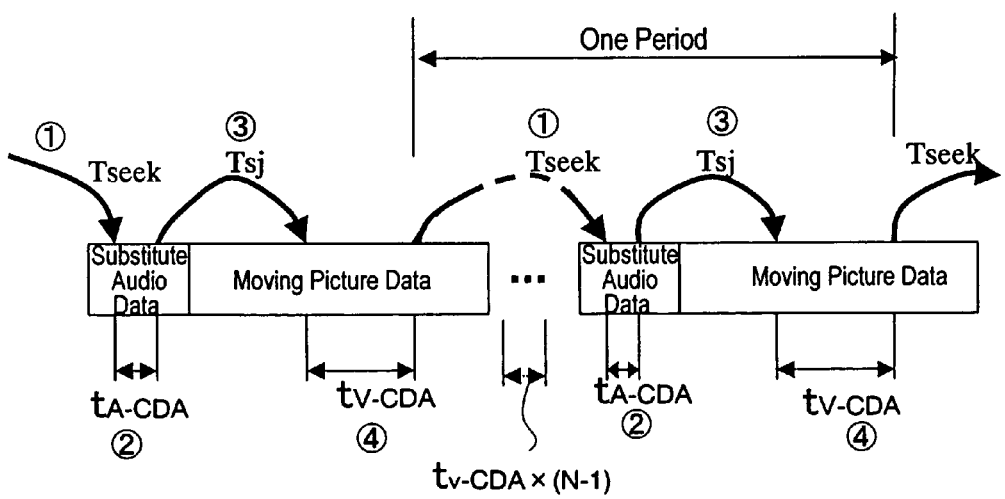
FIG. 31 shows the order of operations to be done by the pickup 130 with the longest seek time $T_{SEEK}$ and short seek time $T_{sj}$ taken into account.

In the foregoing description, when synchronous playback is carried out by the interleaving technique, the moving picture data and substitute audio data are supposed to be read in the orders in which those data got stored. However, if a play list is compiled by choosing a number of brief scenes (each having a duration of 5 seconds, for example) and if playback is carried out on that play list, then the pickup move model shown in FIG. 31 can be adopted. FIG. 31 shows the order of operations to be done by the pickup 130 with the longest seek time $T_{SEEK}$ and short seek time $T_{sj}$ taken into account. The encircled numbers ① through ④ make up one period. If the substitute audio data and the moving picture data are arranged back to back, then it is not always necessary to determine the amount of data to read by the longest seek time $T_{SEEK}$. Accordingly, at least the seek time it takes for the pickup 130 to move from the substitute audio data to the moving picture data may be replaced with a short seek time $T_{sj}$ ($<T_{SEEK}$).

Figure 32:
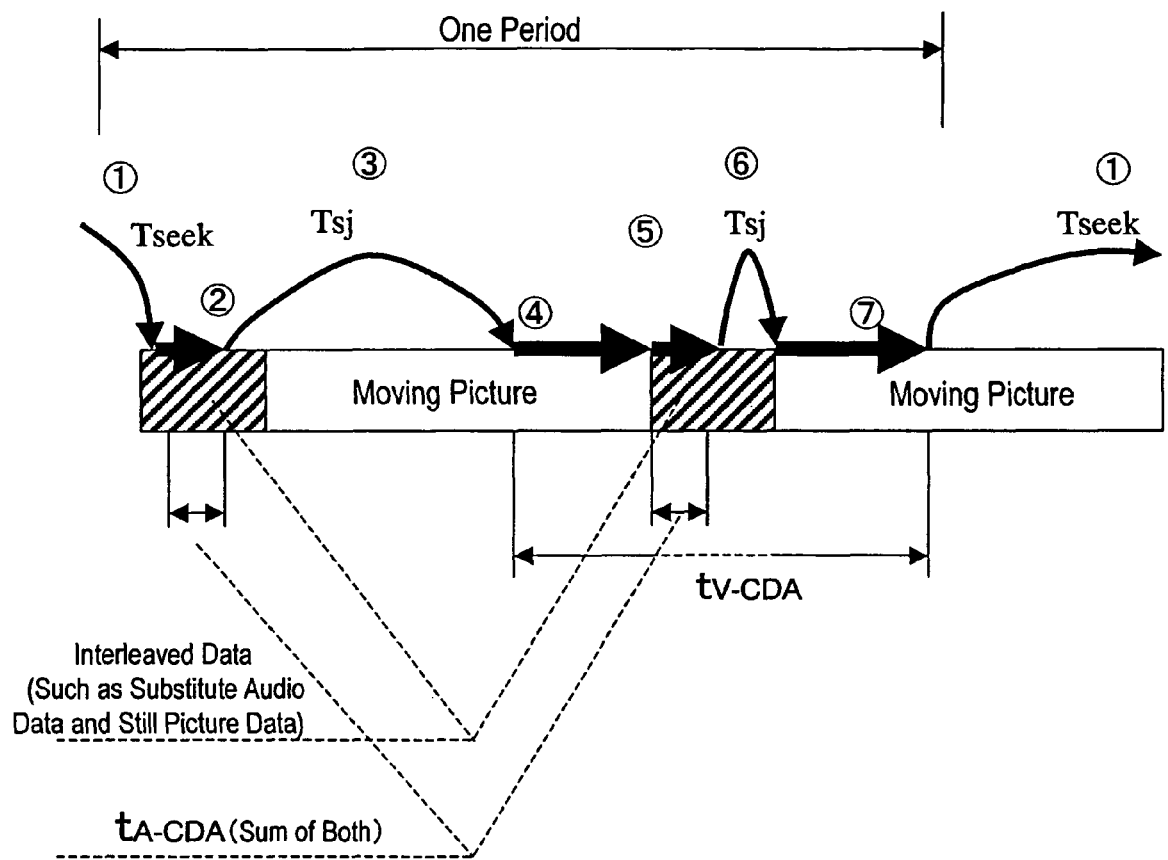
FIG. 32 shows the order of operations to be done by the pickup 130 in a situation where moving picture data is read out across an interleaving area.

If any of the scenes chosen by the user goes through an interleaving area, then the pickup move model shown in FIG. 32 may be adopted. FIG. 32 shows the order of operations to be done by the pickup 130 in a situation where moving picture data is read out across an interleaving area. In FIG. 32, ④ and ⑦ represent process steps to perform in such a situation. The process steps represented by the encircled numbers ④, ⑤, ⑥ and ⑦ in FIG. 32 correspond to that represented by the encircled number ④ in FIG. 31. More specifically, the moving picture data starts to be read a little ahead of the interleaving area (process step ④) and part of the audio data (as indicated by the hatching) is read out from the interleaving area (process step ⑤). Then, the pickup seeks and jumps to the top of the moving picture data (process step ⑥), thereby reading the top portion of the moving picture data (process step ⑦). The process steps ① through ⑦ make up one period and similar process steps will be carried out in the next period, too. Optionally, no seek operation may be performed within the interleaving area. That is to say, data may be read continuously even while the pickup is moving to the target area, and a normal read operation may be performed once the pickup has reached that area. By continuing the read operation in this manner, the time loss caused by moving the pickup 130 may be reduced rather than performing the seek operation.

Figure 33:
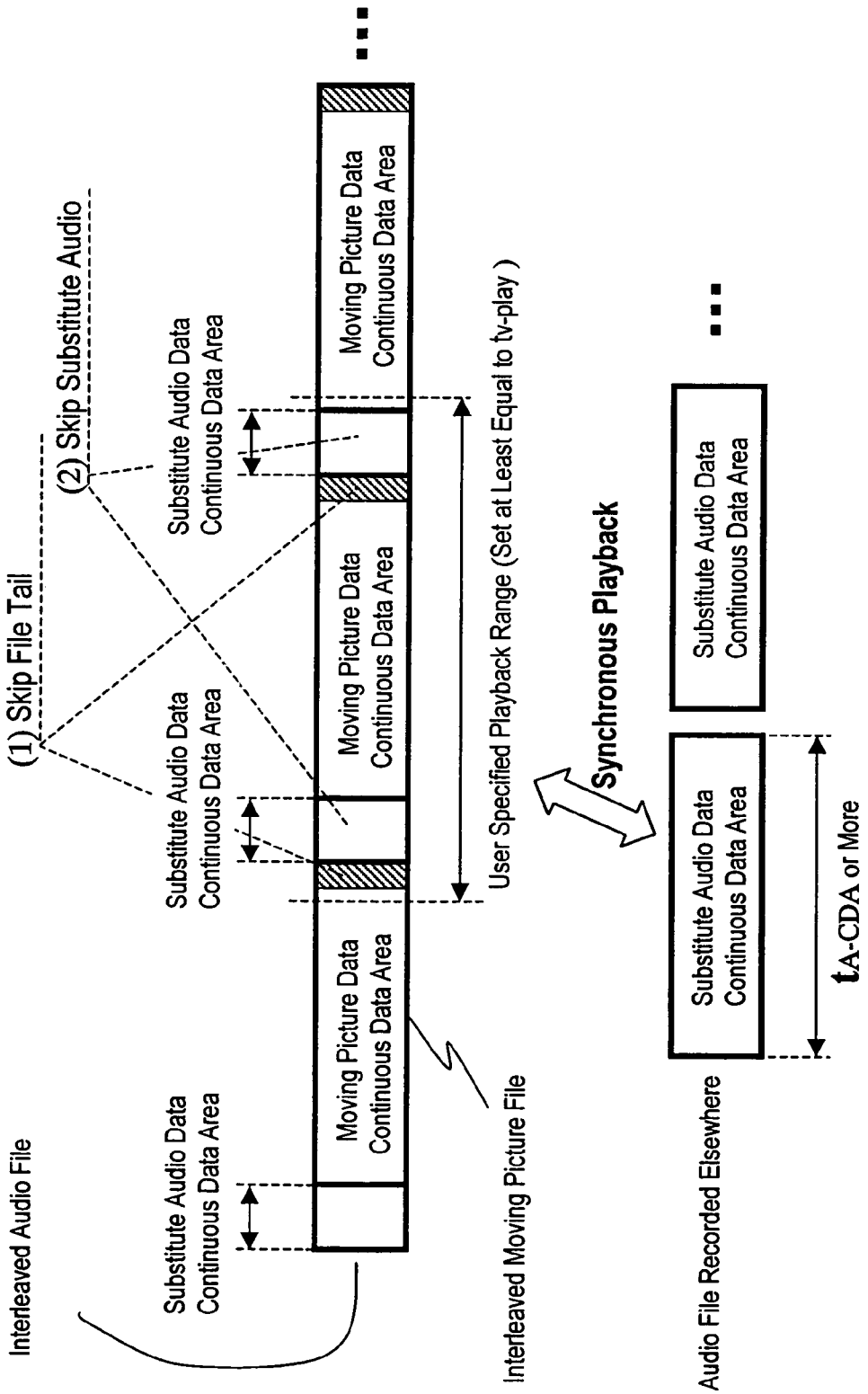
FIG. 33 shows continuous data areas in which moving picture data and substitute audio data are interleaved with each other and other substitute audio continuous data areas provided elsewhere.

FIG. 33 shows continuous data areas in which moving picture data and substitute audio data are interleaved with each other and other substitute audio continuous data areas provided elsewhere. The data stream is stored so as to have an interleaving structure in which a substitute audio data continuous data area is provided between two moving picture data continuous data areas. Suppose the moving picture data to cover the playback range specified by the user is stored in three moving picture data continuous data areas. Also, the substitute audio to be reproduced synchronously with the video is supposed to be stored in non-interleaved continuous data areas, not in the interleaved substitute audio data continuous data areas. Between the moving picture continuous data areas, the substitute audio data not to reproduce are stored in two different locations. Thus, the pickup 130 moves with those areas skipped. Furthermore, if part of the last ECC block of each moving picture continuous data area is a file tail compliant with the UDF standard, then the file tails are detected from the two locations and skipped. As a result, the two file tails and the two substitute audio data continuous data areas are skipped.

Figure 34:
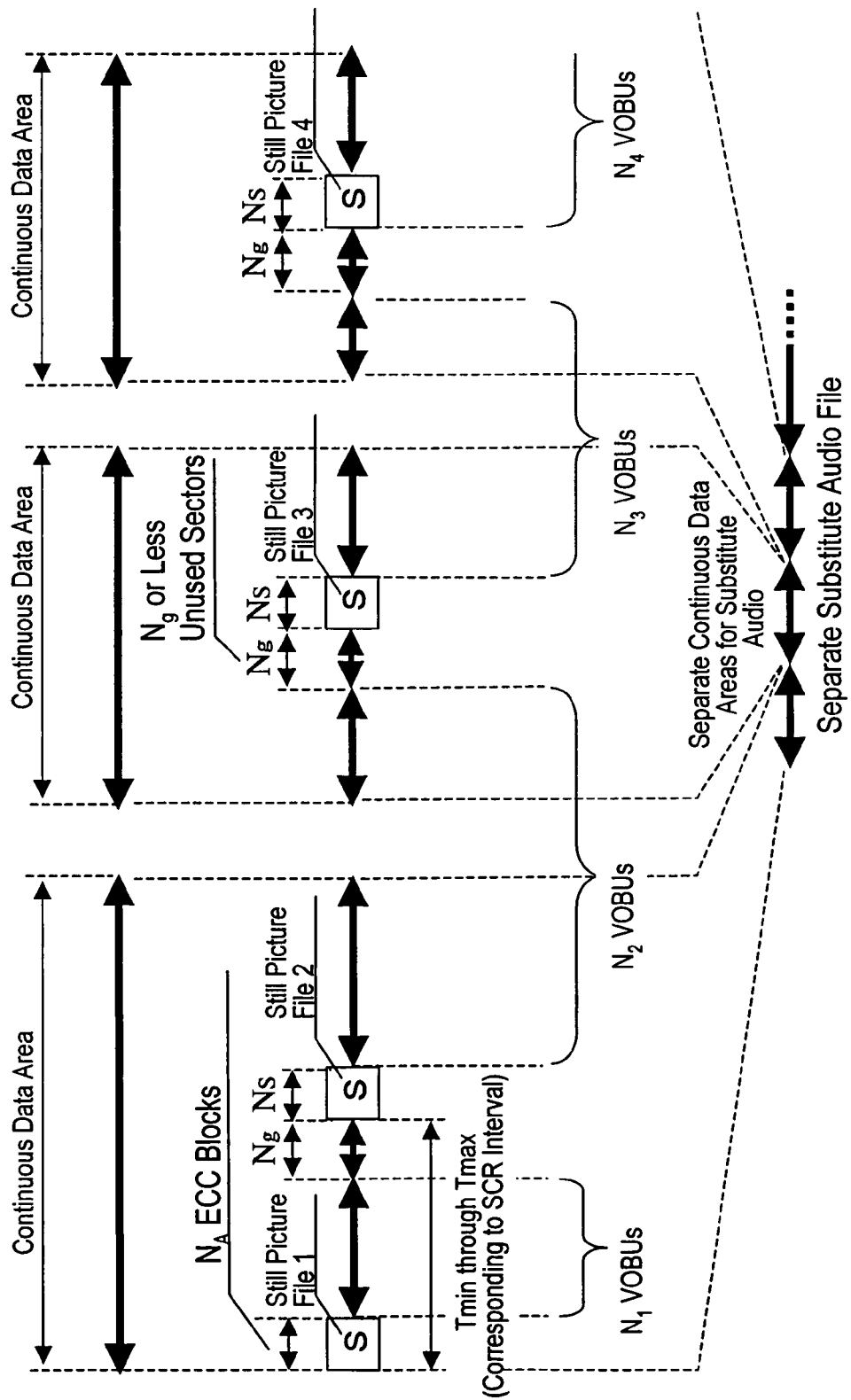
FIG. 34 shows a data structure in which not $N_A$ substitute audio data in a continuous data area but still picture data consisting of $N_S$ ECC blocks is interleaved with moving picture data.

Next, an example of interleaving still picture data instead of substitute audio data will be described. FIG. 34 shows a data structure in which not $N_A$ substitute audio data in a continuous data area but still picture data consisting of $N_S$ ECC blocks are interleaved with moving picture data. It's up to the user to decide whether he or she wants to play back the still picture data or to reproduce the substitute audio stored in a separate continuous data area by the non-interleaving technique. If he or she wants to reproduce the substitute audio, then the data processor may move the pickup 130 and skip the still picture data area in the same procedure as that shown in FIG. 33.

Hereinafter, the still picture data area will be described. The still picture data area corresponds to the data area consisting of $N_S$ ECC blocks. The whole still picture data in the $N_S$ ECC blocks may form a single file. Alternatively, one still picture data area may include one file. If the still picture data is arranged after a VOBU, at most Ng unused sectors may be present between them. The number Ng of unused sectors is supposed to be less than one ECC block (i.e., 15 sectors or less).

The interval to interleave the still picture continuous data areas may have its range defined with an SCR value in a program stream. In this preferred embodiment, the still picture continuous data areas may be arranged at an SCR interval of Tmin to Tmax (=Tmin+1)(e.g., 6 to 7 seconds), where Tmin and Tmax are both input timings for the P-STD. As a result, the still picture data can be written on. $N_A$ ECC blocks in real time while the moving picture data is played back.

Figure 35:
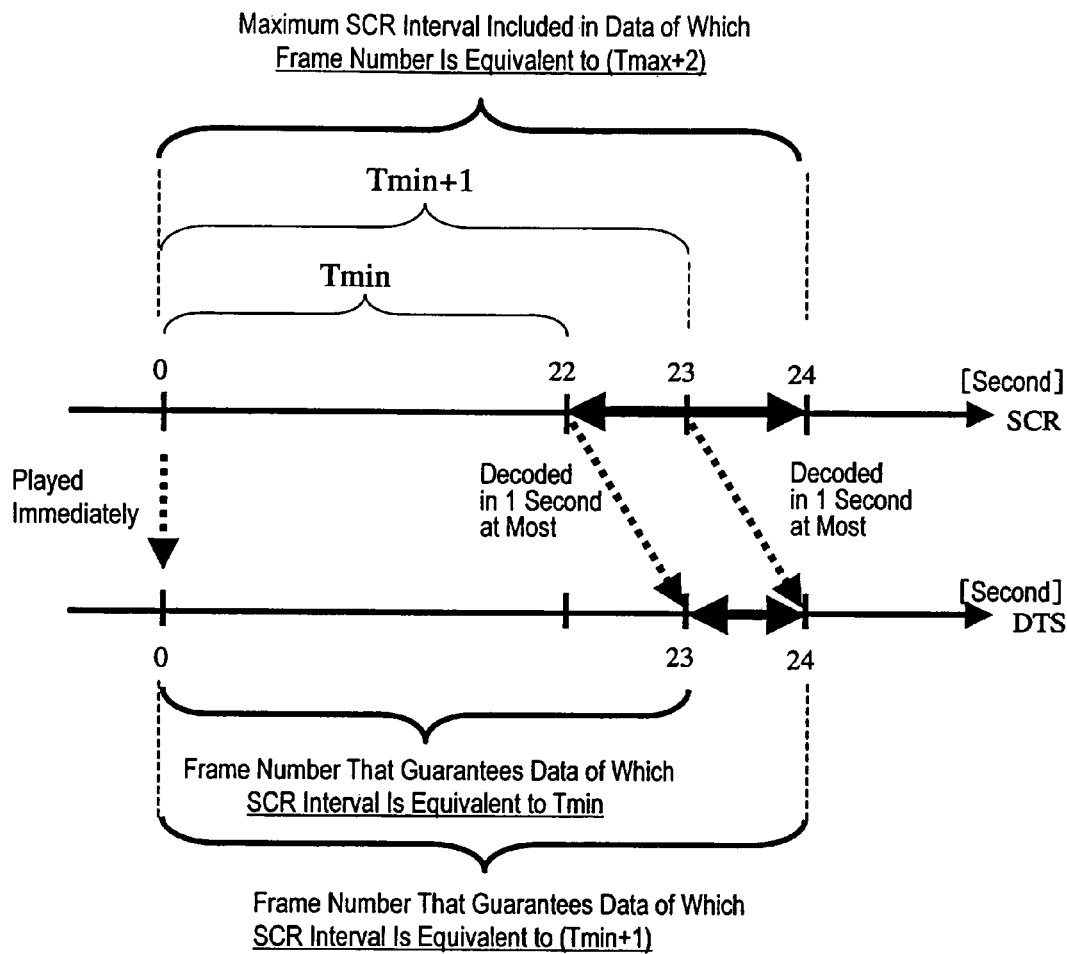
FIG. 35 shows a relationship between an SCR interval and a video playback duration.
Figure 36:
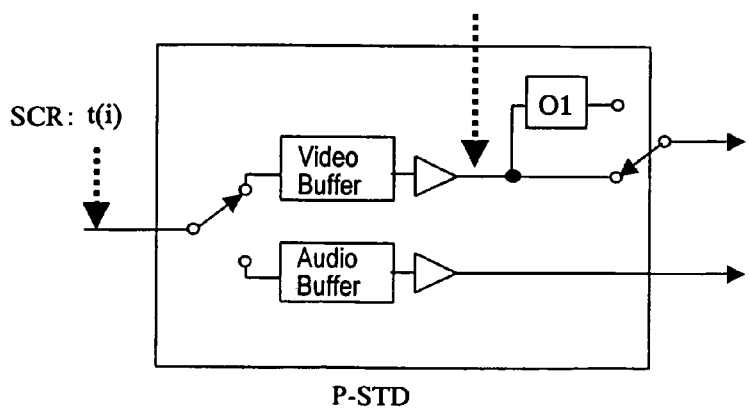
FIG. 36 shows an arrangement of functional blocks in a P-STD.

The interval to interleave the still picture continuous data areas is closely correlated to the data length of the moving picture data continuous data areas, which are present between those still picture continuous data areas, and the video playback duration. FIG. 35 shows a relationship between an SCR interval (i.e., transfer time) and a video playback duration. From the viewpoint of the playback duration, moving picture data (or frames) that can be played back in a period of time that is equal to or longer than (Tmin+1) but shorter than (Tmin+2) needs to be included between two still picture continuous data areas. Such moving picture data includes data with an SCR value (i.e., a transfer time) that is equal to or greater than Tmin but less than (Tmin+2). This has something to do with that a system target decoder compliant with the MPEG-2 allows a playback delay of at most 1 second. FIG. 36 shows an arrangement of functional blocks in a P-STD that is a system target decoder for a program stream. As shown in FIG. 35, data with an SCR interval that is equal to or longer than Tmin but less than (Tmin+1) includes data with a playback duration of (Tmin+1) to (Tmin+2). Conversely, the moving picture data with a playback duration of (Tmin+1) to (Tmin+2) includes moving picture data with an SCR interval of Tmin to (Tmin+2). Consequently, data with a playback duration of 6 to 7 seconds corresponds to data with an SCR interval of 5 to 7 seconds.

In this preferred embodiment, a situation where defective blocks are included in a continuous data area is not taken into consideration. Thus, with a maximum permissible defect rate K taken into account, the amount of the video data to store in the buffer memory 164 is determined.

Considering the defect rate of ECC blocks in the worst case shown in the timing diagram of FIG. 19, the following equations are satisfied:

$$(K'Vr - Vo)t_{V-CDA} = Vo \times ((n+2) \times T_{SEEK} + t_{A-CDA}) \quad (22)$$

$$(K'Ar - Ao)t_{A-CDA} = Ao \times ((n+2) \times T_{SEEK} + t_{V-CDA}) \times 2 \quad (23)$$

$$K' = 1 - K \quad (24)$$

The amount of time it takes to read each moving picture continuous data area multiplied by n is:

$$t_{V-CDA} = \frac{(n+2) \times VoT_{SEEk}(1 + Ao/(K'Vr))}{(K'Vr) - Vo - Ao - AoVo/(K'Vr)} \quad (25)$$

The minimum playback duration of the moving picture continuous data areas is given by:

$$t_{V-play} = t_{V-CDA} \times (K'Vr)/(nV0) \quad (26)$$
$$= \frac{1}{n} \times \frac{(K'Vr) \times (n+2) \times T_{SEEK}(1 + Ao/(K'Vr))}{(K'Vr) - Vo - Ao - AoVo/(K'Vr)}$$

The minimum size of the moving picture continuous data areas is:

$$S_{V-CDA} = t_{V-CDA} \times Vr/(n\,Vo) \quad (27)$$

The size of the moving picture buffer is:

$$B_v = Vo \times (3 \times T_{SEEK} + T_{A-CDA}) \quad (28)$$

The maximum amount of time it takes to read the audio continuous data areas (which is twice as large as the minimum value) is given by:

$$t_{A-CDA} = \frac{2 \times (n+2) \times AoT_{SEEK}}{(K'Vr) - Vo - Ao - AoVo/(K'Vr)} \quad (29)$$

The minimum playback duration of the audio continuous data areas is given by:

$$t_{A-play} = (t_{A-CDA}/2) \times (K'Vr)/Ao \quad (30)$$
$$= \frac{K'Vr \times (n+2) \times T_{SEEK}}{(K'Vr) - Vo - Ao - AoVo/(K'Vr)}$$

The minimum size of the audio continuous data areas is:

$$S_{A-CDA} = Vr \times \frac{t_{A-CDA}}{2} \quad (31)$$

The size of the audio buffer is:

$$B_A = (K'Ar - Ao)t_{A-CDA} \quad (32)$$

In this case, Equation (16) may be replaced with Equation (22), Equation (17) may be replaced with Equation (23), Equation (18) by Equation (29), Equation (19) by Equation (25), Equation (20) by Equation (27) and Equation (21) by Equation (31), respectively. Then, the continuous data areas can be provided more easily. In providing the continuous data areas, however, not all of those areas have to be perfectly continuous unused areas with no defect blocks or still picture files at all such that all of the ECC blocks can be used continuously. That is to say, the condition of continuity is relaxed.

For example, supposing $T_{SEEK}$=1.2 second, Vo=15.57 Mbps, Ao=0.256 Mbps, Vr=20 Mbps, n=7 and K=0.02, the minimum value of the video continuous data areas will be 8.6 seconds ($t_{V-play}$), that of the audio continuous data areas will be 59.3 seconds ($t_{A-play}$), the video data size will be 17.0 megabytes ($S_{V-CDA}$), the audio data size will be 1.9 megabytes ($S_{A-CDA}$), the video buffer size will be 80.2 megabits and the audio buffer size will be 30.0 megabits. As can be seen, the minimum length of the continuous data areas can be increased by taking the defect rate into consideration.

Furthermore, non-moving-picture data fragments may be included a little in the moving picture continuous data area at a different frequency of occurrence from the defect rate and the amount of time to skip those data fragments is represented by $T_{SV}$. Likewise, non-audio data fragments may also be included a little in the audio continuous data area and the amount of time to skip those data fragments is represented by $T_{SA}$. The sum of $T_{SV}$ and $T_{SA}$ is identified by $T_S$. For example, if a part of the last ECC block of a moving picture continuous data area is a file tail compliant with the UDF standard (see the first preferred embodiment), then the time to skip one ECC block is represented by $T_{ECC}$. If each of n continuous data areas includes a file tail, then $T_S$, $T_{SV}$ and $T_{SA}$ are represented by the following Equations (33), (34) and (35), respectively:

$$T_S = T_{SV} + T_{SA} \quad (33)$$

$$T_{SV} = n \times T_{ECC} \quad (34)$$

$$T_{SA} = 0 \quad (35)$$

Next, considering the read skip times in the worst case shown in the timing diagram of FIG. 19, the following equations are satisfied:

$$(K'Vr - Vo)t_{V-CDA} = Vo \times ((n+2) \times T_{SEEK} + T_S + t_{A-CDA}) \quad (36)$$

$$(K'Ar - Ao)t_{A-CDA} = Ao \times ((n+2) \times T_{SEEK} + T_S + t_{V-CDA}) \times 2 \quad (37)$$

$$K' = 1 - K \quad (38)$$

The amount of time it takes to read each moving picture continuous data area multiplied by n is:

$$t_{V-CDA} = \frac{Vo \times [(n+2) \times T_{SEEK} + T_S](1 + Ao/(K'Vr))}{(K'Vr) - Vo - Ao - AoVo/(K'Vr)} \quad (39)$$

The minimum playback duration of the moving picture continuous data areas is given by:

$$t_{V-play} = t_{V-CDA} \times (K'Vr)/(nVo) \quad (40)$$
$$= \frac{1}{n} \times \frac{Vo \times [(n+2) \times T_{SEEK} + T_S](1 + Ao/(K'Vr))}{(K'Vr) - Vo - Ao - AoVo/(K'Vr)}$$

The minimum size of the moving picture continuous data areas is:

$$S_{V-CDA} = t_{V-CDA} \times Vr/(n\,Vo) \quad (41)$$

The size of the moving picture buffer is:

$$B_V = Vo \times (3 \times T_{SEEK} + t_{A-CDA}) \quad (42)$$

The maximum amount of time it takes to read the substitute audio continuous data area (which is twice as long as the minimum read time) is given by:

$$t_{A-CDA} = \frac{2 \times Ao[(n+2)T_{SEEK} + Ts]}{(K'Vr) - Vo - Ao - AoVo/(K'Vr)} \quad (43)$$

The minimum playback duration of the substitute audio continuous data areas is given by:

$$t_{A-play} = (t_{A-CDA}/2) \times (K'Vr)/Ao \quad (44)$$
$$= \frac{K'Vr \times [(n+2)T_{SEEK} + Ts]}{(K'Vr) - Vo - Ao - AoVo/(K'Vr)}$$

The minimum size of the substitute audio continuous data areas is:

$$S_{A-CDA} = Vr \times \frac{t_{A-CDA}}{2} \quad (45)$$

The size of the substitute audio buffer is:

$$B_A = (K'Ar - Ao)t_{A-CDA} \quad (46)$$

Next, suppose the user has requested a playback for post-recorded data such that an arbitrary range of a moving picture file and an audio file are played back synchronously with each other. More specifically, suppose the moving picture data and audio data are stored alternately and the post-recording playback is carried out by combining the user specified range of the moving picture data with an audio file stored separately as shown in FIG. 33. In the worst case, two interleaved audio continuous data areas may be included in the single user specified range of the moving picture continuous data areas as shown in FIG. 33. In addition, two file tails are also included. In that case, if the read skip time of the audio continuous data area is represented by $T_{A-CDA}$, then $T_S$, $T_{SV}$ and $T_{SA}$ may be replaced by Equations (41), (42) and (43), respectively:

$$T_S T_{SV} + T_{SA} \quad (47)$$

$$T_{SV} = 2 \times n \times T_{ECC} + 2 \times n \times T_{A-CDA} \quad (48)$$

$$T_{SA} = 0 \quad (49)$$

If the minimum value of the audio continuous data areas is defined so as to satisfy Equation (44) and if the length of the moving picture continuous data area specified is defined so as to satisfy Equation (40), then data to play back continuously may be sent to the first transport stream disassembling section 165 during the post-recording playback. That is to say, the data to play back can be supplied to the decoder continuously.

For example, supposing $T_{SEEK}$=1.2 second, Vo=15.57 Mbps, Ao=0.256 Mbps, Vr=20 Mbps, n=7, K=0.02 and the substitute audio continuous data area to interleave corresponds to 10 seconds, the minimum value of the video continuous data areas will be 10.7 seconds ($t_{V-play}$), that of the audio continuous data areas will be 71.4 seconds ($t_{A-play}$), the video data size will be 21.3 megabytes ($S_{V-CDA}$), the audio data size will be 2.3 megabytes ($S_{A-CDA}$), the video buffer size will be 85.1 megabits and the audio buffer size will be 36.1 megabits. As can be seen, the minimum value of the video continuous data areas can be increased by interleaving the moving picture data and substitute audio data areas together compared with a situation where those areas are not interleaved.

Embodiment 2

Hereinafter, a second preferred embodiment of a data processor according to the present invention will be described. The data processor of this preferred embodiment has the same configuration as the counterpart of the first preferred embodiment shown in FIG. 4. Thus, the description of respective components of the data processor will be omitted herein.

By using the data structure to be described later, the data processor of this preferred embodiment manages the moving picture files, substitute audio files, still picture files and empty areas on the optical disk 131 of the first preferred embodiment, thereby reading the respective data and writing data on the empty areas more efficiently.

Figure 37:
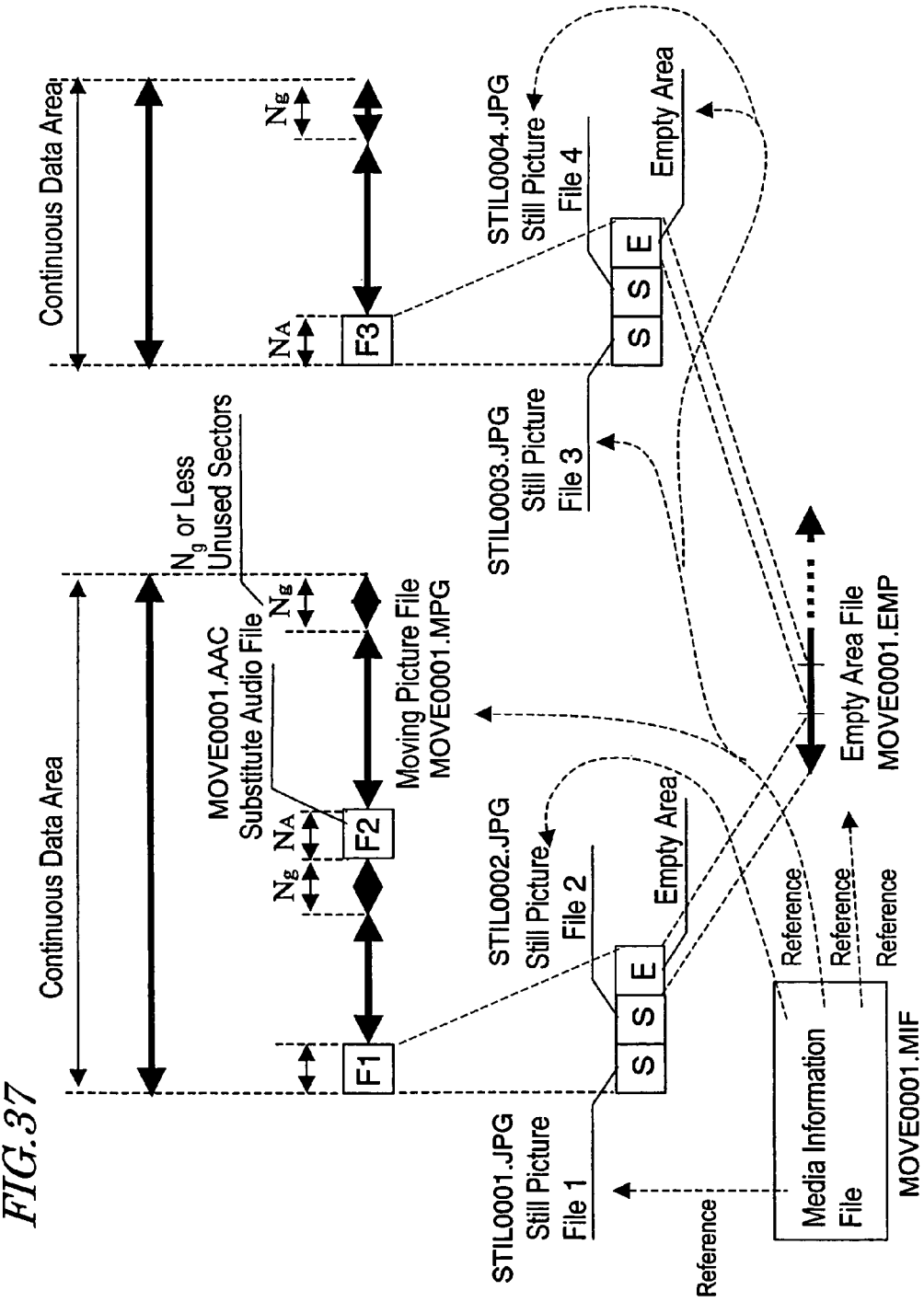
FIG. 37 shows various types of files in a continuous data area to be managed by reference to a media information file MOVE001.MIF and an empty area file.

FIG. 37 shows various types of files in a continuous data area to be managed by reference to a media information file MOVE001.MIF and an empty area file. When moving picture data MOVE0001.MPG starts being written in a recording mode that enables post-recording, the post-recording writing control section 162 of the data processor generates a media information file MOVE0001.MIF. There is one-to-one correspondence between the moving picture file MOVE0001.MPG and the media information file MOVE0001.MIF. That is to say, if there are a number of moving picture files, the post-recording writing control section 162 generates a media information file for each of those moving picture files. The media information file generated is stored on the optical disk 131.

Figure 38:
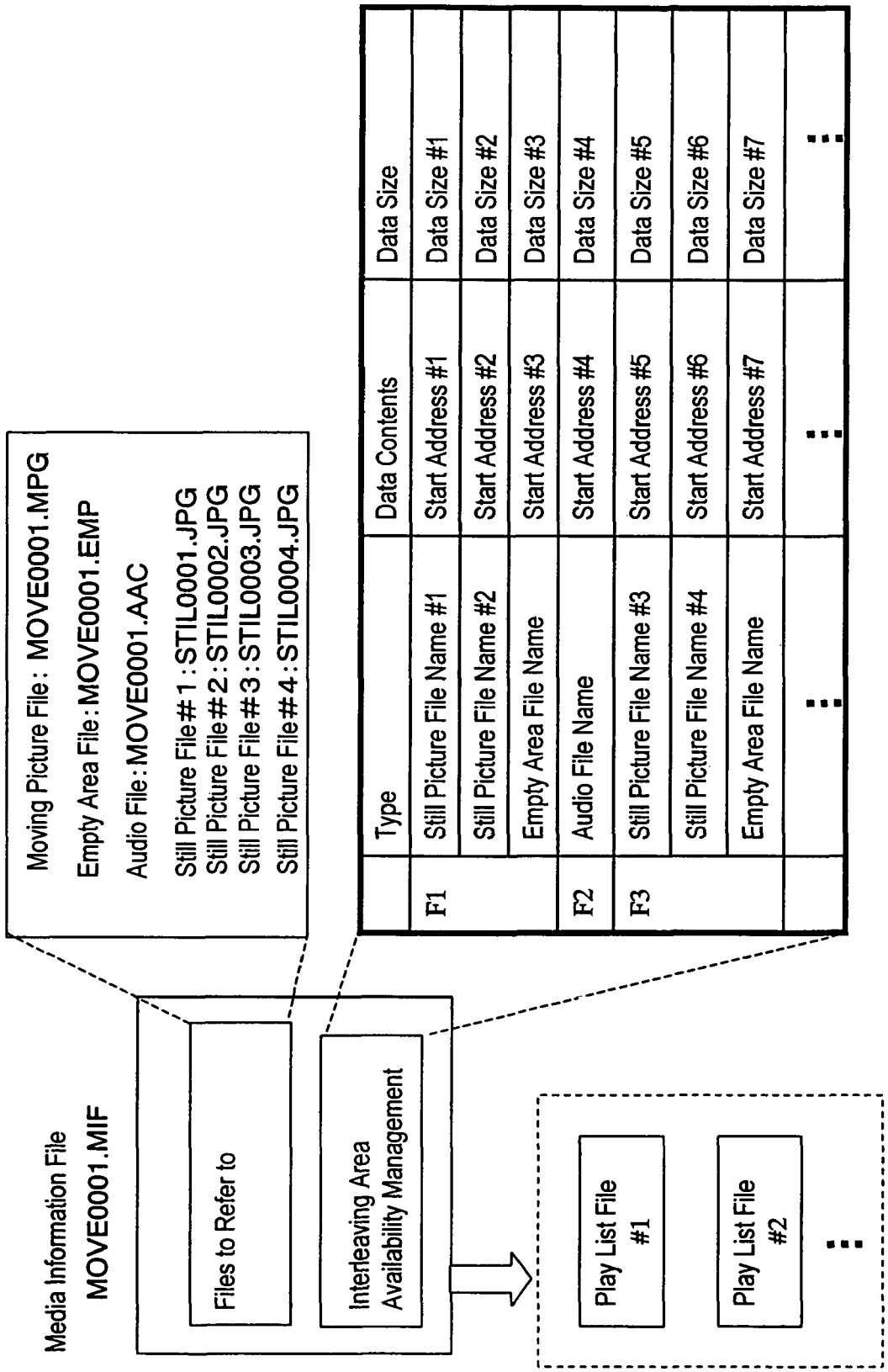
FIG. 38 shows the data structure of the media information file.

Next, if substitute audio data, still picture data and so on are additionally written afterward by post-recording, then the post-recording writing control section 162 adds the file names associated with the respective data, the start addresses of their storage areas, the data sizes and other data to the media information file. FIG. 38 shows the data structure of the media information file. In the media information file, the name of its associated moving picture file, the name of the empty area file, and a list of names of the files to be written by the post-recording (i.e., the substitute audio file, still picture file and so on) are described. In addition, the interleaving area availability management information is also described there.

Hereinafter, the media information file will be described more fully with reference to FIGS. 37 and 38. The media information file MOVE0001.MIF makes reference to a moving picture file, a substitute audio file and still picture files. Accordingly, the names of these files are described as references in the media information file. In the example shown in FIG. 37, the still picture files and substitute audio file are stored just before the moving picture data in a continuous data area. The data processor also uses the empty area file MOVE0001.EMP as a reference. The empty area file is defined as a set of empty areas E, in which no files of the continuous data area are present, and may be used as a storage area when a substitute audio file, for example, is stored on the optical disk 131.

More specifically, in the area F1 located just before the moving picture data, two still picture files Nos. 1 and 2 are stored. In that case, in the area name "F1" of the availability management information of the media information file, the file names STILL0001.JPG and STILL0002.JPG of the still picture files Nos. 1 and 2, their start addresses #1 and #2 (which are relative addresses defined with respect to the top of the file F1) and their data sizes are described. As shown in FIG. 38, by reference to this media information file, the names of files available in combination with a given moving picture file (e.g., substitute audio, still picture and other files to be played back synchronously with the moving picture file) and their storage locations can be found easily. Accordingly, when the user is compiling a play list to play back video and substitute audio synchronously with each other, he or she can use the data easily. Also, even when the same moving picture data, substitute audio and still pictures are used by reference to another play list, the same data can be reused easily because their availability is managed in one location.

In the example shown in FIGS. 37 and 38, a substitute audio file and other files are interleaved with a moving picture data file in each continuous data area and the media information file is used to manage the availability of the interleaving area. However, no matter whether the empty area file stored is interleaved or not, the media information file is always generated to store management information including information about the relationship between the playback time and storage location of the moving picture file.

Next, applications of this media information file will be described. In the media information file, the names of files to be accessed in association with a moving picture file are described. Thus, by using the media information file, a play list that realizes synchronous playback can be made easily (see FIG. 38). That is to say, when an arbitrary playback route is specified with respect to a moving picture file by the user compiled play list, the substitute audio file, still picture files and other files that can be referred to along that moving picture playback route can be identified easily by reference to the media information file. No means for inputting the play list is shown in FIG. 4. However, a mouse, a keyboard or any other known input device may be used as long as the moving picture data to play back and its playback duration can be specified.

FIG. 39 shows the data structure of a play list file. In this play list file, a list of the names of files to be referred to by the play list and playback control information are described. Each of the files to be referred to by the play list starts being played back at the playback timing described in the playback control information and continues to be played back in the playback duration specified. When the user specifies the data to play back synchronously and their playback timings, the writing control section 161 or post-recording writing control section 162 collects information about that moving picture file, locates the names of the still picture and substitute audio files included in its playback route in the media information file, and detects their playback timings and playback durations and describes them on the play list file in accordance with the user's instructions.

It should be noted that the writing section 120 preferably writes the media information file and play list file on the optical disk 130 such that these files are physically concentrated in one location. This is because the pickup 130 can quickly retrieve these files into a memory (e.g., the buffer memory 164) at a time. For example, if the user deletes the still picture files, then the media information file and play list to manage the still picture files need to be modified. However, once the respective data on the memory have been modified, the pickup 130 can write all of those data on the optical disk 131 at a time without performing any seek operation.

Figure 40:
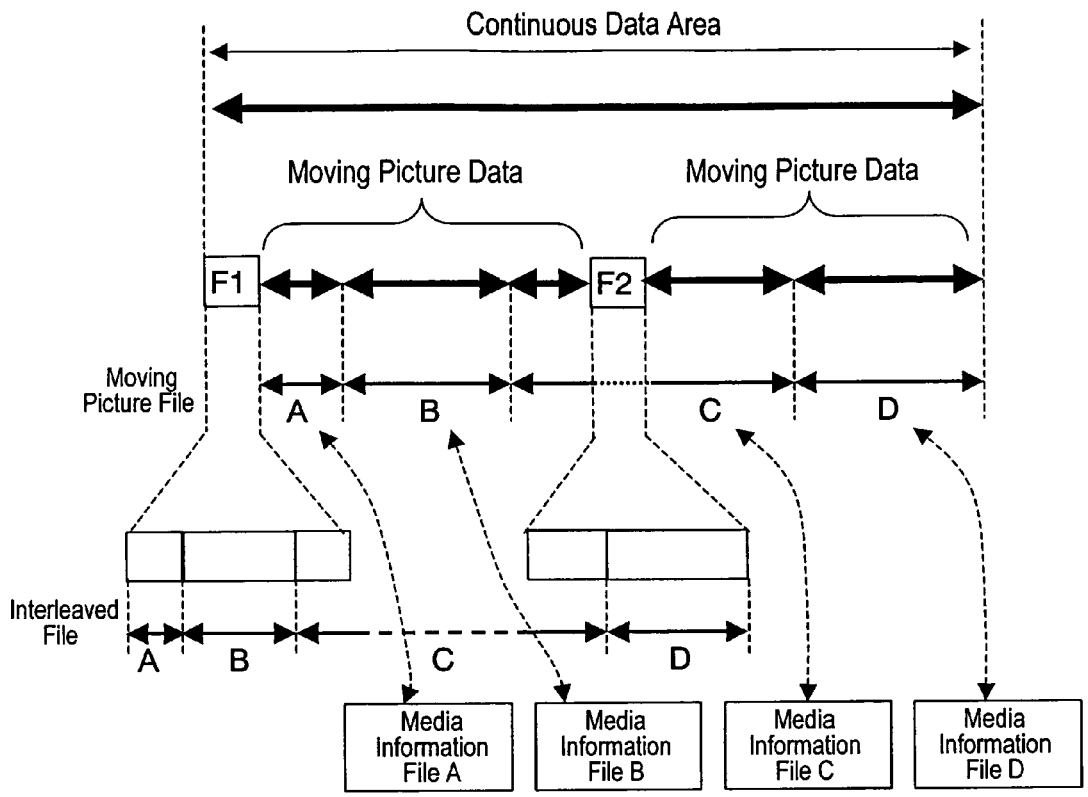
FIG. 40 shows an exemplary arrangement of moving picture files and interleaved files to be stored in a continuous data area.

Optionally, a plurality of moving picture files and files interleaved between them may be arranged in a single continuous data area. FIG. 40 shows an exemplary arrangement of moving picture files and interleaved files to be stored in a continuous data area. In this case, if the video recording is carried out in a short time, the post-recording writing control section 162 can store a plurality of files A, B, C and D in a single continuous data area for moving picture data. Even so, a media information file is generated for each of those moving picture files. In each media information file, information about its associated moving picture file, such as a substitute audio file, is described as described above. By adopting such a recording format, the interleaving areas can be used effectively.

Figure 41:
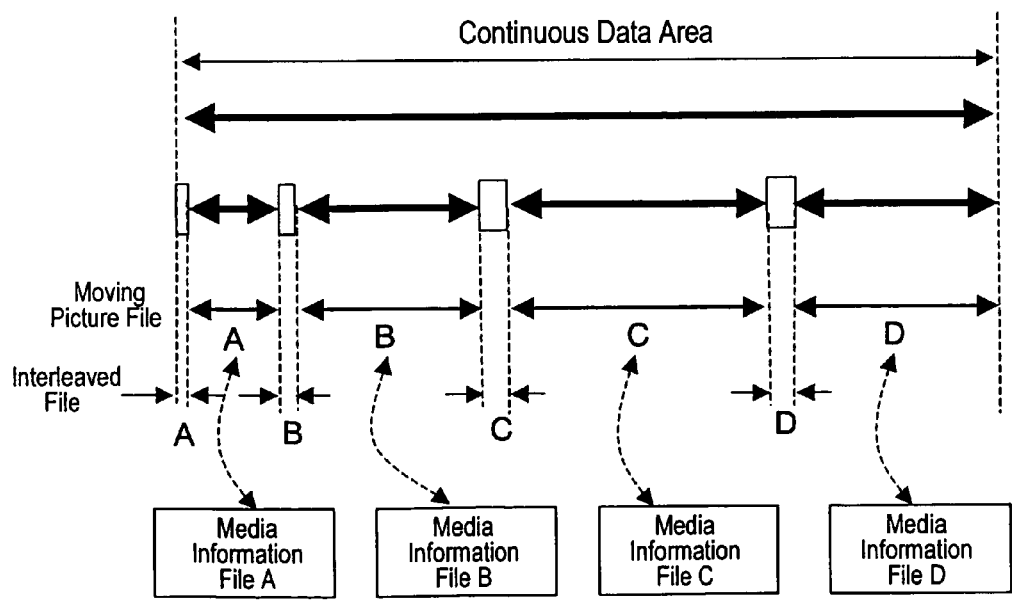
FIG. 41 shows another exemplary arrangement of moving picture files and interleaved files to be stored in a continuous data area.

FIG. 41 shows another exemplary arrangement of moving picture files and interleaved files to be stored in a continuous data area. More specifically, the continuous data area shown in FIG. 41 consists of a plurality of moving picture files and files interleaved between them where the moving picture recording session time is shorter than a playback duration corresponding to the minimum length of the continuous data area. In such a case, the post-recording writing control section 162 can shorten the playback duration of the substitute audio to the same length as that of the moving pictures by reducing the data size of the interleaving area. To provide the post-recording area, however, the moving picture data recording length needs to be determined in advance. The recording mode adopted needs to be defined so as to stop the recording automatically after a recording session of 5 seconds, for example. Alternatively, even when a normal recording mode is adopted, the storage locations of the moving picture data need to be rearranged such that the post-recording area becomes shorter if no recording time is short. Even by adopting such a recording method, the interleaving areas can also be used effectively.

Figure 42:
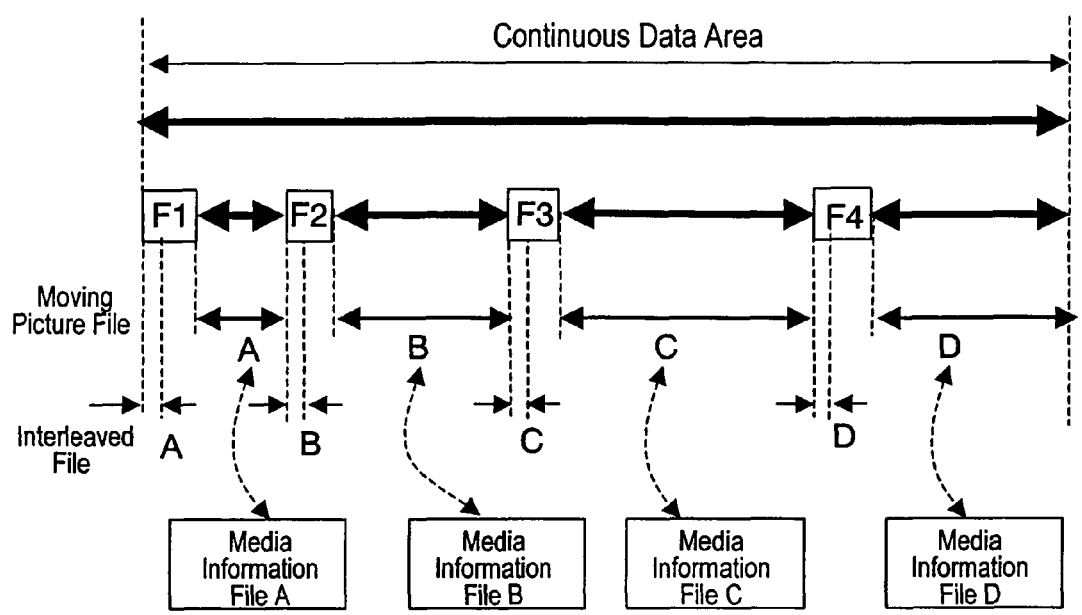
FIG. 42 shows still another exemplary arrangement of moving picture files and interleaved files to be stored in a continuous data area.

FIG. 42 shows still another exemplary arrangement of moving picture files and interleaved files to be stored in a continuous data area. Unlike the example shown in FIG. 41, the data size of the interleaving areas F1 through F4 remains the minimum data size of the substitute audio areas, and only the data size of the moving picture data portions may be reduced in the example shown in FIG. 42. In this case, however, the size of the interleaving areas to store the post-recorded data increases and therefore the recording efficiency might decrease.

Figure 43:
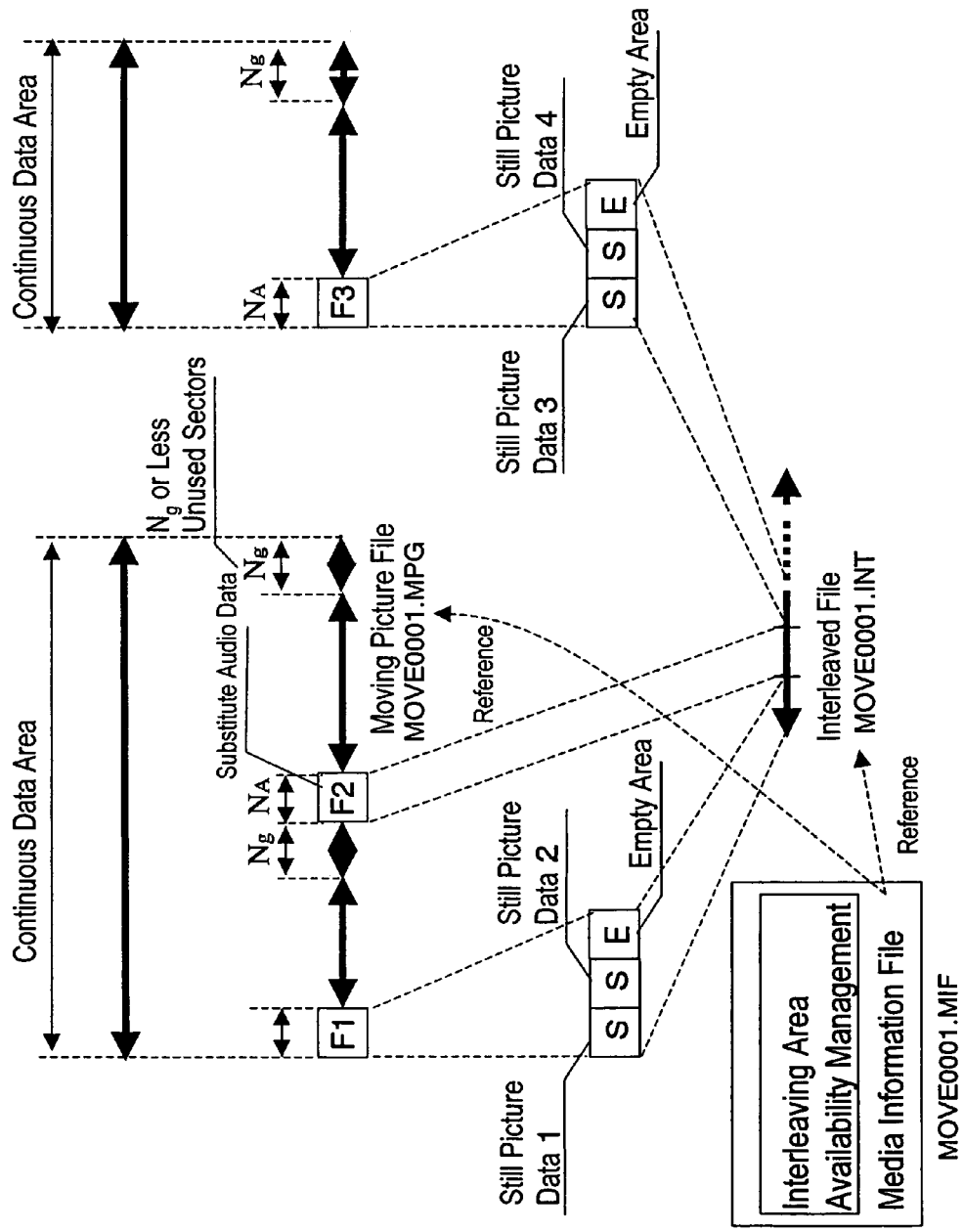
FIG. 43 shows a media information file that makes reference to moving picture files and an interleaved file.
Figure 44:
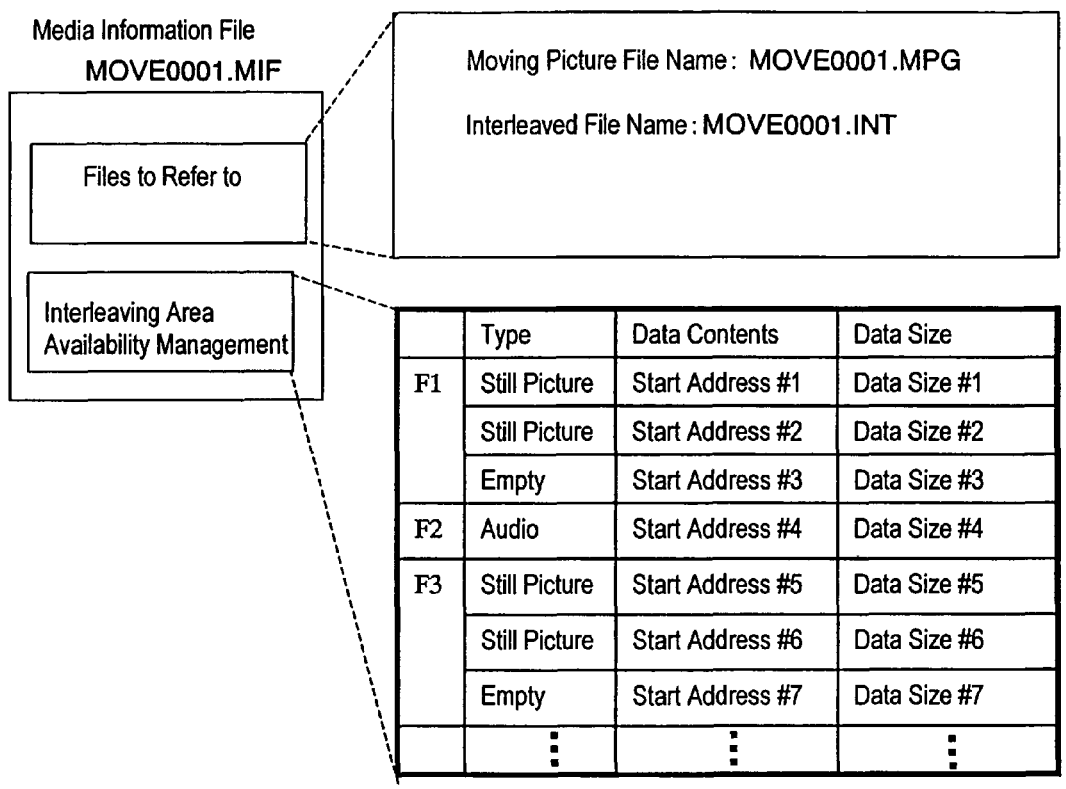
FIG. 44 shows the data structure of a media information file that makes reference to a moving picture file and an interleaved file.

In the foregoing description, moving picture data and respective data files, stored in its associated interleaving area, are supposed to be managed in a media information file. Alternatively, the respective data in each interleaving area may be processed as a portion of the data stored in one interleaved file as shown in FIG. 43. The media information file shown in FIG. 43 makes reference to only the moving picture files and the interleaved file. FIG. 44 shows the data structure of a media information file that makes reference to a moving picture file and an interleaved file. In the interleaved file, substitute audio, still picture data, empty area and so on are defined, and their types are shown in the "type" column. Compared with a situation where the substitute audio data, still picture data and so on are treated as individual files, the amount of each file's specific data, including the header of the file, can be reduced.

Figure 45:
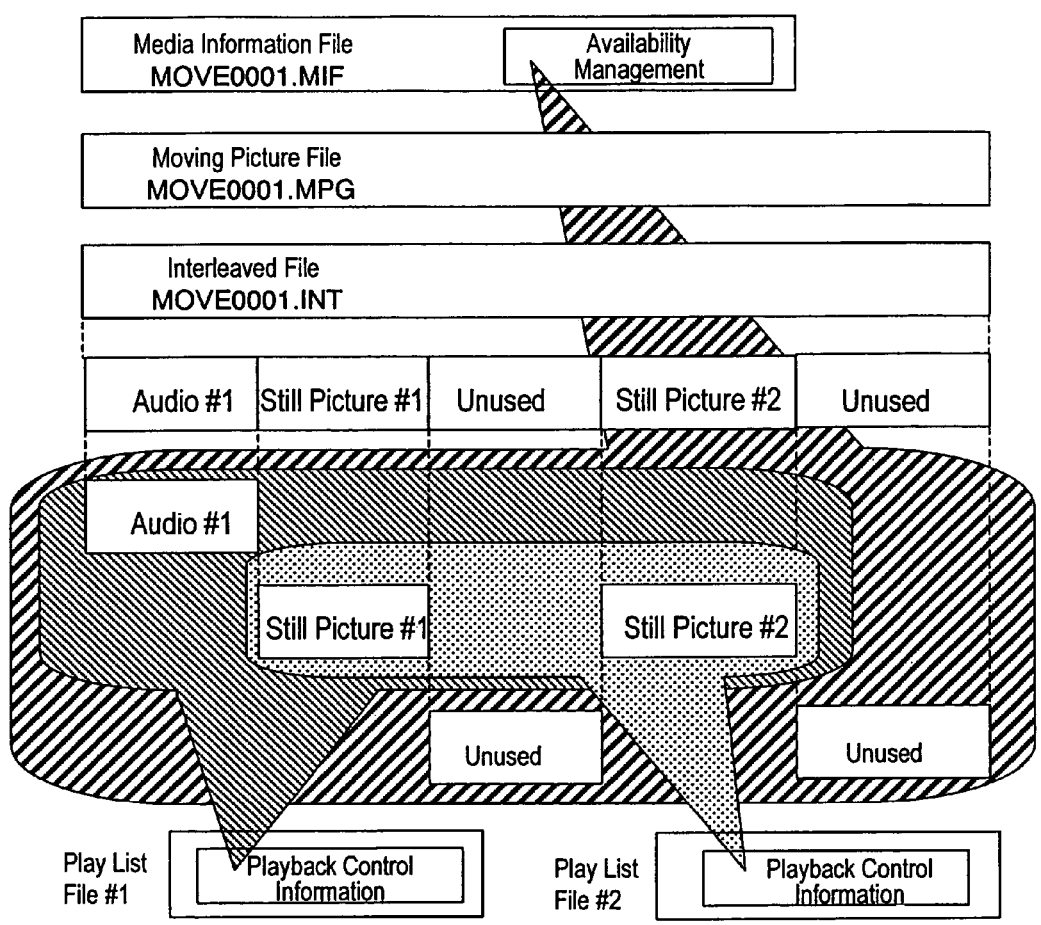
FIG. 45 shows the management structure of various types of data in an interleaved file.

Next, a modified example of making a play list file will be described. FIG. 45 shows the management structure of various types of data in an interleaved file. As described above, either the writing control section 161 or the post-recording writing control section 162 records the availability of the storage area as determined by the various types of data in the interleaved file (i.e., substitute audio and other audio data, still picture data and unused area) in the media information file. Specifically, Play List File #1 holds the types of information, data locations, playback timings and so on of Audio #1, Still Picture #1 and Still Picture #2 in the playback control information. In the same way, Play List File #2 holds the types of information, data locations, playback timings and so on of Still Picture #1 and Still Picture #2 in the playback control information. Either the writing control section 161 or the post-recording writing control section 162 makes a play list file based on the media information file as described above.

Figure 46:
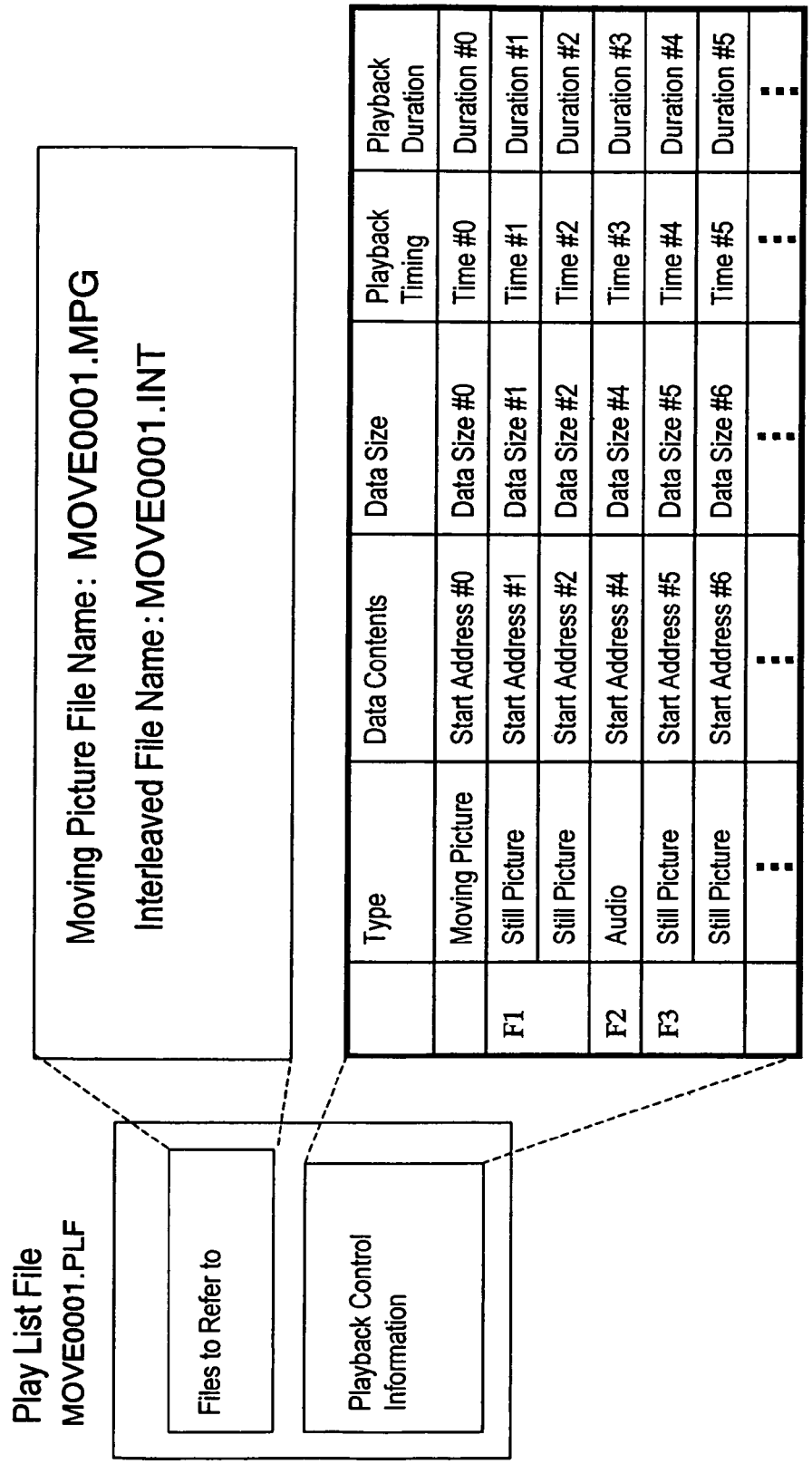
FIG. 46 shows the data structure of a play list file that makes reference to not only a moving picture file but also an interleaved file.

FIG. 46 shows the data structure of a play list file that makes reference to not only a moving picture file but also an interleaved file. Portions of the data in the interleaved file correspond to the substitute audio data, still picture data and other data in the interleaving area. Accordingly, if each play list being made is searched with MOVE0001.INT, then the availability and unused areas can be known. That is to say, there is no need to search the playback control information of existent play lists, and therefore, a new play list can be made more easily.

In FIG. 45, both the audio data and still picture data are supposed to be stored in the interleaved file. Alternatively, the audio data or still picture data may be stored as an audio data file or a still picture data file independently of the interleaved file. If such an independent file is used, then the interleaved file will include only unused areas. Even so, however, the physical locations of the data areas, originally allocated to the interleaved file, are supposed to remain unchanged.

Figure 47:
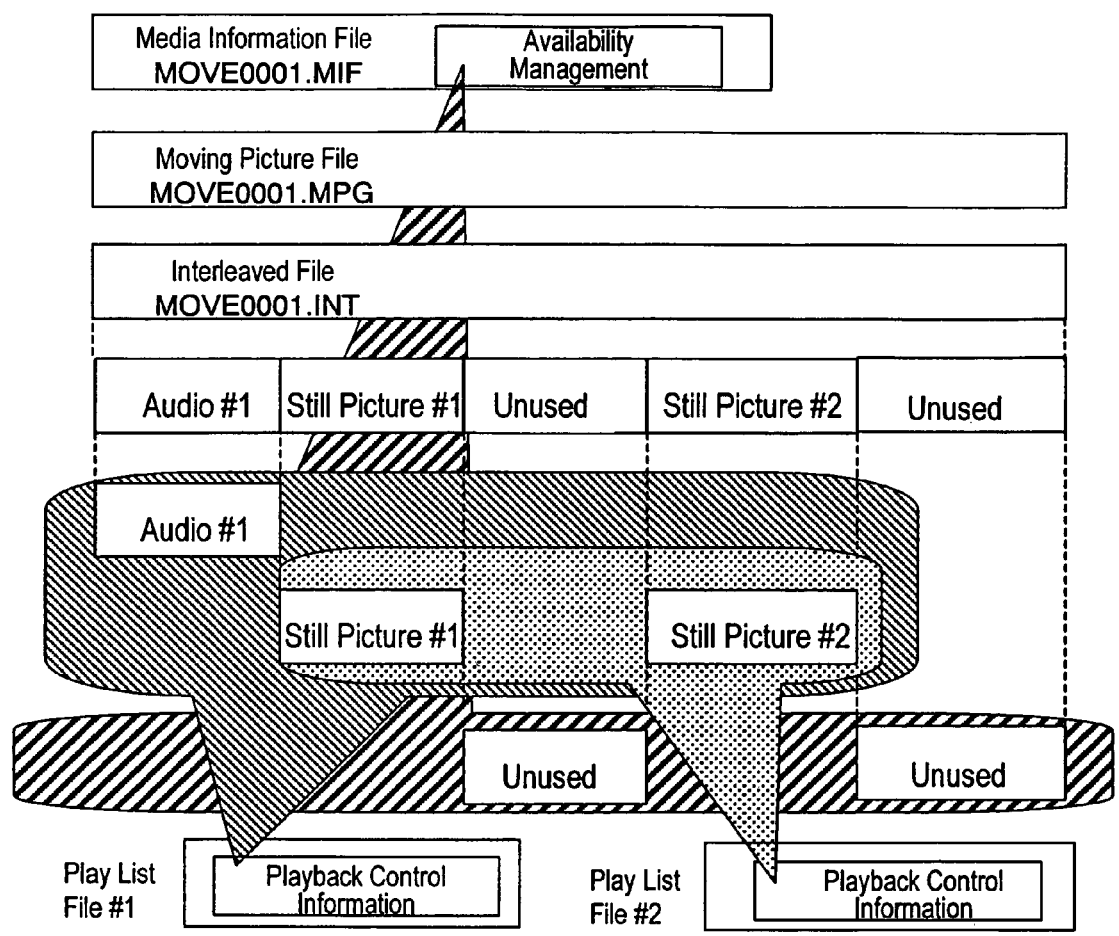
FIG. 47 shows a management structure for various types of data in an interleaved file according to a second preferred embodiment.

FIG. 47 shows a management structure for various types of data in an interleaved file according to this preferred embodiment. The difference from FIG. 45 is that the availability management information stored in the media information file includes information about unused areas only.

Figure 48:
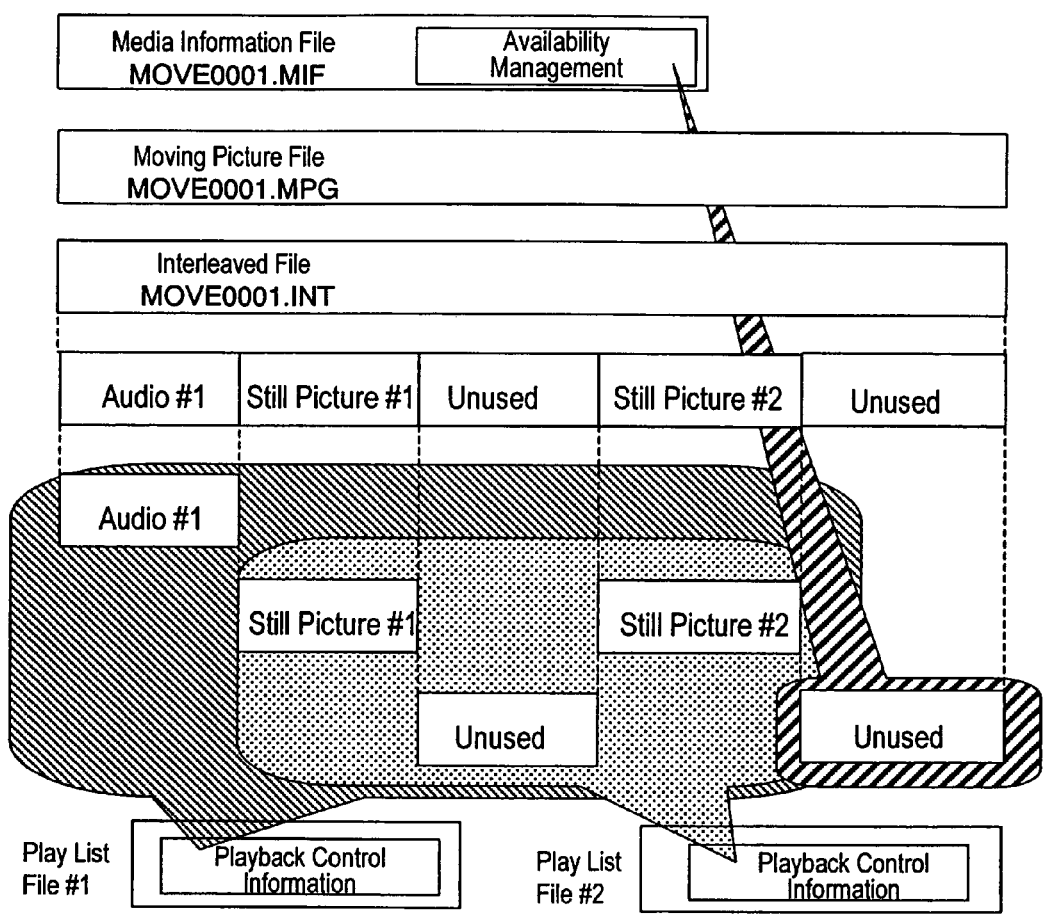
FIG. 48 shows clearly how to manage only an unused area that is not referred to by a play list.

FIG. 48 shows another management structure for various types of data in an interleaved file according to this preferred embodiment. As shown in FIG. 48 clearly, only an unused area that is not referred to by a play list is the object of management. By making reference to the media information file while a new play list is being compiled, the unused data area can be located easily. In that case, however, the availability of data needs to be checked by searching all play list files that refer to MOVE001.MPG.

Figure 49:
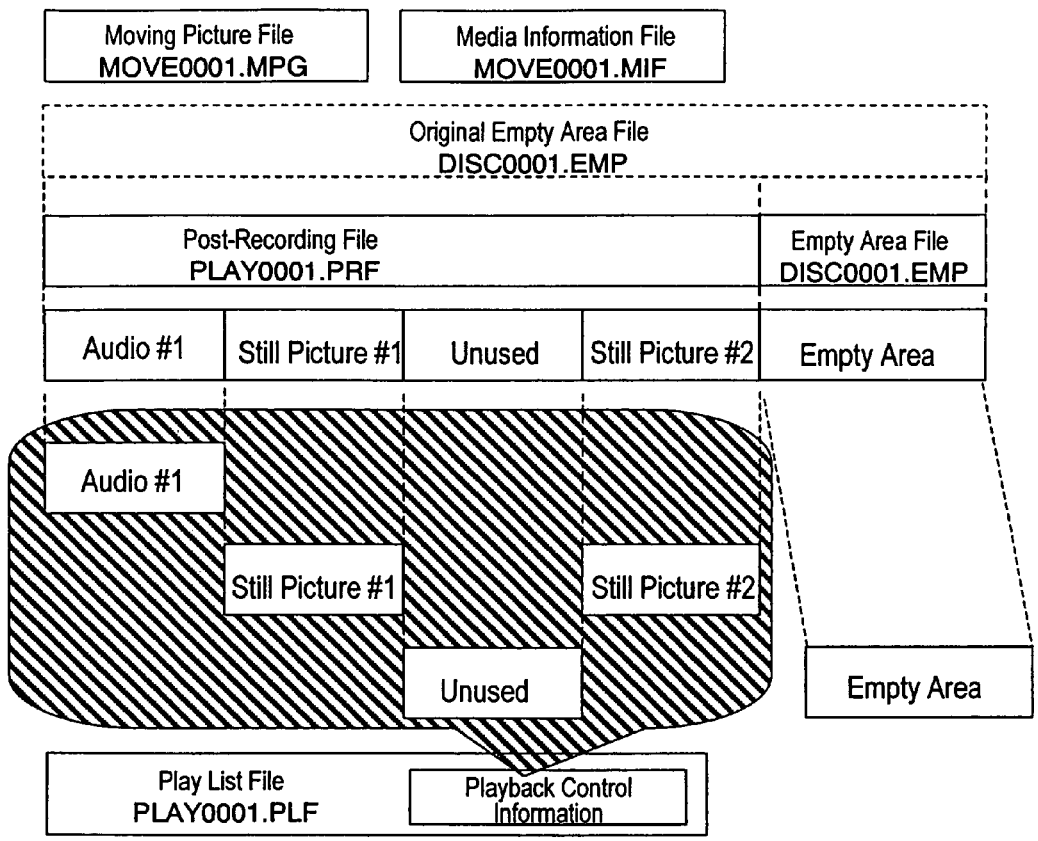
FIG. 49 shows another management structure for various types of data in an interleaved file according to the second preferred embodiment.

FIG. 49 shows another management structure for various types of data in a non-interleaved post-recording file according to this preferred embodiment. In this management structure, the availability of a reserved empty area is managed only with a play list. That is to say, the data types (such as substitute audio, still picture and unused area), their start addresses and so on in a post-recording file generated afterward are managed as playback control information in a play list file. In that case, however, if various types of data in an existent post-recording file are reused while a new play list is being compiled, then the availability needs to be checked by searching the playback control information in an existent play list.

Embodiment 3

In the first and second preferred embodiments of the data processor, the storage location of a generated file on the optical disk has not been particularly mentioned. Depending on the storage location of a file, however, the more often it takes a shorter seek time, the less likely the amount of data in the buffer decreases. As a result, increase in resistance to vibrations and other advantages are achieved. That is to say, even if the pickup has deviated from the target read location due a vibration, data is more likely to still remain in the memory and exhaustion of data to read is less likely to happen. In addition, the shorter the seek time, the shorter the delay caused before the synchronous playback can be started. On top of that, the access margin allowed can be afforded to another access. Besides, the user does not have to leave an after recording area intentionally. Thus, even if the user suddenly wants to do after recording afterward, it is possible to avoid an unwanted situation where he or she cannot do that due to the lack of remaining storage area. Hereinafter, preferred storage locations and their associated applications will be described with these advantages taken into consideration.

Figure 50:
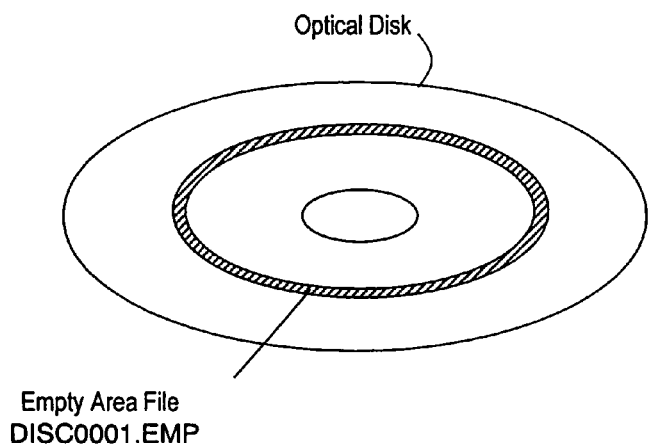
FIG. 50 illustrates an example in which an empty area file DISC0001.EMP is located almost at a halfway point in the storage area of an optical disk in its radial direction.

FIG. 50 illustrates an example in which an empty area file DISC0001.EMP is located almost at a halfway point in the storage area of an optical disk in its radial direction. As used herein, to be "located almost at a halfway point in the storage area of an optical disk" refers to the center of a range defined with respect to that halfway point so as to cover approximately 3% of the storage capacity of the optical disk. After the emptiness has been confirmed by the area detecting section 160, the storage location is determined by either the writing control section 161 or the post-recording writing control section 162. By storing substitute audio data afterward in the empty area in the empty area file, the maximum distance and the longest time that the pickup should move in seeking from moving picture data to audio data, or vice versa, can be halved. Optionally, it may be a moving picture file that is stored approximately at the halfway point of the storage area on the optical disk. This is because even if the moving picture file is stored at such a location, the maximum distance and the longest time that the pickup should move in seeking from moving picture data to audio data, or vice versa, can also be halved in quite the same way as in the previous example. This statement will also apply to each of the following examples.

Figure 51:
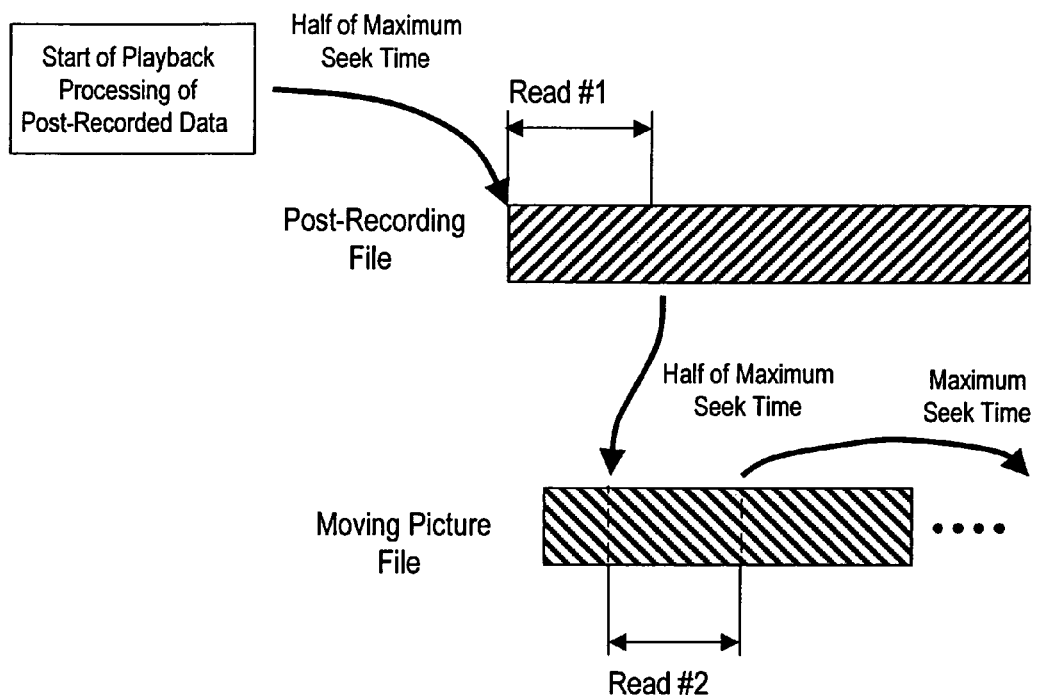
FIG. 51 shows the order of operations to be done by the pickup 130 in playing back video and substitute audio synchronously with each other.

FIG. 51 shows the order of operations to be done by the pickup 130 in playing back video and substitute audio synchronously with each other. First, the pickup 130 moves to reach a post-recording file (i.e., a file storing substitute audio data or still picture data). In this process step, the longest seek time it possibly takes for the pickup 130 to make that move is half of the maximum seek time $T_{SEEK}$. Next, the post-recording file is read (Read #1). Thereafter, the pickup 130 moves from the post-recording file to a moving picture file. In this process step, the longest seek time it possibly takes for the pickup 130 to make that move is also half of the maximum seek time $T_{SEEK}$. As a result, the total amount of time it takes for the pickup 130 to make these two moves can be halved in going back and forth between the moving picture file and the audio file. Consequently, the amount of video data to be retained in the buffer memory 164 can be reduced. In addition, the delay in the start of playback can be cut down by the maximum seek time $T_{SEEK}$.

Figure 52:
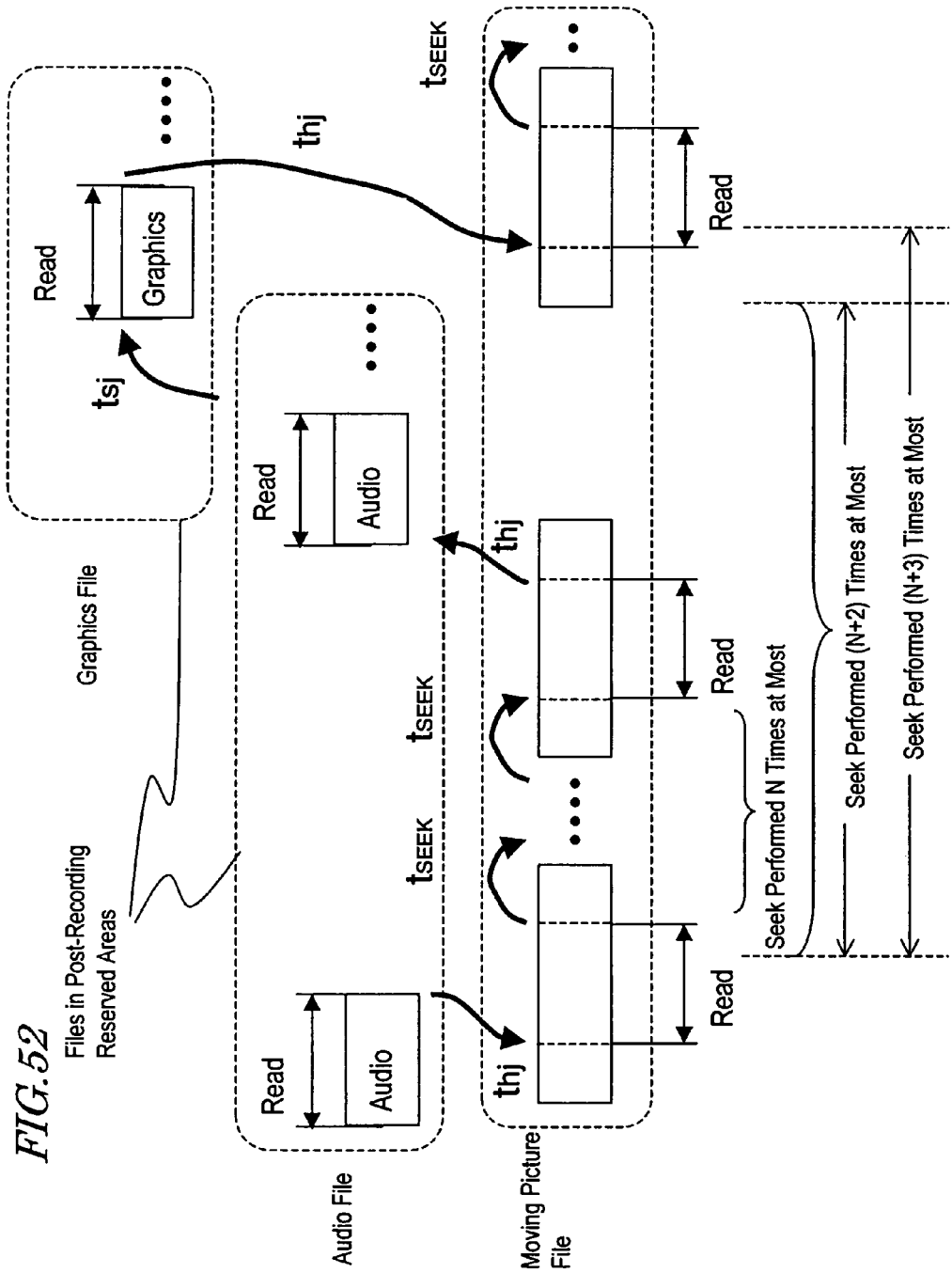
FIG. 52 shows another data reading procedure according to this preferred embodiment.

FIG. 52 shows another data reading procedure according to this preferred embodiment. In this example, not only a moving picture file and an audio file about substitute audio but also a graphics file are read. The audio file and the graphics file are obtained as a result of the post-recording. Accordingly, parts of the empty area file shown in FIG. 50 are allocated as their storage areas. Thus, the same advantages as those achieved in FIG. 51 are also achieved here. The pickup 130 reads the audio file first and then seeks the storage area of the target moving picture file to read. In this process step, the seek time may be approximately half ($t_{hj}$) of the maximum seek time $T_{SEEK}$ as described above.

Next, the post-recording writing control section 162 reads the requested portion of the continuous data area of the moving picture file at most n times. In the meantime, seek operation is performed at most (n−1) times. Thereafter, the audio file is read again. The seek time to locate the audio file is half ($t_{hj}$) of the maximum seek time $T_{SEEK}$.

After the audio file has been read, the graphics file is further read. The maximum amount of time it possibly takes to move from the audio file to the graphics file is $T_{sj}$, which is even shorter than half ($t_{hj}$) of the maximum seek time $T_{SEEK}$ because both of these two files are located within the same empty area.

After the graphics file has been read, another seek operation is performed to return to the moving picture file and the moving picture file is read again from a predetermined location.

As described above, by reading the graphics file as well as the moving picture and audio files, seek operation is carried out at most (n+3) times. However, each of the three seek operations to be done between two dissimilar files takes half ($t_{hj}$) or less of the maximum seek time $T_{SEEK}$. As a result, the amount of data to be read continuously can be reduced significantly. In other words, the minimum length of the continuous data area for moving pictures can be further shortened.

In FIG. 52, relationships represented by the following Equations (50) and (51) are satisfied:

$$(V_r - V_o)t_{V-CDA} = Vo \times (n \times T_{SEEK} + 2 \times t_{hj} + t_{sj} + t_{A-CDA} + t_{G-CDA}) \quad (50)$$

$$(A_r - A_o)(t_{A-CDA} + t_{G-CDA}) = A_o \times (n \times T_{SEEK} + 2 \times t_{hj} + t_{sj} + t_{V-CDA}) \times 2 \quad (51)$$

where $t_{G-CDA}$ is the amount of time it takes to read the graphics data from its continuous data area and the other signs are just as already described for the first preferred embodiment. According to these relationships, if $t_{G-CDA}$ is equal to a predetermined bit rate, $t_{V-CDA}$ and $t_{A-CDA}$ can be calculated as in the first preferred embodiment described above.

According to this procedure, even without storing the audio data and the graphics data physically alternately, the amount of moving picture data to be read continuously (i.e., the amount of that data stored in the buffer) to achieve a seamless post-recording playback can be reduced significantly.

Figure 53:
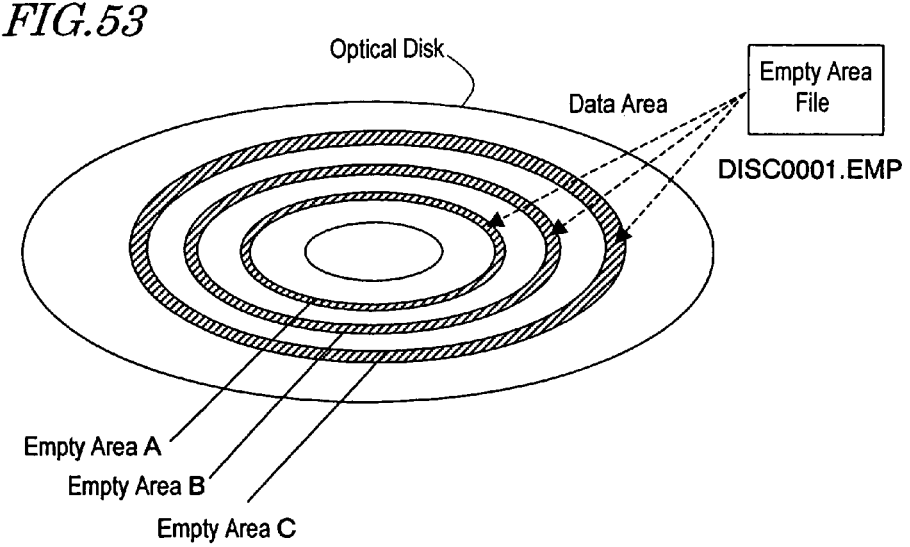
FIG. 53 illustrates an example in which respective empty areas A, B and C, forming the empty area file DISC0001.EMP, are arranged in mutually different locations in the radial direction.

FIG. 53 illustrates an example in which respective empty areas A, B and C, forming the empty area file DISC0001.EMP, are arranged in mutually different locations in the radial direction. For example, the location represented by the empty area B may correspond to the shadowed area shown in FIG. 50. Each of these areas may refer to a range that covers at most 3% of the storage capacity of the optical disk. Even if the empty areas are provided as shown in FIG. 53, the amount of time it takes to move the pickup 130 can still be shorter than the maximum seek time $T_{SEEK}$. As a result, the rate at which the data decreases in its buffer can be minimized.

Figure 54:
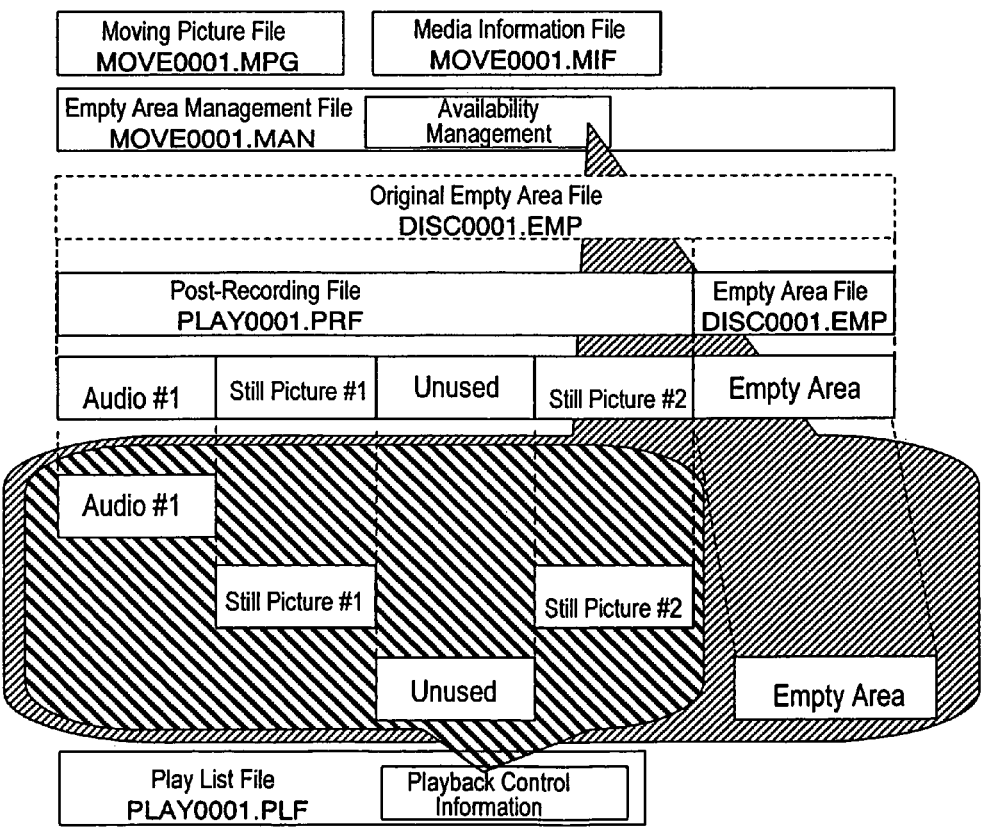
FIG. 54 shows an example in which part of an original empty area file is allocated as a post-recording file.

FIG. 54 shows an example in which part of an original empty area file is allocated as a post-recording file. As the storage area of a play list PLAY0001.PLF on the optical disk 103, part of the area reserved for the original empty area file is used. The rest of the empty area is redefined as an empty area file DISC0001.EMP with a reduced data size.

The data types and addresses in the post-recording file and the addresses in the empty area are stored as availability management information in an empty area management file MOVE0001.MAN. The empty area management file manages the originally reserved empty area for post-recording on the overall optical disk. As that empty area is going to be occupied by post-recording after that, the empty area management file manages how the original empty area is used.

Figure 61:
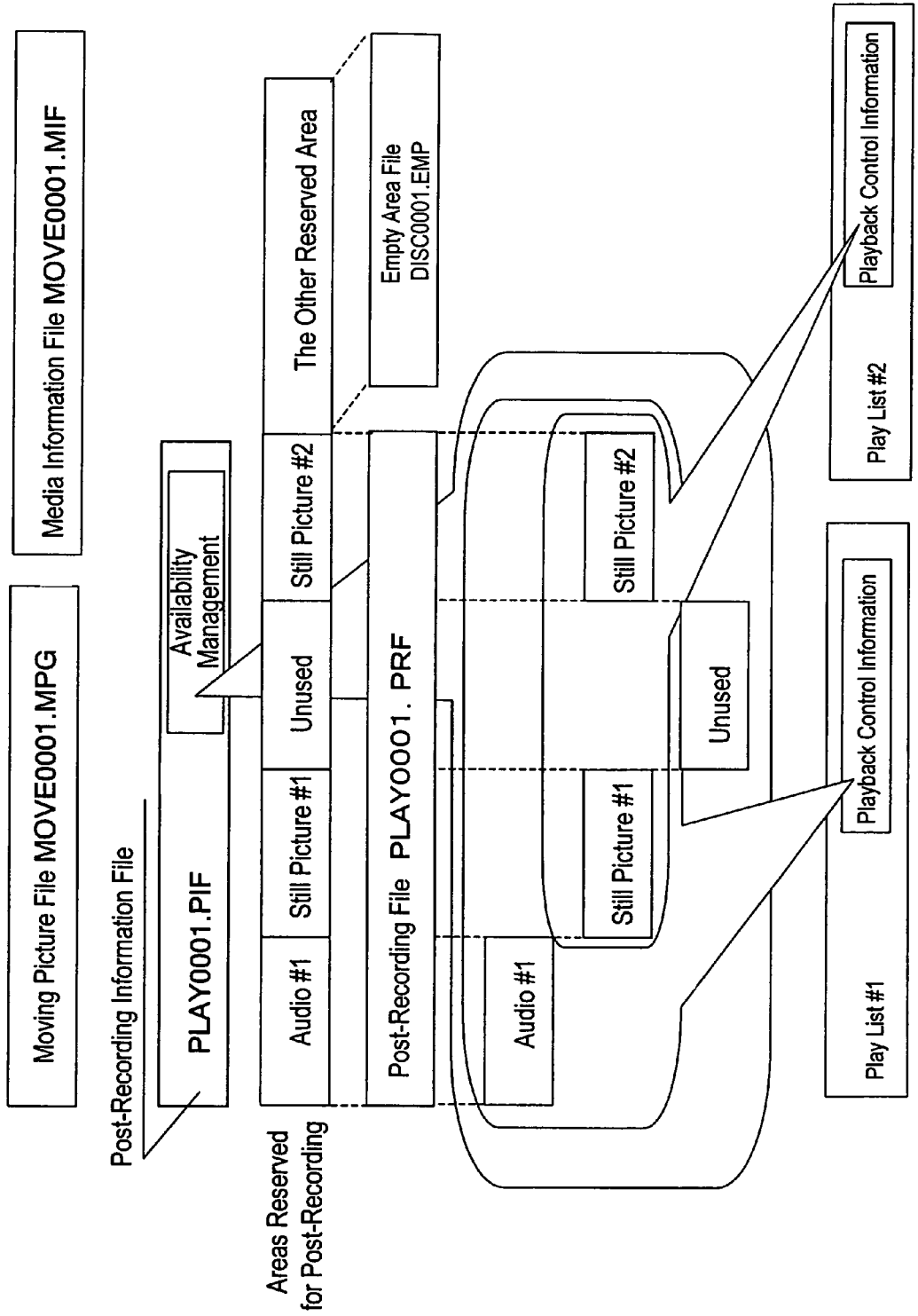
FIG. 61 shows how the availability of local areas of an optical disk may be managed by providing a post-recording information file.
Figure 62:
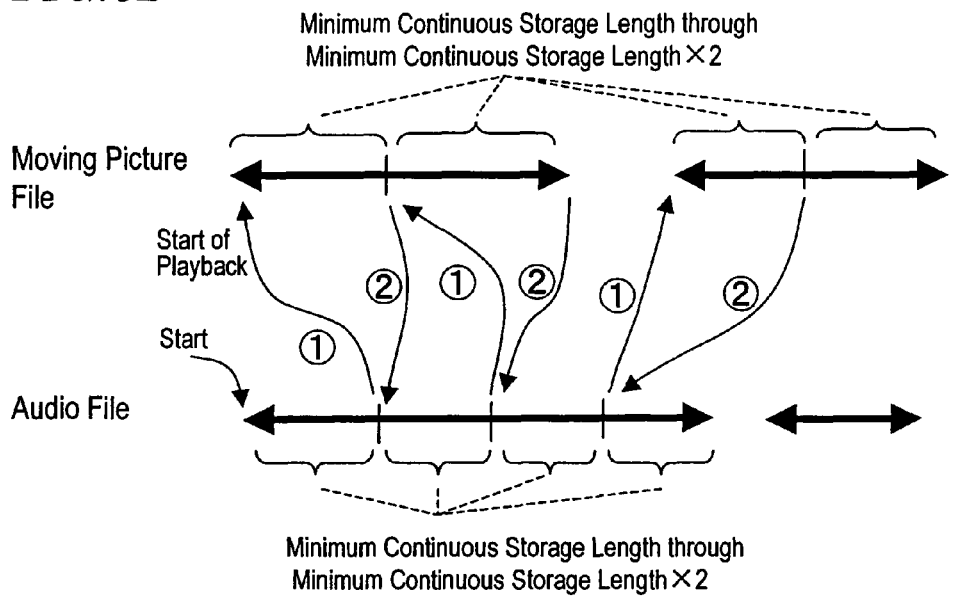
FIG. 62 shows the physical data arrangement of non-interleaved moving picture and substitute audio files and the order in which those data are read during synchronous playback.

On the other hand, FIG. 61 shows an example in which the availability of local areas on an optical disk is managed by providing a post-recording information file. The management method shown in FIG. 61 is a variation of that shown in FIG. 54. More specifically, both of the methods shown in FIGS. 54 and 61 relate to data management to be carried out when substitute audio data or any other data is interleaved between the continuous data areas for moving picture files. However, in FIG. 54, the empty area management file manages the availability of a reserved empty area for post-recording on the overall optical disk. In FIG. 61 on the other hand, the post-recording information file manages the availability of empty areas over the entire optical disk. It should be noted that the data areas are managed as in the empty area management file described above.

By using the post-recording information file, the data processor may record the files in the following order. First, while the optical disk is being formatted, the writing section 120 writes a reserved area file DISC0001.EMP in the central area on the disk. Next, the optical disk drive writes a moving picture file and a media information file. Thereafter, to make post-recording of substitute audio, still picture and so on, a post-recording file PLAY0001.PRF and a post-recording information file are generated to allocate part of the area owned by the reserved area file DSC0001.EMP. Thereafter, the area of the post-recording file is allocated to the audio file. The rest is owned by the post-recording file continuously. Then, a play list file for synchronously playing back the moving picture file and the audio file is recorded. As shown in FIGS. 54 and 61, the play list is compiled, and the playback process with the play list is carried out, by using the moving picture file, the media information file to manage the time stamp of the moving picture file, the post-recording information file to manage the data to be post-recorded or already post-recorded, the post-recording file for reserving the unused portion of the post-recording area and the play list file to define the play list.

Figure 55:
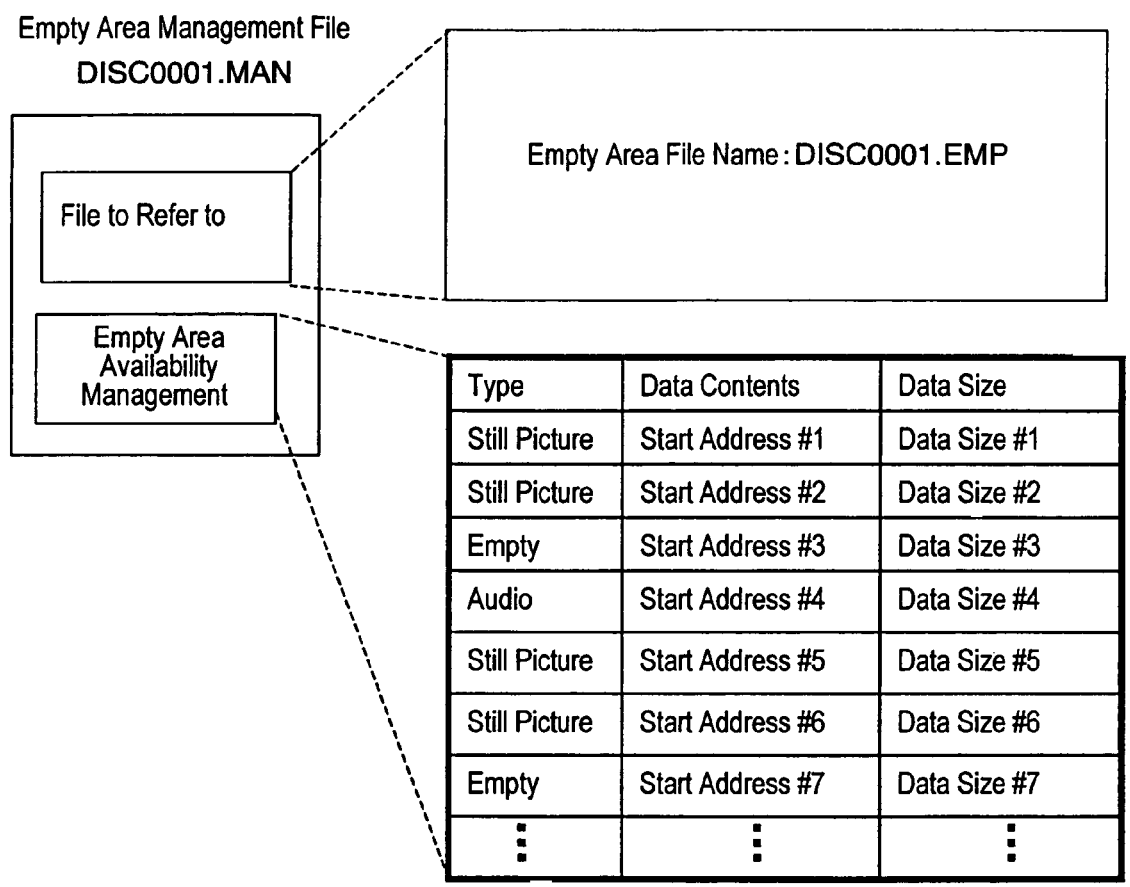
FIG. 55 shows the data structure of an empty area management file.

FIG. 55 shows the data structure of an empty area management file. The empty area management file DISC0001.MAN describes what types of data are stored in what locations and in what sizes for all of the original empty areas. Meanwhile, the play list PLAY0001.PLF shown in FIG. 54 refers to and manages Audio #1, Still Picture #1, Still Picture #2 and Unused Area. The information to make reference to these data is the playback control information as already described for the second preferred embodiment. It should be noted that this playback control information also manages available addresses even for the unused areas.

As described above, the empty area management file always manages the availability of every empty area file originally reserved for post-recording. For that reason, while a new play list is being compiled, the various types of data in the empty area management file can be reused easily. In addition, any empty area can be located efficiently by reference to the availability management information in the empty area management file.

Figure 56:
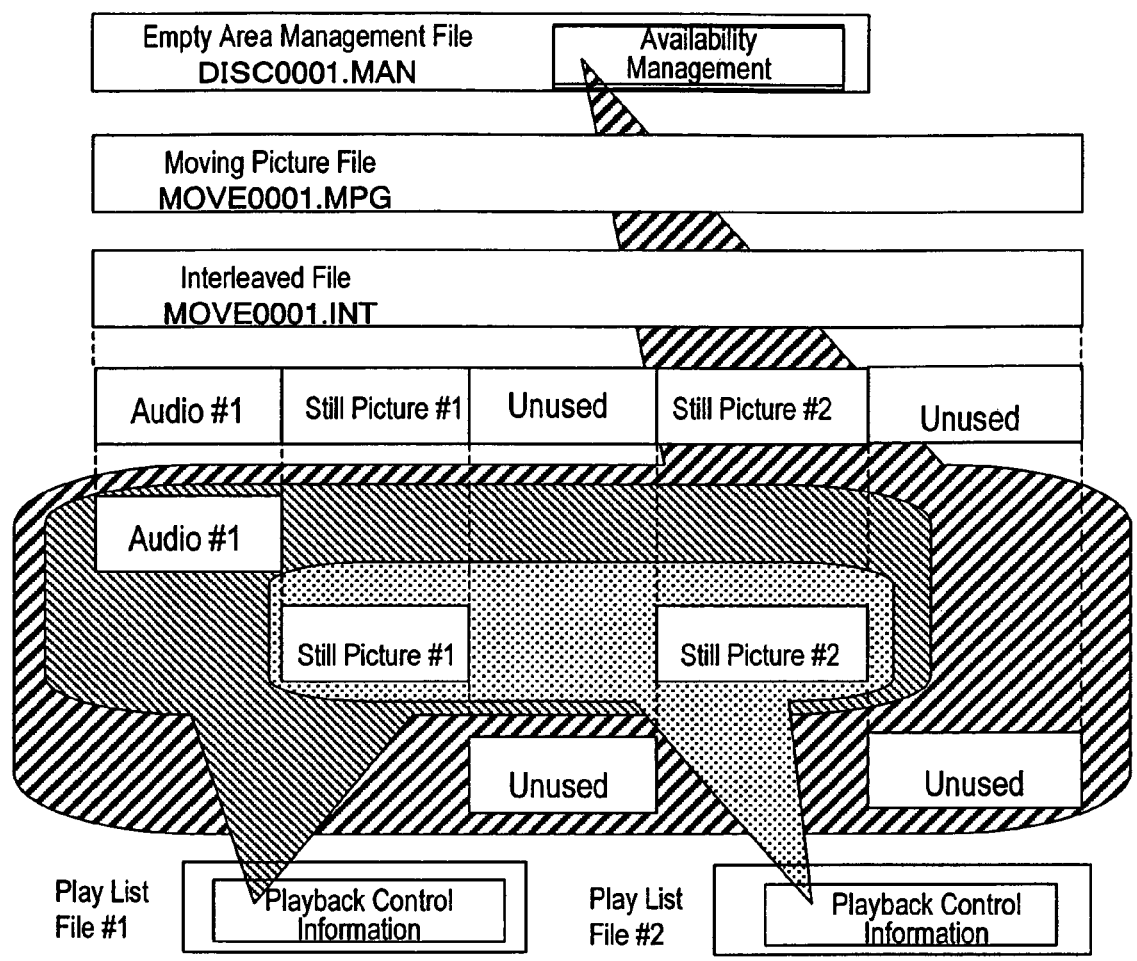
FIG. 56 shows an exemplary data structure where no media information files are provided.

FIG. 56 shows an exemplary data structure where no media information files are provided. In this example, the availability of all interleaving areas can be managed and applied collectively by the empty area management file DISC0001.MAN with no media information files defined. In this case, the data structure of the empty area management file may be the same as that shown in FIG. 55.

Figures 57, 58:
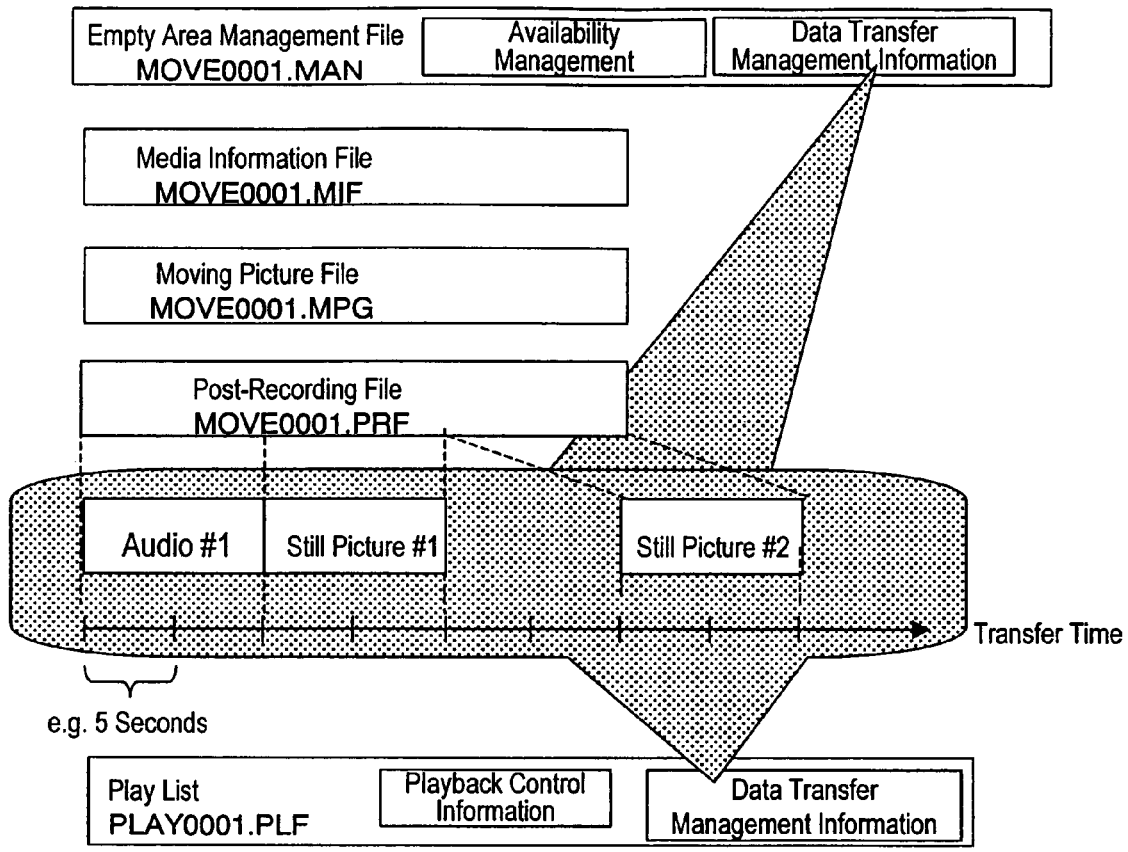
FIG. 57 shows an example in which data transfer management information is included in an empty area information file.
FIG. 58 shows an example of such data transfer management information.

FIG. 57 shows an example in which data transfer management information is included in the empty area information file. The data transfer management information manages data to be transferred every five seconds and the storage location of that data. For example, the Audio #1 data should be read within 10 seconds after the post-recording playback was started, while the Still Picture #1 data should be read within 20 seconds after the post-recording playback was started.

Also, the Still Picture #2 data should be read within the period of 30 to 40 seconds after the post-recording playback was started.

FIG. 58 shows an example of such data transfer management information. The data size shows the size of the data to be read in five seconds. It shows that audio data of 0.256 Mbps should be read in the first five seconds and in the next five seconds. It also shows that Still Picture #2 should be read in the next ten seconds and that there is no data to read in the next ten seconds. It further shows that Still Picture #2 should be read in the next ten seconds.

If the transfer time is managed by providing the data transfer management information, the amount of data to read can be determined efficiently while data is being read from the post-recording file. For example, even if the amount of data that has been read from the post-recording file during the first read operation corresponds to a transfer time of 60 seconds under the given seek performance and data transfer time conditions, that data may need to be read in just 40 seconds by a disk drive operating faster. Thus, the data to be read in 40 seconds and their storage location can be known by reference to the data transfer management information. Also, the data processor may operate so as to write only necessary data in the post-recording file as long as the processor is supposed to perform such processing. That is to say, if there is no data to transfer during a certain transfer period, then no data needs to be written in the post-recording file. On the other hand, were it not for such data transfer management information, unused data areas should be reserved in the post-recording file. In addition, without the data transfer management information, data should be transferred at a fixed bit rate from the post-recording file.

Figure 59:
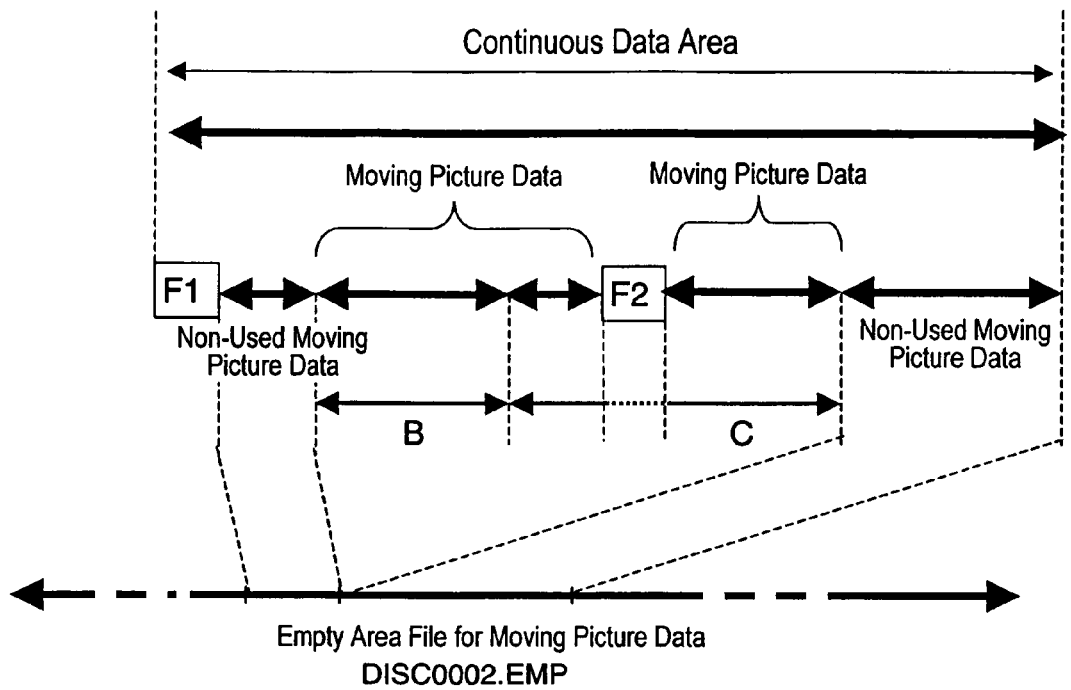
FIG. 59 shows an example in which an empty area file is provided for moving picture data.

Meanwhile, FIG. 59 shows an example in which an empty area file is provided for moving picture data storage areas, not for the post-recording storage areas. Suppose a data stream, in which moving picture data and substitute audio data are interleaved together, has been edited such that the first and last portions of the moving picture data are deleted. In the interleaved moving pictures, their portions that have been deleted by the editing processing and are no longer needed are handled as data that make up the disk empty area file DISC0002.EMP for moving picture data. That is to say, portions of the moving picture file, identified by the empty area file, can be regarded as being excluded from playback.

Figure 60:
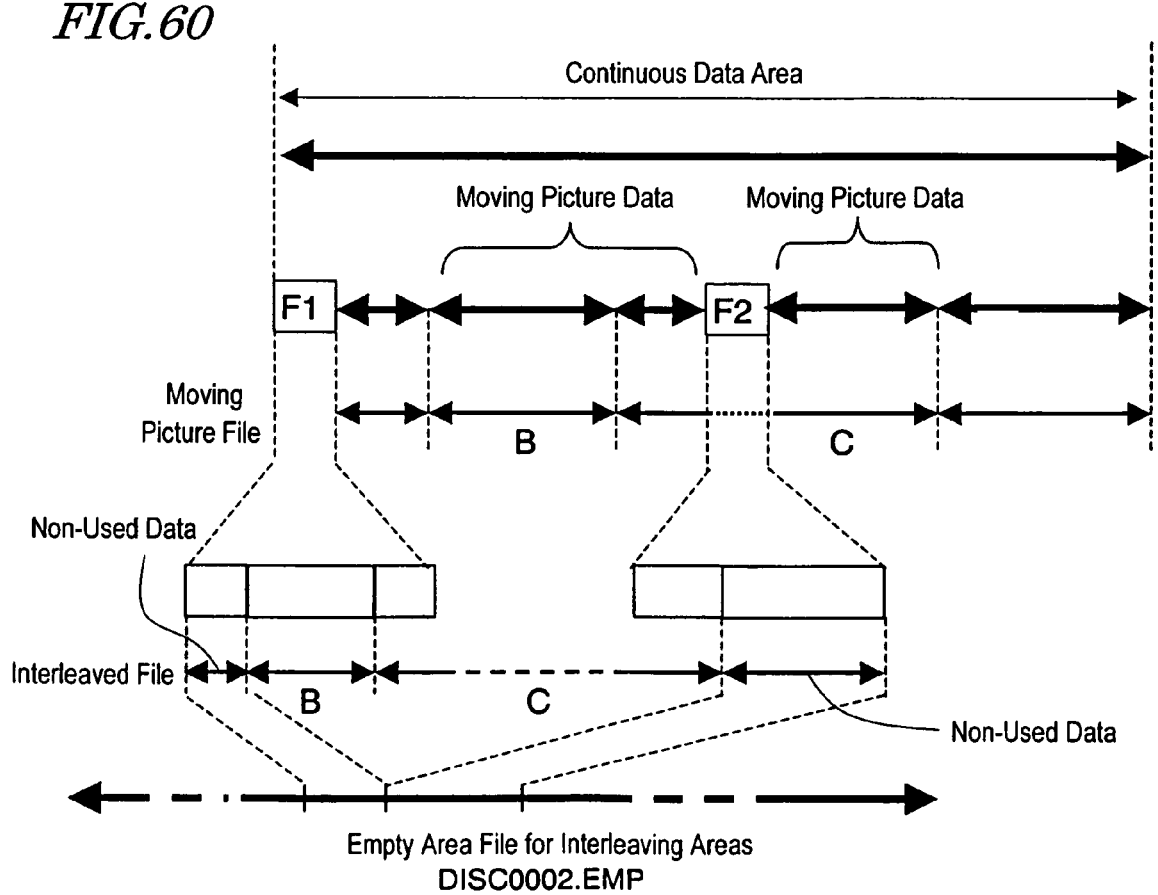
FIG. 60 shows an example in which an empty area file is provided for an interleaving area.

This example equally applies to interleaved data in the post-recording storage areas. FIG. 60 shows an example in which an empty area file is provided for an interleaving area. As in the example of the moving picture data, portions of the data in the interleaving area, which have been deleted and are no longer needed, may be handled as data that make up the empty area file DISC0001.EMP for moving picture data.

It should be noted that the storage areas of the data that now form parts of the empty area management files DISC0002.EMP and DISC0003.EMP may retain the data as they are or may be used to store any other file such as a still picture file recorded.

In the third preferred embodiment of the present invention, an example in which an area is extracted from the empty area file DISC0001.EMP when after recording is carried out by the non-interleaving technique has been described. However, if there is any other empty area on the disk, a totally different unused area may be allocated as well.

In a preferred embodiment of the present invention, not only the audio but also still picture data, graphics data, text data, moving picture data, execution programs and so on may be stored in the area that stores the substitute audio data.

In various preferred embodiments of the present invention described above, the minimum length (i.e., minimum size) unit of the continuous data areas to store moving pictures, still pictures, graphics and so on is one of transfer time, playback duration and presentation time, which are convertible as represented by respective equations. Also, as to the playback duration and transfer time, the one second delay caused by the system target decoder model also needs to be taken into consideration as described for the first preferred embodiment.

In the preferred embodiments described above, the logical block has a size of 32 KB and the sector has a size of 2 KB. Alternatively, the logical block size may be an integral multiple of the sector size. For example, the logical block size may be 16 KB and the sector size may be 2 KB. As another alternative, both logical block size and sector size may be 2 KB, too.

Also, in the preferred embodiments described above, the play list file may be described in the QuickTime format. Alternatively, in those preferred embodiments, the timing to play back the moving picture file and substitute audio file synchronously (i.e., in parallel) may also be described in the synchronized multimedia integration language (SMIL) standardized by W3C. In that case, the relationship between the moving picture file and the substitute audio file can be clearly described from the viewpoint of playback timing. For example, the start point of the synchronous playback may be selected by setting the time that has passed from the top of the video file and the time that has passed from the top of the audio file. In addition, by using the SMIL language, even if the moving picture file, substitute audio file and other files have been transferred to a PC, those files can still be played back by an SMIL player, which is implemented by an application software program on the PC.

Furthermore, in the preferred embodiments described above, the video compression code and the audio compression code are supposed to be MPEG-2 video compression code and AAC compression code, respectively. Alternatively, MPEG-1 video compression code, MPEG-4 video compression code, MPEG-Audio compression code, Dolby AC3 compression code, or Twin-VQ compression code may also be adopted. Also, in the preferred embodiments described above, substitute audio associated with moving pictures is supposed to be stored in the substitute audio file. Optionally, music (such as background music (BGM)), of which the timing has nothing direct to do with the moving pictures, may be recorded there and may be played back by the same method as the substitute audio.

Also, in the preferred embodiments described above, the amount of time it takes for the pickup to make the longest move is supposed to be the same, no matter whether the pickup is performing a read operation or a write operation. Alternatively, it may take different amounts of time for the pickup to make the same move. In that case, however, the data size of the continuous data areas needs to be calculated by selecting the more appropriate one or the longer one as the time for the pickup to make the longest move.

Furthermore, in the foregoing description, a transport stream is supposed to be made up of transport packets, each having a size of 188 bytes. Optionally, however, a unit packet of 192 bytes in total may also be used by adding transmission timing information of 4 bytes (e.g., a value represented by a 27 MHz clock value) to just before each transport packet.

Also, in the foregoing description, the transport streams, program streams and elementary streams may also be replaced with any other type of data streams such as QuickTime streams or streams based on the ISO Base Media format.

INDUSTRIAL APPLICABILITY

The present invention is applicable to an optical disk drive that performs the process of playing back post-recorded audio and video synchronously with each other. Among other things, the present invention is also applicable even to a less expensive optical disk drive that has a relatively long seek time. Furthermore, the present invention is also applicable to an optical disk drive that can carry out post-recording on an optical disk so as to use the storage areas of the optical disk efficiently.

The invention claimed is:

1. A data processor that is able to store audio data representing audio on an optical disk, the optical disk including a first area made up of a first group of unit areas, video data representing video being stored in the first area, the data processor comprising:
   an audio buffer memory for retaining the audio data;
   a writing control section for reserving a second area made up of a second group of unit areas and instructing to store the audio data in the second area; and
   a head for reading and writing the data from/on one of the unit areas after another in accordance with the instruction,
   wherein the writing control section finds the data length of each said unit area of the second group and reserves the second area, in which a data length of the unit area of the second group is equal to or more than a quantity of the audio data to be played back over fourth and fifth periods of time, the fourth period of time being n+2 times (where n is an integer equal to or greater than two) as long as the amount of time it takes to move the head, the fifth period of time being taken to read the video data from the number n of unit areas of the first group.

2. The data processor of claim 1, further comprising:
   a reading control section for giving instructions on how to read the video data and how to play back the video based on the read data; and
   a video buffer memory for retaining the video data read,
   wherein the reading control section stores the video data and concurrently instructs that the video data, which is to be played back over sixth and seventh periods of time, be read from at most the number equal to or less than n of unit areas of the first group to the video buffer memory and be played back, the sixth period of time being three times as long as the amount of time it takes to move the head, the seventh period of time being taken to read the audio data of which the quantity is twice as large as the data length of each said unit area of the second group.

3. The data processor of claim 1, wherein the writing control section instructs that the audio data be written continuously in the respective unit areas of the second group.

4. The data processor of claim 3, wherein the writing control section generates playback control information that indicates the playback timings of the video data and the audio data and instructs that the playback control information be stored in a different area from the first and second areas.

5. The data processor of claim 4, wherein the reading control section is able to play back the video and audio data synchronously with each other in accordance with the playback control information.

6. The data processor of claim 1, wherein one of the first and second areas is provided approximately at the center of the storage area of the optical disk in the radial direction of the optical disk.

7. The data processor of claim 1, wherein the optical disk includes a third area made up of a third group of unit areas, the video data and/or the audio data being stored in the third area, at least one of the unit areas of the third group being physically adjacent to at least one of the unit areas of the first group, and
   wherein the writing control section finds the data length of each said unit area of the second group and reserves the second area based on the quantity of the audio data to be played back over fourth and fifth periods of time and an eighth period of time, the eighth period of time being taken to read the data from the number n of unit areas of the third group.

* * * * *